(12) United States Patent
Kessler et al.

(10) Patent No.: US 10,877,003 B2
(45) Date of Patent: Dec. 29, 2020

(54) DAMAGE DETECTION SYSTEM AND METHOD FOR DETECTING DAMAGE IN FASTENED STRUCTURES

(71) Applicant: Metis Design Corporation, Boston, MA (US)

(72) Inventors: Seth S. Kessler, Newton, MA (US); Michael Borgen, Wilmington, MA (US); Christopher T. Dunn, Salem, MA (US)

(73) Assignee: Metis Design Corporation, Boston, MA (US)

( * ) Notice: Subject to any disclaimer, the term of this patent is extended or adjusted under 35 U.S.C. 154(b) by 0 days.

(21) Appl. No.: 16/294,366

(22) Filed: Mar. 6, 2019

(65) Prior Publication Data

US 2020/0141910 A1   May 7, 2020

Related U.S. Application Data

(60) Provisional application No. 62/639,310, filed on Mar. 6, 2018.

(51) Int. Cl.
*G01N 29/24* (2006.01)
*G01N 29/04* (2006.01)

(52) U.S. Cl.
CPC ......... *G01N 29/2437* (2013.01); *G01N 29/04* (2013.01); *G01N 2291/2691* (2013.01)

(58) Field of Classification Search
CPC .... G01N 29/24; G01N 29/043; G01N 29/262; G01N 29/2437; G01N 29/28; G01N 29/223; G01N 29/227; G01N 29/04; G01L 5/246; G01L 1/255
See application file for complete search history.

(56) References Cited

U.S. PATENT DOCUMENTS

| | | | | | |
|---|---|---|---|---|---|
| 4,294,122 | A | * | 10/1981 | Couchman | B25B 23/14 411/14 |
| 4,598,592 | A | * | 7/1986 | McMaster | G01L 1/16 310/328 |
| 5,220,839 | A | * | 6/1993 | Kibblewhite | B06B 1/0662 73/761 |
| 5,461,923 | A | * | 10/1995 | Meisterling | G01L 5/246 73/597 |
| 5,675,087 | A | * | 10/1997 | MacLauchlan | G01L 1/25 73/597 |

(Continued)

OTHER PUBLICATIONS

International Search Report and Written Opinion for Application No. PCT/US2019/020996, dated Jun. 9, 2020, 14 pages.

*Primary Examiner* — Helen C Kwok
(74) *Attorney, Agent, or Firm* — McCarter & English LLP; David Burns

(57) ABSTRACT

Exemplary embodiments are directed to instrumented fasteners and associated damage detection systems for detecting damage in an assembled structure secured together by at least one instrumented fastener. The instrumented fastener forms a transducer assembly for detecting damage in the assembled structure. The fastener can include a cavity disposed at one end of the fastener. The transducer assembly includes an electromechanical unit at least partially inserted into and mechanically coupled within the cavity of the fastener. The electromechanical unit can include a piezoelectric element.

27 Claims, 39 Drawing Sheets

(56) References Cited

U.S. PATENT DOCUMENTS

| | | | |
|---|---|---|---|
| 6,354,152 B1* | 3/2002 | Herlik | G01N 29/223 |
| | | | 73/597 |
| 8,521,448 B1 | 8/2013 | Ung et al. | |
| 9,915,574 B2* | 3/2018 | George | G01L 5/243 |
| 2006/0123917 A1* | 6/2006 | Kibblewhite | F16B 31/02 |
| | | | 73/761 |
| 2007/0056375 A1* | 3/2007 | Akdeniz | G01L 5/246 |
| | | | 73/649 |
| 2009/0071078 A1* | 3/2009 | Rakow | F16B 33/06 |
| | | | 52/1 |
| 2009/0206705 A1 | 8/2009 | Nies et al. | |
| 2010/0050778 A1 | 3/2010 | Herley et al. | |
| 2011/0035088 A1* | 2/2011 | White | G01N 29/04 |
| | | | 701/31.4 |
| 2013/0220018 A1* | 8/2013 | Kollgaard | G01N 29/04 |
| | | | 73/618 |
| 2017/0160238 A1* | 6/2017 | Etoh | G01N 29/46 |
| 2018/0017530 A1* | 1/2018 | Bleuze | G01N 29/043 |

* cited by examiner

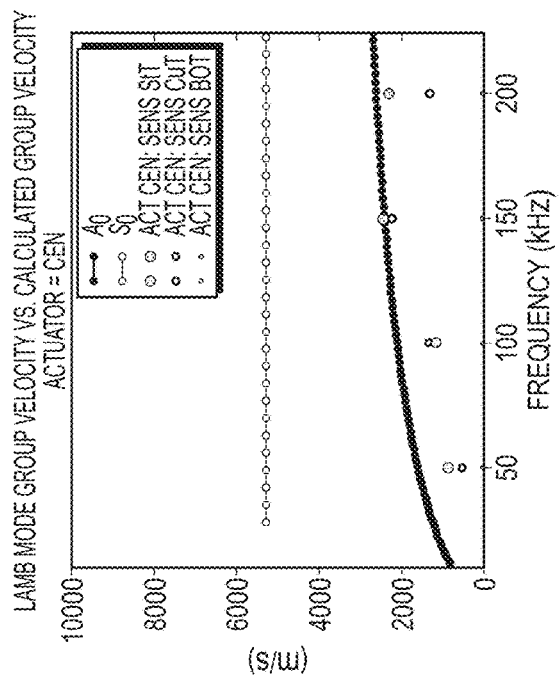
FIG. 31
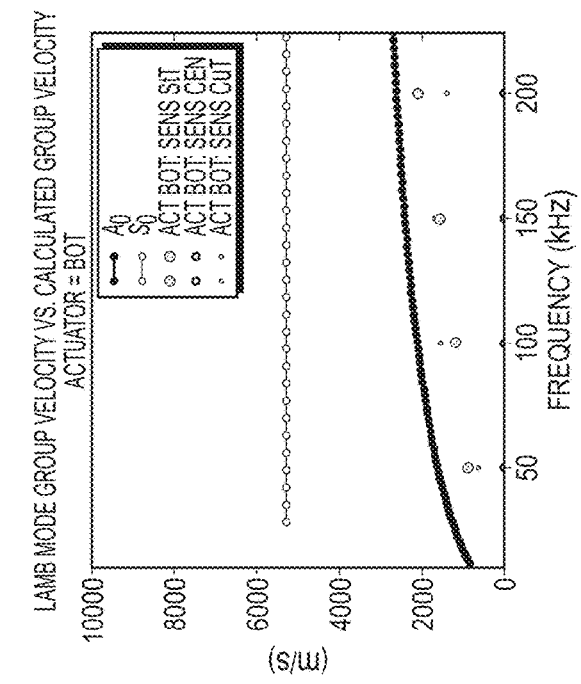
FIG. 32
FIG. 30

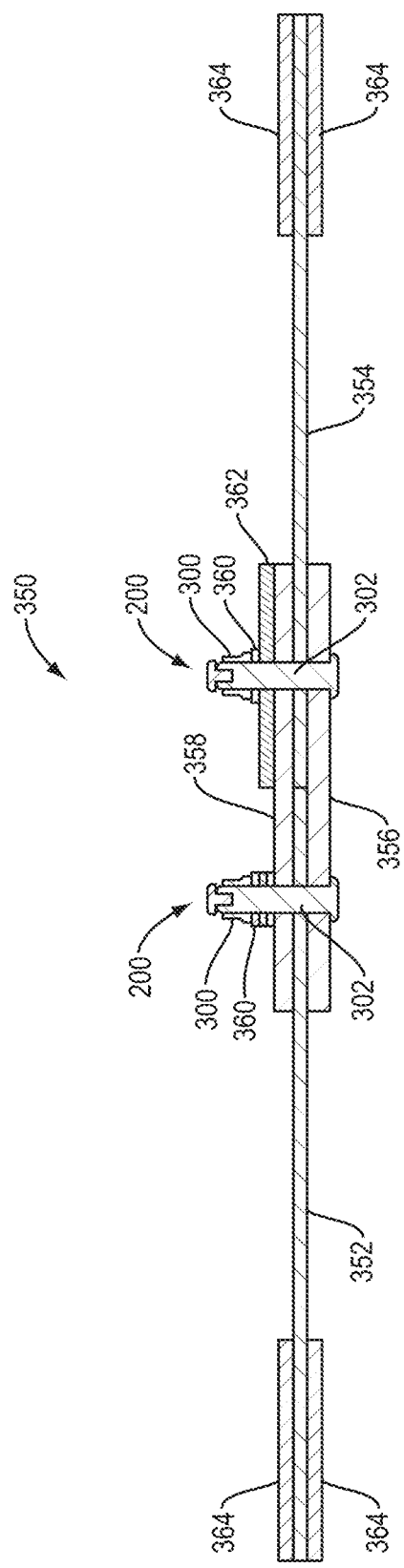

TABLE 1: UNINSTRUMENTED TEST RESULTS

| NAME | MAX LOAD | MIN LOAD | CYCLES | CRACKS |
|---|---|---|---|---|
| 303A | 3,000 | 300 | 700,000 | |
| | 4,000 | 400 | 300,000 | |
| 103A | 4,500 | 450 | 250,000 | |
| | 5,000 | 400 | 250,000 | |
| 102A | 4,000 | 400 | 250,000 | |
| | 5,000 | 500 | 5,000 | FRACTURE |
| 102B | 5,000 | 500 | 50,000 | 0.12" |
| 101A | 5,000 | 500 | 114,000 | FRACTURE |
| 101B | 5,000 | 500 | 125,000 | 0.18" |
| 202A | 5,000 | 500 | 45,000 | FRACTURE |
| 202B | 5,000 | 500 | 30,000 | 0.50" |
| 302A | 5,000 | 500 | 30,000 | FRACTURE |
| 302B | 5,000 | 500 | 48,000 | 0.08" |

TABLE 2: INSTRUMENTED CALIBRATION TEST RESULTS FOR 101, 102 AND 202 SPECIMENS

| NAME | MAX LOAD | MIN LOAD | CYCLES | CRACKS |
|---|---|---|---|---|
| 202C | 5,000 | 500 | 37,738 | FRACTURE |
| 202D | 5,000 | 500 | 36,429 | FRACTURE |
| 101C | 5,000 | 500 | 175,000 | 0.60" |
| 101D | 5,000 | 500 | 27,500 | 0.13" |
| 102C | 5,000 | 500 | 45,000 | 0.09" |
| 102D | 5,000 | 500 | 11,000 | 0.10" |

TABLE 3: INSTRUMENTED DAMAGE METRIC TEST RESULTS FOR 101, 102 AND 202 SPECIMENS

| NAME | MAX LOAD | MIN LOAD | CYCLES | CRACKS |
|---|---|---|---|---|
| 101E | 5,000 | 500 | 15,000 | 0.06" |
| 102E | 5,000 | 500 | 6,000 | 0.05" |
| 202E | 5,000 | 500 | 22,000 | 0.05" |
| 101F | 5,000 | 500 | 19,000 | 0.02" |

TABLE 4: INSTRUMENTED DAMAGE METRIC TEST RESULTS FOR ALL 302 SPECIMENS

| NAME | MAX LOAD | MIN LOAD | CYCLES | CRACKS |
|---|---|---|---|---|
| 302C | 5,000 | 500 | 23,000 | 0.35" |
| 302D | 5,000 | 500 | 4,000 | 0.02" |
| 302E | 5,000 | 500 | 11,000 | 0.06" |
| 302F | 5,000 | 500 | 22,000 | 0.08" |

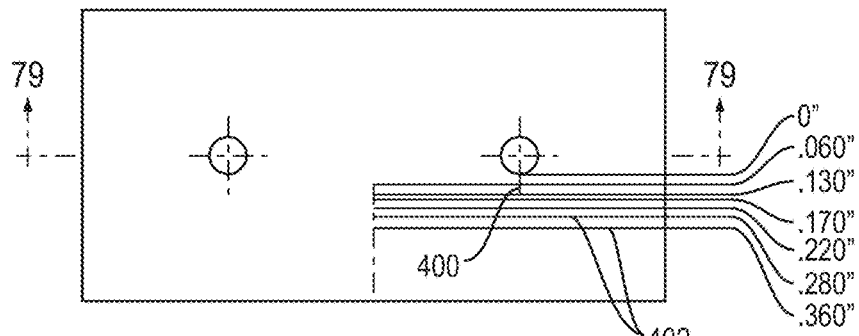
FIG. 78
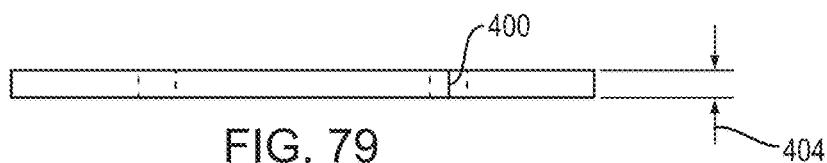
FIG. 79
TABLE 5: CRACK DEPTH MEASURED SECTION-BY-SECTION, LOCATION ORIGIN AT THE END OF THE EDM NOTCH
| SECTION LOCATION (INCH) | CRACK DEPTH (% OF THICKNESS) |
|---|---|
| 0 | 100% (PROBABLY THROUGH, BUT NOT VISIBLE FROM OUTER SURFACE) |
| 0.06 | 100% (PROBABLY THROUGH, BUT NOT VISIBLE FROM OUTER SURFACE) |
| 0.13 | 60% |
| 0.17 | 30% |
| 0.22 AND BEYOND | 0 |
FIG. 80
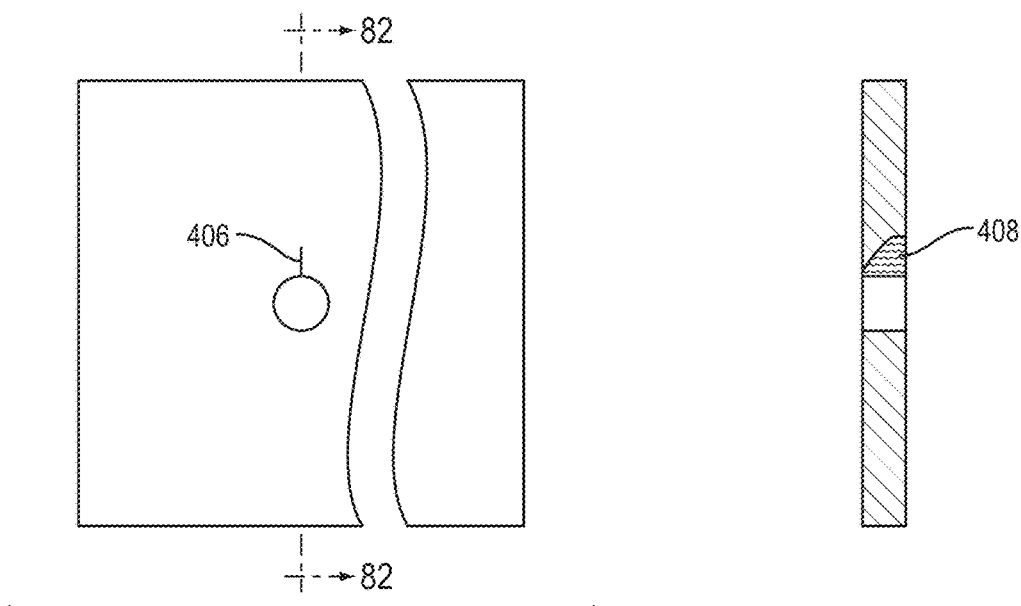
FIG. 81     FIG. 82

DAMAGE DETECTION SYSTEM AND METHOD FOR DETECTING DAMAGE IN FASTENED STRUCTURES

CROSS-REFERENCE TO RELATED APPLICATIONS

This application claims the benefit of commonly assigned U.S. Provisional Patent Application No. 62/639,310, which was filed on Mar. 6, 2018. The entire content of the foregoing provisional patent application is incorporated herein by reference.

STATEMENT OF GOVERNMENT INTEREST

This invention was made with Government support under Contract No. N68335-16-C-0302 awarded by the U.S. Navy, and Contract No. N68335-18-C-0195 awarded by the U.S. Navy. The Government has certain rights in the invention.

TECHNICAL FIELD

The present disclosure relates to damage detection systems and methods for detecting damage in fastened structures and, in particular, to a non-destructive and non-invasive systems for detecting damage in fastened joints that maintains the integrity of a structure without unreasonable disassembly and inspection cycles.

BACKGROUND

Two or more structures have, in some instances, been coupled together using a fastener at a joint (e.g., a rivet, or the like). Generally, the most common places for damage to initiate in structures are in the fastened joints. Holes drilled for the fasteners create stress concentrations, and minute defects created in the drilling process create ideal locations for cracks to nucleate. Corrosion can be accelerated in the areas of the joint due to the presence of dissimilar contacting materials, breaks in protective coatings at drilled holes, and moisture trapped between layers. These factors can be further exasperated by the fact that fastened joints are some of the most difficult areas for inspection. Damage is often hidden under fastener heads or between layers, and visual inspection is therefore not viable.

Traditional inspection methods, such as Eddy currents or ultrasonic detection, are typically hindered due to the complex geometry of fasteners and multiple stacked materials. Sensors or transducers have been placed along the structure surface, within the drilled hole, or under a fastener (e.g., between the fastener and structure). However, by placement of the sensor or transducer in such areas, the joint between the fastener and structure is modified and can lead to additional failure of the components.

Thus, a need exists for a damage detection system for fastened joints that maintains the integrity of the structure without unreasonable disassembly, without inspection cycles, and without modification of the fastener installation. These and other needs are addressed by the damage detection systems of the present disclosure.

SUMMARY

In accordance with embodiments of the present disclosure, an exemplary transducer assembly for damage or flaw detection in a fastened structure is provided. The transducer assembly can include a fastener and an electromechanical unit. The fastener can include a cavity disposed at one end of the fastener. The electromechanical unit can be at least partially inserted into and mechanically coupled within the cavity of the fastener. In some embodiments, the electromechanical unit can include a piezoelectric element.

The electromechanical unit can include a substrate. The piezoelectric element can be coupled to a surface of the substrate. The substrate can be configured to aid in orienting and aligning the piezoelectric element relative to the fastener when the electromechanical unit is inserted into the cavity of the fastener. In one embodiment, the substrate can be at least partially inserted into the cavity of the fastener. In one embodiment, the substrate can be disposed entirely in the cavity of the fastener. In one embodiment, the piezoelectric element can be disposed entirely in the cavity of the fastener.

The electromechanical unit can be driven or actuated by an electrical stimuli, and outputs a response signal that can be indicative of or used to determine whether at least a portion of the fastened structure (e.g., structural and/or non-structural components) or the fastener is damaged. A data acquisition device can be electrically coupled to the electromechanical unit. The data acquisition device can receive the response signal output from the piezoelectric element and digitizes the response signal. In one embodiment, the electromechanical unit can include a substrate, and the data acquisition device can be physically packaged together with the electromechanical unit (e.g., in a shared housing). In one embodiment, the electromechanical unit can include a substrate coupled to the piezoelectric element and the cavity of the fastener can be non-circular. In such embodiment, the substrate can be shaped to substantially correspond to the shape of the cavity.

In one embodiment, the fastener can be a threaded fastener including a shaft, a head at a first end of the shaft, a threaded portion at a second end of the shaft opposite the first end, and the cavity in the shaft accessible from the second end. The threaded fastener can include a nut having a threaded body cooperatively engageable with the threaded portion of the threaded fastener. The threaded portion of the threaded fastener can include a terminal end at the second end that includes a smooth lateral surface extending circumferentially about the terminal end and substantially surrounding the cavity.

In one embodiment, the fastener can be a threaded fastener including a shaft, a head at a first end of the shaft, a threaded portion at a second end of the shaft opposite the first end, and the cavity in the head accessible from the first end. The threaded fastener can include a nut having a threaded body cooperatively engageable with the threaded portion of the threaded fastener.

In accordance with embodiments of the present disclosure, an exemplary detection system for monitoring damage or flaws in a fastened structure is provided. The detection system includes a data acquisition device, and a transducer assembly. The transducer assembly can be disposed in the fastened structure within which damage is to be detected. The transducer assembly can be electrically coupled to the data acquisition device. The transducer assembly can be formed by a fastener and an electromechanical unit. The fastener can include a cavity disposed at one end of the fastener, the fastener joining two or more structural components. The electromechanical unit can be at least partially inserted into and mechanically coupled to the cavity of the fastener. In one embodiment, the electromechanical unit can include a piezoelectric element.

The detection system can include an excitation source, a microcontroller, a memory, signal and power conditioning circuitry, and a communication chip. The communication chip can be coupled to an antenna and can wirelessly transmit data associated with a response signal output by the piezoelectric element. The detection system can include an energy harvesting device that generates power by at least one of radio frequency energy, inductive energy, or mechanical energy, for an electrical stimuli of the piezoelectric element. The data acquisition device can wirelessly transmit data indicative of a structural health of the fastened structure via the communication chip based on an output signal by the piezoelectric element. The transducer assembly can be driven by an electrical stimuli provided by the detection system. The transducer assembly can output a response signal that can be used to determine whether at least a portion of an assembled structure of the fastened structure or the fastener is damaged.

In accordance with embodiments of the present disclosure, an exemplary method of damage detection of a fastened structure is provided. The fastened structure can include a fastener joining two or more structural components. The fastener includes a cavity. The method can include inserting an electromechanical unit at least partially into the cavity of the fastener post-installation of the fastener relative to the two or more structural components. In one embodiment, the electromechanical unit includes a piezoelectric element. The method can include mechanically coupling the electromechanical unit to the fastener. The method can include exciting the electromechanical unit by an electrical stimuli to mechanically stimulate the fastened structure. The method can include measuring an output signal associated with excitation of the electromechanical unit at a data acquisition device to determine whether at least a portion of the fastened structure or the fastener is damaged.

The electromechanical unit can include a substrate, and the inserting the electromechanical unit at least partially into the cavity of the fastener can include inserting the substrate into the cavity, the substrate coupled to the piezoelectric element and mechanically coupling the piezoelectric element to the fastener. The method can include wirelessly transmitting a digitized output of the output signal from the electromechanical unit. Power for the electrical stimuli of the electromechanical unit can be harvested at an energy harvesting device by at least one of radio frequency energy, inductive energy, or mechanical energy.

In accordance with embodiments of the present disclosure, an exemplary detection system for detecting damage or flaws in a fastened structure is provided. The fastened structure can include a fastener having a cavity disposed at one end of the fastener. The fastener can join two or more structural components. The detection system can include a piezoelectric element and a substrate coupled to a surface of the piezoelectric element. The piezoelectric element can be responsive to excitation by an electrical stimuli. The substrate can have a shape and dimensions corresponding to the cavity in the fastener to permit the substrate to be at least partially inserted into and mechanically coupled to the cavity of the fastener.

In one embodiment, the piezoelectric element can define a substantially flat or plate-like configuration having uniform top and bottom surfaces. In one embodiment, the piezoelectric element can define non-uniform top and bottom surfaces. In one embodiment, the substrate can define a hexagonal configuration. In one embodiment, the piezoelectric element can define a width or diameter dimensioned greater than a width or diameter of the cavity of the fastener. In one embodiment, the piezoelectric element can define a width or diameter dimensioned smaller than a width or diameter of the cavity of the fastener. In one embodiment, the substrate can be fabricated from a material having an acoustic impedance corresponding (or substantially corresponding) with an acoustic impedance of a material of the fastener.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed damage detection system, reference is made to the accompanying figures, wherein:

FIG. 30 is a diagrammatic top view of the test setup of FIG. 26, including damage locations in a test matrix;

FIG. 31 is a graph of theoretical Lamb mode group velocity and calculated group velocity for a top piezoelectric sensor element as an actuator;

FIG. 32 is a graph of theoretical Lamb mode group velocity and calculated group velocity for bottom sensor element as an actuator;

FIG. 56 is a diagrammatic, cross-sectional view of a test specimen including an exemplary damage detection system;

FIG. 78 is a top view of a 101 specimen during sectioning;

FIG. 79 is a side view of a 101 specimen during sectioning;

FIG. 80 is a table of crack depth measured section-by-section with a location origin an end of an electrical discharge matching (EDM) notch;

FIG. 81 is a top view of a two-dimensional representation of a crack leading edge constructed from crack depth measurement data;

FIG. 82 is a cross-sectional view of a crack leading edge constructed from crack depth measurement data;

DESCRIPTION OF EXEMPLARY EMBODIMENTS

Figure 1:
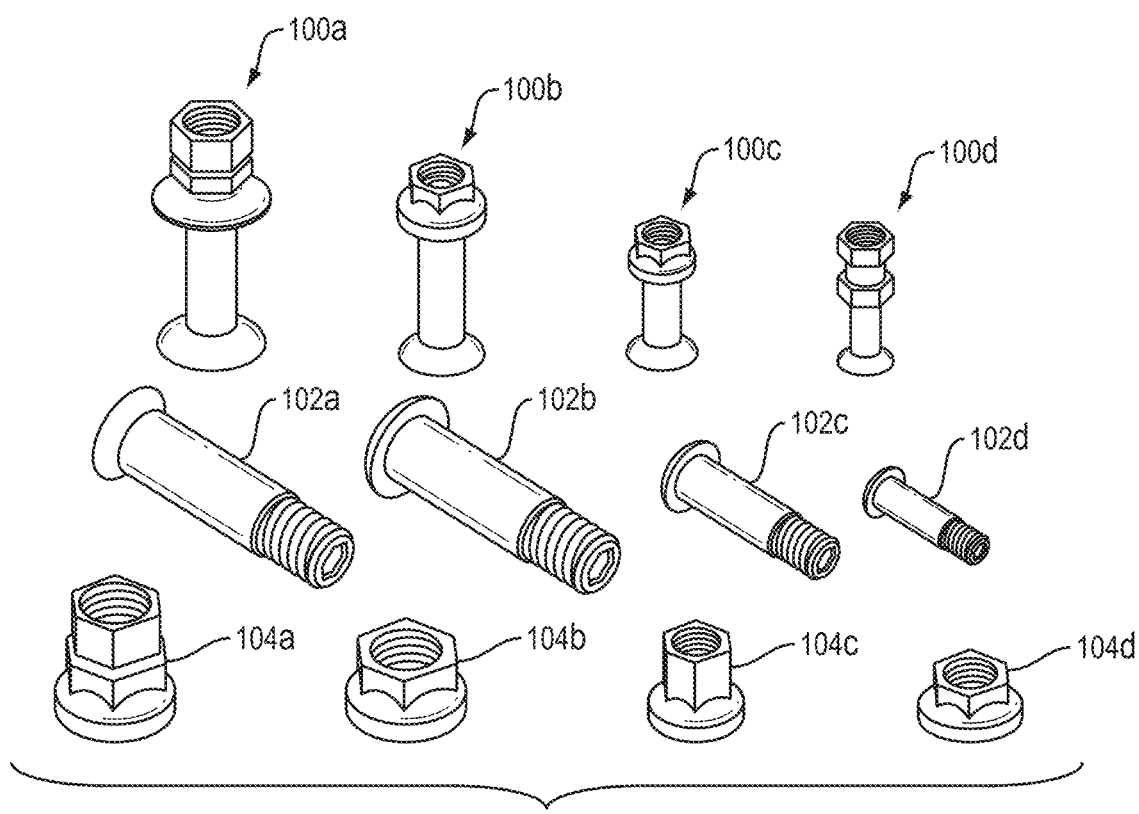
FIG. 1 is a perspective view of fasteners usable with an exemplary damage detection system according to some embodiments of the present disclosure.

Exemplary embodiments of the damage detection system (e.g., electromechanical unit) disclosed herein include a sensor or transducer assembly incorporated into a fastener to determine whether the fastener and/or the surrounding structures are damaged. Rather than placing the transducer(s) on one of the skin layers of the structure or under a fastener, the transducer is mounted inside of the fastener itself. Neither the fastener itself nor the fastener installation is modified to accommodate the detection system. In accordance with exemplary embodiments, the detection system can be mounted inside of the fastener post-installation. As an example, for bolted joints, the detection system can be fit inside of the fastener head. As a further example, for a riveted joint, the detection system can be mounted within the recess (e.g., hex recess) located at the bottom of the pin or shaft. In some embodiments, the detection system can be formed or machined to substantially match the geometry of the opening in the fastener, and the detection system can be maintained coupled to the fastener via, e.g., a friction fit, epoxy, combinations thereof, or the like. The detection system provides mechanical and acoustic coupling with the surrounding structure once inserted or bonded therein. A sensor (e.g., a piezoelectric wafer), can be crystal bonded to the machined part and can serve as an ultrasonic transducer to send and/or receive wave energy (e.g., vibrations) during ultrasonic wave propagation across the structure and fastener.

The combination of the sensor and the machined part (e.g., substrate) can form an electromechanical unit or transducer that can be incorporated into a fastener to transform the fastener into an instrumented fastener or transducer. In some embodiments, the electromechanical unit can be formed by the sensor without the machined part (e.g., substrate). Different ultrasonic inspection methods can be used with embodiments of the detection system, including bulk wave inspection, guided wave inspection, modal analysis, acoustic emission, impedance monitoring, combinations thereof, or the like (e.g., external or remote propagation sources). In some embodiments, propagation of guided waves, shear waves, bulk waves, Rayleigh waves, impedance response, frequency/modal response, combinations thereof, or the like, can be used to excite the disclosed transducers. In some embodiments, the inspection can encompass only the area directly surrounding a single fastener (and the fastener itself). In some embodiments, the inspection can encompass several fasteners in a row at the same joint. In some embodiments, the inspection can encompass the area between two rows of fasteners. In some embodiments, combinations of transducers can be used to serve as actuators and sensors, and beamforming can be achieved to scan large areas for damage detection. By virtue of the case that the fasteners themselves are being excited, the detection system can be particularly sensitive to changes directly surrounding the fasteners in areas that are hidden and traditionally difficult to inspect. Further, ultrasonic energy is able to penetrate and propagate through multiple layers in contact with the fastener, and through air gaps within the fastener to reach the detection system. In some embodiments, the detection system can be permanently attached to digitizing elements in a wired or wireless network for on-demand or real-time health and usage monitoring (e.g., a health and usage monitoring system (HUMS) or structural health monitoring (SHM) system), or can be directly queried through a connector or wirelessly for ad-hoc inspections.

Turning to FIG. 1, a perspective view of fasteners 100a-d usable with the exemplary damage detection system is provided. In some embodiments, the fasteners 100a-d can be, e.g., HI-LOK™ rivets, or the like. Each fastener 100a-d includes a pin 102a-d configured to be passed through a hole in a structure, and a collar 104a-d (e.g., a nut) configured to be threadingly coupled to the pin 102a-d to fasten two or more surfaces between the pin 102a-d and collar 104a-d. As will be discussed in greater detail below, during assembly, a wrenching element of each collar 104a-d can be torqued off after reaching a predetermined torque or torque range, thereby leaving the bottom section of the collar 104a-d permanently coupled to the pin 102a-d and the wrenching element decoupled from the collar 104a-d.

Figure 2:
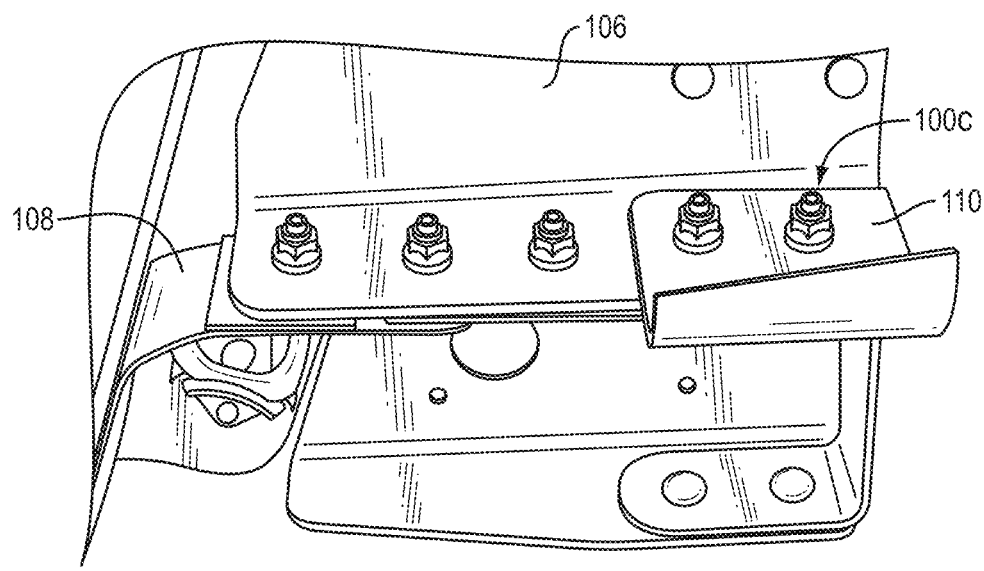
FIG. 2 is a perspective view of fasteners coupling structures relative to each other according to some embodiments of the present disclosure.

While static SHM methods (e.g., guided wave, eddy current, fiber optics, or the like) have generally shown good results for simple structures, no method to date has been successful for damage detection in complex joints. An example of this type of joint is provided in FIG. 2, and can include three pieces of dissimilar metal structures or skins 106, 108, 110 in a stacked configuration joined by fasteners 100c (e.g., HI-LOK™ rivets). Traditional damage detection methods (such as guided wave) can find damage on just the metal skin to which the sensor is affixed. Damage in hidden layers is therefore missed using traditional damage detection methods. Guided wave sensors can use piezoelectric wafers that excite ultrasonic waves in elastic solids; however, these ultrasonic waves are unable to traverse other layers in a stacked joined structure because, while the ultrasonic wave (e.g., vibrations) may propagate through tight fasteners in the same plane, the ultrasonic waves are unable to turn tight "corners."

Figure 3:
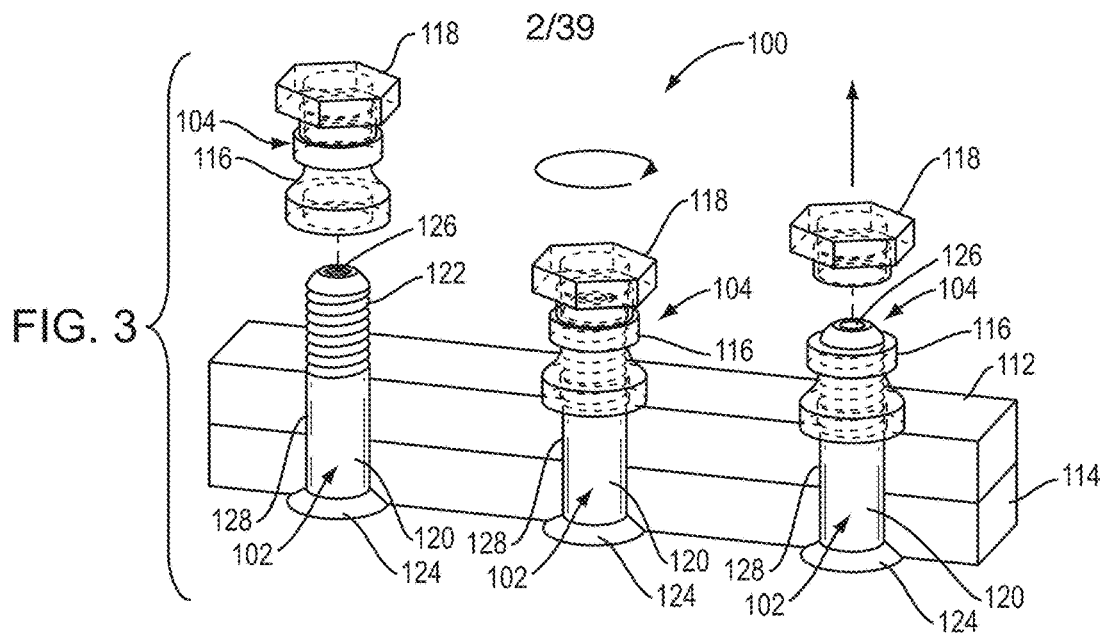
FIG. 3 is a diagrammatic, perspective view of fastener installation steps according to some embodiments of the present disclosure.
Figure 4:
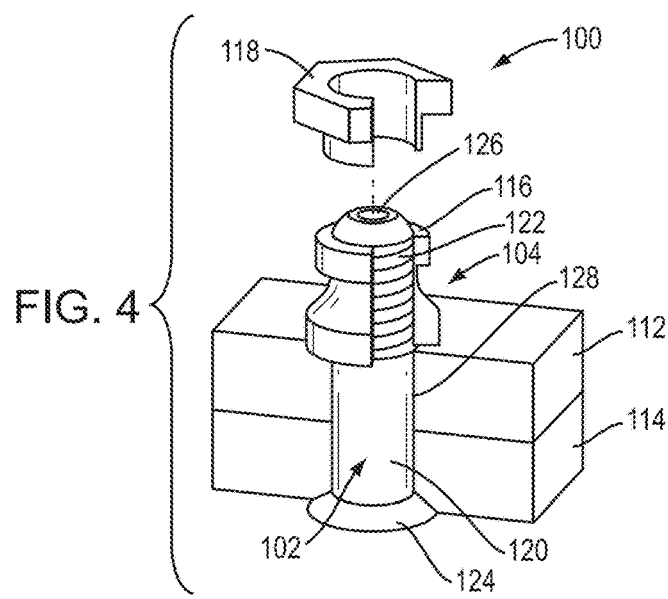
FIG. 4 is a diagrammatic, perspective view of a fastener installation step according to some embodiments of the present disclosure.

FIGS. 3 and 4 show diagrammatic views of the steps involved in installing a fastener 100 to couple two structures 112, 114 relative to each other. The fastener 100 includes a pin 102 and collar 104. The collar 104 (e.g., a nut) includes a main body section 116 having a threaded interior and an element 118 configured to be torqued off to decouple the element 118 relative to the main body section 116 upon reaching a predetermined torque or torque range during installation of the collar 104. The pin 102 includes a central body portion 120 (e.g., a shaft) having a threaded portion or section 122 on one end (e.g., a distal end, a second end, or the like) and a tapered cap 124 (e.g., a head) on the opposing end (e.g., a proximal end, a first end, or the like), where the tapered cap 124 typically has a diameter that is greater than the diameter of the central body portion 120. The cap 124 includes a substantially flat or planar surface extending circumferentially around the body portion 120 and configured to be placed against a substantially flat surface of a first structural sheet or layer (e.g., structure 114). The main body section 116 of the collar 104 includes a substantially flat or planar surface forming a bottom end of the collar 104 and configured to be placed against a substantially flat surface of a second structural sheet or layer (e.g., structure 112). The endpoint of the pin 102 (e.g., at the distal end) includes a hole or cavity 126 (e.g., a drive recess or cavity) for insertion of a tool (e.g., a hex-shaped opening for a hex key). The endpoint of the pin 102 at the distal end defines a terminal end having a smooth lateral surface extending circumferentially about the terminal end (e.g., surrounding the hole 126). Although illustrated as a hex-shaped opening, it should be understood that the hole 126 can be, e.g., circular, non-circular, square, star, oval, angled, X-shaped (e.g., Phillips head), or the like. Although referred to as a hole, it should be understood that any type of recess or cavity of a fastener can be used to incorporate an electromechanical unit, as discussed below. The pin 102 can include an opening at the distal end defining the entrance to the hole 126, and the hole 126 can define a recessed volume within the pin 102 that extends only a partial distance into the pin 102 (see, e.g., FIG. 7).

The fastener 100 can be installed by pressing or hammering the threaded pin 102 into an interference-machined hole 128 extending through the structures 112, 114. The collar 104 (e.g., nut) is threaded onto the pin 102, such that the threaded interior of the collar 104 engages the threaded section 122 of the pin. The collar 104 is tightened using a ratchet until the wrenching element 118 breaks off of the main body section 116 of the collar 104 at a pre-set torque level. A hex-key can be inserted into the hole 126 during installation of the collar 104 on to the threaded pin 102 to prevent rotation of the pin 102 as the collar is threaded onto the pin 102. After installation, the pin 102 and the main body section 116 of the collar 104 remain coupled together to maintain coupling of the structures 112, 114 to each other. As will be discussed in greater detail below, embodiments of the electromechanical unit (e.g., one or more sensors) can be mounted inside the volume defined by the hole 126 in the pin 102 post-installation such that the fastener can be transformed into an instrumented fastener or transducer. As the electromechanical unit can be mounted inside the volume defined by the hole 126, the process of transforming the fastener into an instrumented fastener or transducer does not require any modification of the fastener 100 itself or the fastener 100 installation process. For example, a special washer is not needed for installation and the detection system is not placed between the collar 104 and the structure 112, 114. The proposed position of the electromechanical unit within the hole 126 of the pin 102 advantageously negates any impact on fastener integrity and does not necessity any additional certification tests.

Figure 5:
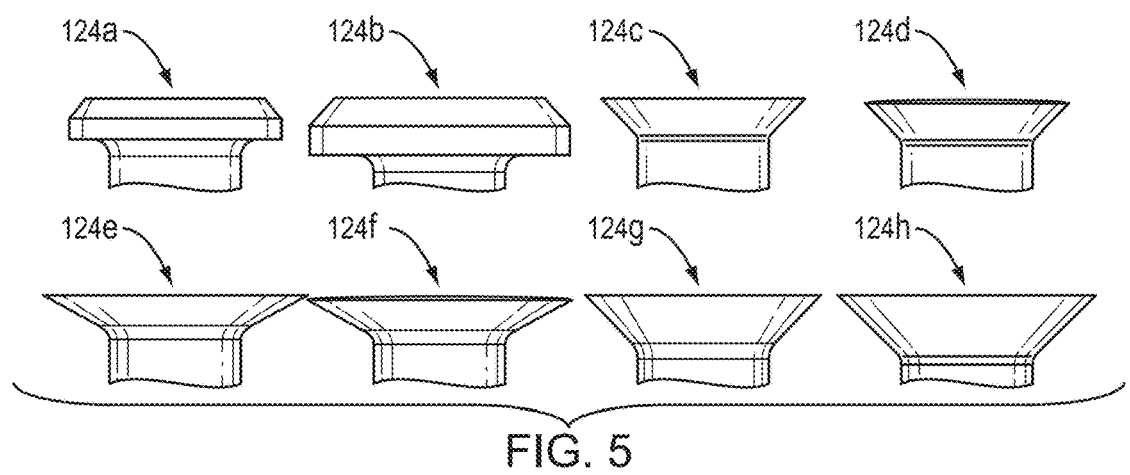
FIG. 5 is a diagrammatic, side view of fastener pin cap configurations according to some embodiments of the present disclosure.

FIG. 5 shows different, non-limiting examples of pin cap 124 configurations for fastener 100. For example, the cap 124a can include a protruding shear configuration, the cap 124b can include a protruding tension configuration, the cap 124c can include a 100° flush shear configuration, the cap 124d can include a 100° flush crown shear configuration, the cap 124e can include a 130° flush shear configuration, the cap 124f can include a 130° flush crown shear configuration, the cap 124g can include a 100° flush MS20426 shear configuration, and the cap 124h can include a 100° flush MS24694 tension configuration.

Figure 6:
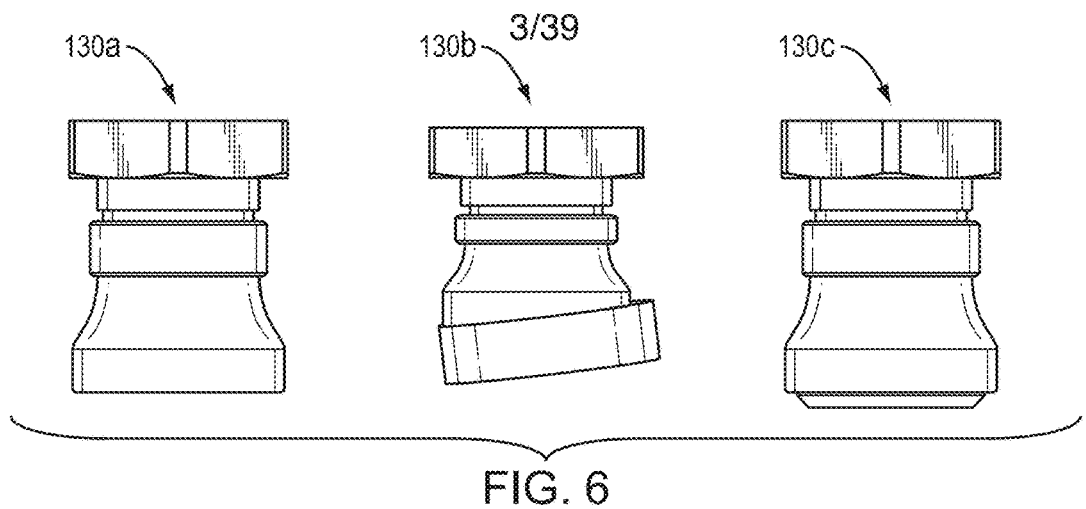
FIG. 6 is a diagrammatic, side view of fastener collar configurations according to some embodiments of the present disclosure.

FIG. 6 shows different, non-limiting examples of collar 104 configurations for fastener 100. For example, the collar 130a defines a standard basic collar, the collar 130b defines a standard self-aligning collar, and the collar 130c defines a standard self-sealing collar.

Figure 7:
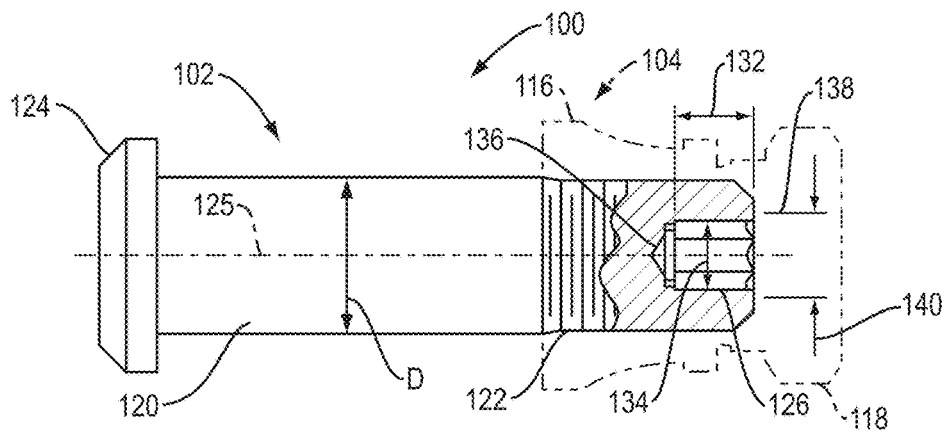
FIG. 7 is a diagrammatic, cross-sectional side view of a fastener configured to receive an exemplary damage detection system according to some embodiments of the present disclosure.
Figure 8:
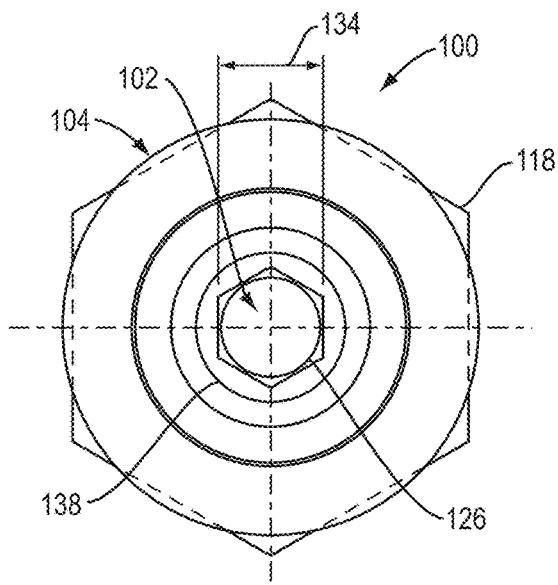
FIG. 8 is a diagrammatic, top view of a fastener of FIG. 7.

FIGS. 7 and 8 are detailed side cross-sectional and top views of fastener 100 configured to receive embodiments of the electromechanical unit. The hole 126 at the end of the pin 102 can define a depth 132 measured from the distal end of the pin 102 in a direction towards the proximal end of the pin 102 along a central or longitudinal axis 125 of the central body portion 120 and an overall inner diameter or inner width 134 measured perpendicularly relative to the center or longitudinal axis 125. In some embodiments, based on the tool used to machine the hole 126 in the pin 102, the bottom of the hole 126 can include a dome-shaped tapered section 136 extending deeper than the depth 132 along the center or longitudinal axis 125 towards the proximal end of the pin 102. The element 118 of the collar 104 can include a hole 138 formed therein and extending through the element 118 to align with the hole 126 in the pin 102 when the collar 104 is engaged with the pin 102. The inner diameter 140 of the hole 138 can be dimensioned greater than the inner diameter or inner width 134 opening/hole 126 to permit insertion of a hex key through the hole 138 and into hole 126. Thus, during installation, a hex key is inserted into the holes 138 and 126 to maintain the position of the pin 102 (e.g., to prevent the pin 102 from turning or shifting as the collar 104 is being threaded onto the pin 102), and a wrench is used to thread the collar 104 onto the pin 102 until the predetermined torque is reached at which point the element 118 breaks off from the collar 104 to decouple the element 118 from the main body section 116.

Figure 9:
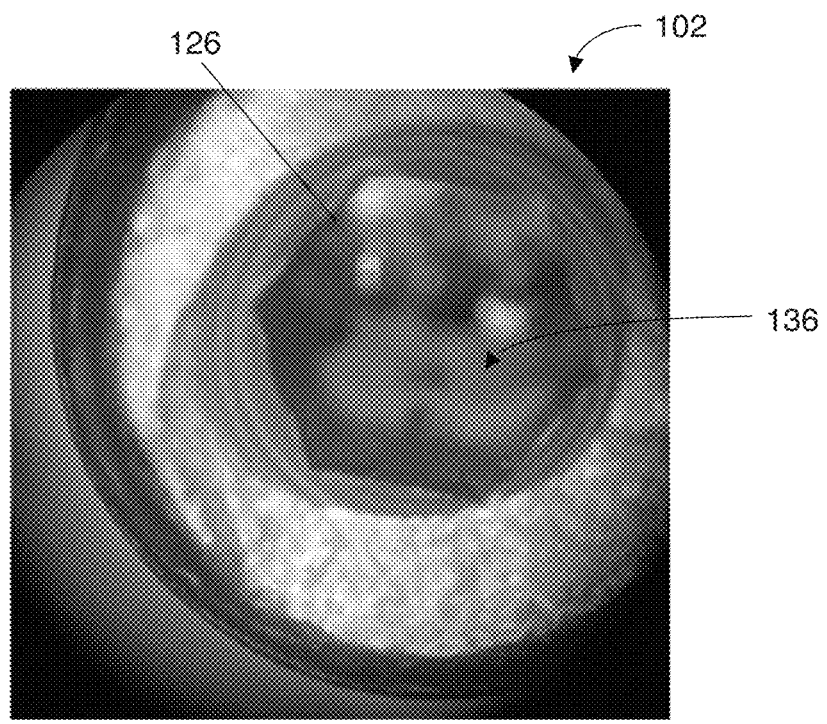
FIG. 9 is a microscope image of an opening in a pin of a fastener according to some embodiments of the present disclosure.
Figure 10:
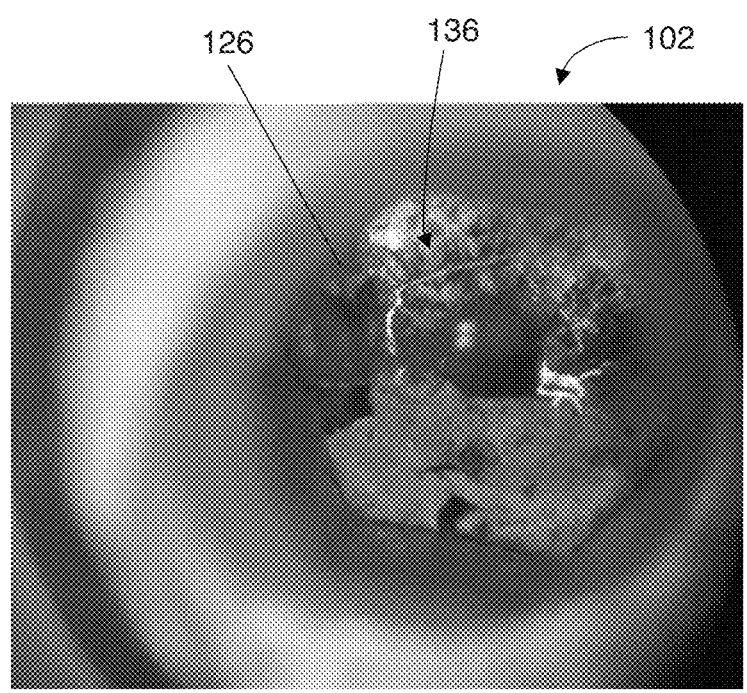
FIG. 10 is a microscope image of an opening in a pin of a fastener according to some embodiments of the present disclosure.

FIGS. 9 and 10 are microscope images of the hole 126 of the pin 102. The hole 126 can be formed during fabrication of the pin 102 by drilling a circular hole of approximately the correct diameter (e.g., similar to inner diameter or inner width 134), and a stamping operation can be used to create flat sidewalls within the hole 126 about the center axis (e.g., to create a hexagonally-shaped interior volume) for the hex key. The result of this process, however, is that metal shavings from the sidewalls can be driven to the bottom of the hole 126 (e.g., the tapered section 136), creating a "false" bottom that is not solid. In some embodiments, prior to installation of the electromechanical unit within the hole 126, epoxy can be introduced into the bottom of the hole 126 to bond the metal shavings and/or fill any air pockets beneath the shavings to reduce the effect of the shavings and/or any air pockets on passage of ultrasonic energy through the pin 102. In some embodiments, the electromechanical unit can be introduced into the hole 126 without placing epoxy at the bottom of the hole 126, with the substrate of the electromechanical unit packed sufficiently into the hole 126 to prevent or reduce any effect on passage of ultrasonic energy (e.g., a friction or press fit within the hole 126).

Figure 11:
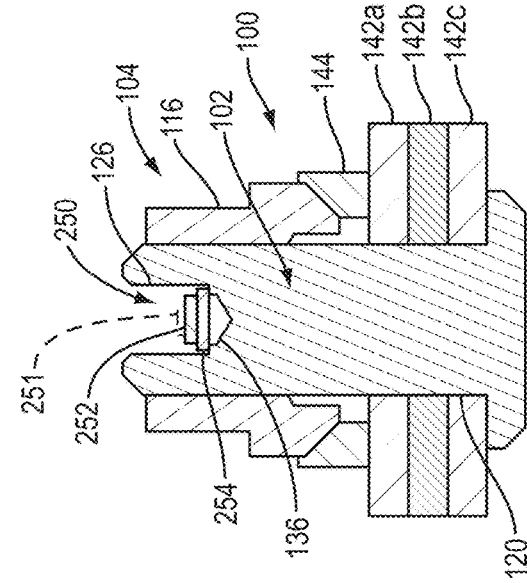
FIG. 11 is a diagrammatic, top view of an exemplary damage detection system in a nail-type configuration coupled with a fastener according to some embodiments of the present disclosure.
Figure 12:
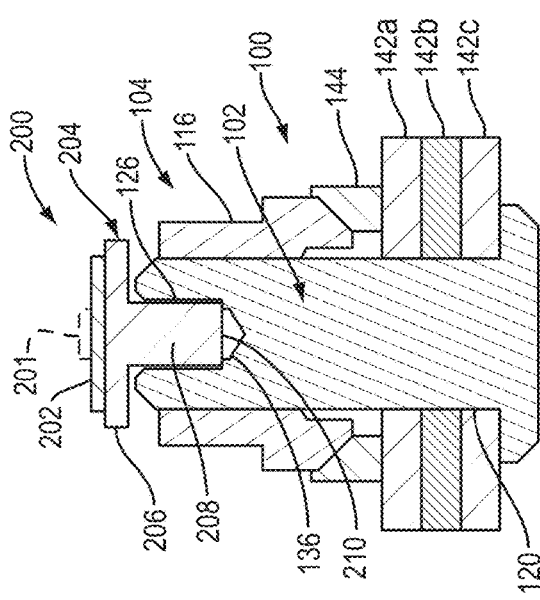
FIG. 12 is a diagrammatic, cross-sectional view of an exemplary damage detection system of FIG. 11.

FIGS. 11 and 12 are diagrammatic, top and cross-sectional views of an exemplary electromechanical unit 200 (hereinafter "unit 200") (e.g., a structural health monitoring system, a damage detection system, or the like), which can be incorporated into and coupled with the fastener 100. Although fastener 100 is shown, it should be understood that the electromechanical unit 200 can be incorporated into any type of recess or cavity in a fastener (e.g., a recess or cavity in the head of a Phillips screw). For example, a Phillips head screw can be used with a nut to assemble structures, and the unit 200 can be incorporated into the cavity of the screw head. In some embodiments, beamforming sensing and actuating elements can be incorporated into existing fasteners 100. In some embodiments, non-traditional excitation sources and sensing elements can be used. The unit 200 can have a "nail-type" configuration. First, the fastener 100 can be used to couple structures 142a-c together, and the element 118 of the fastener 100 can be detached upon reaching the predetermined torque. In some embodiments, the installation process of the fastener 100 can include placement of a washer 144 between the collar 104 and the top surface of the structure 142a. Use of the washer 144 is optional and is not necessitated for installation of the unit 200.

The unit 200 can include a sensor element or electromechanical device 202 coupled to a substrate 204. In some embodiments, the sensor element 202 can be a piezoelectric element. The piezoelectric element can be in any form, e.g., circular, annular, hexagonal, square, rectangular, or the like. The width or diameter of the sensor element 202 can be dimensioned greater than the inner width or inner diameter 134 of the hole 126. The piezoelectric element can defines substantially flat or plate-like configuration having uniform top and bottom surfaces. In some embodiments, the piezoelectric element can define non-uniform top and/or bottom surfaces. For example, the piezoelectric element can include a hole in the middle of the piezoelectric element for coupling of an electrode to the bottom surface, and a "bullseye" electrode pattern on the top surface. In some embodiments, the piezoelectric element can have a diameter of approximately 0.15 inches to approximately 0.35 inches or can have a diameter of approximately 0.25 inches, and a thickness of approximately 0.01 inches to approximately 0.03 inches or a thickness of approximately 0.02 inches.

The substrate 204 can be fabricated from, e.g., metal, ceramic, plastic, or the like. The substrate 204 can define a substantially T-shaped side profile, and can include a horizontal or top section 206 (e.g., a cap) and a vertical or bottom section 208 (e.g., a shaft or an extension). The bottom section 208 protrudes or extends from a bottom surface of the top section 206 in a substantially perpendicular manner. The top surface and the bottom surface of the top section 206 can be substantially flat and uniform (except for the bottom section 208 extending therefrom). In some embodiments, the top section 206 can define, e.g., a circular, hexagonal, square, rectangular, or the like, configuration when viewed from the top.

For example, as shown in FIG. 11, the top section 206 can define a hexagonal configuration when viewed from the top, while the sensor element 202 can define a circular configuration when viewed from the top. In some embodiments, the configuration of the top section 206 of the substrate 204 and the sensor element 202 can correspond, e.g., the top section 206 and the sensor element 202 can each have a circular 202, a hexagonal, square, rectangular, or the like, configuration. The width or diameter of the top section 206 can be dimensioned greater than the width or diameter of the sensor element 202 to ensure that the entire bottom surface of the sensor element 202 is bonded to the top surface of the top section 206. In some embodiments, the width or diameter of the top section 206 can be dimensioned smaller than the width or diameter of the collar of the fastener 100 to prevent extension of the unit 200 beyond the edges of the fastener 100. In some embodiments, the width or diameter of the top section 206 can be dimensioned substantially equal to or greater than the width or diameter of the collar of the fastener 100.

The bottom section 208 (e.g., extension) can define a length substantially corresponding with the depth 132 of the hole 126 in the pin 102. The length of the bottom section 208 as measured from the bottom surface of the top section 206 to a bottom or end 210 of the bottom section 208 can be selected based on the type of fastener 100 being used. Thus, when the bottom section 208 is inserted into the hole 126, the bottom surface of the top section 206 can be positioned adjacent to or abutting the distal end of the pin 102. In some embodiments, the bottom section 208 can define a substantially cylindrical shape with a circular cross-section. In some embodiments, the bottom section 208 can define a hexagonal cylinder with a hexagonal cross-section corresponding with the hexagonal hole 126. In some embodiments, the bottom or end 210 of the bottom section 208 can be substantially flat (as shown in FIG. 12). In some embodiments, the bottom or end 210 of the bottom section 208 can be machined to match the dome-shaped cavity or tapered section 136 at the bottom of the hole 126.

In some embodiments, the bottom section of the substrate 204 can have a length of approximately 0.1 inches to approximately 0.2 inches or can have a length of approximately 0.153 inches. For embodiments in which the bottom section 208 is formed as a hexagonal cylinder, the bottom section 208 can have flat sides, each of which can be dimensioned to be approximately 0.05 inches to approximately 0.1 inches or approximately 0.089 inches. For embodiments in which the top section 206 (e.g., cap) has a hex-shape with flat sides/edges, each of the sides/edges can be dimensioned to have a width of approximately 0.24 inches to approximately 0.29 inches or have a width of approximately 0.265 inches and to have a thickness of approximately 0.02 inches to approximately 0.06 inches or have a thickness of approximately 0.04 inches. However, it should be understood that the dimensions of the sensor element 202 and substrate 204 can be selected based on the type of fastener used.

The dimensions of the bottom section 208 can be selected such that the bottom section 208 can be press fit into the hole 126, such that friction between the bottom section 208 and the sidewalls of the hole 126 can maintain coupling between the unit 200 and the fastener 100 without the use of epoxy or other substance. The friction fit can also maintain tight contact between the unit 200 and the fastener 100 to prevent air gaps that may affect ultrasonic signal travel and the readings of the ultrasonic signal during testing of the joint. In some embodiments, epoxy can be introduced into the hole 126 to couple the unit 200 to the fastener 100. The epoxy can ensure that the unit 200 remains in place, and reduces air gaps between the hole 126 and the unit 200. For example, the epoxy can be introduced into the hole 126 sufficiently to remove all air gaps within the hole 126 after insertion of the unit 200. In some embodiments, an embodiment of the unit 200 can be capable of wirelessly transmitting data from the sensor element 202. For example, the sensor element 202 can include a radiofrequency transmitter and/or receiver 201 to facilitate wireless data transfer between the sensor element 202 and a receiving unit external to the sensor element 202 and the fastener 100. In such embodiments, only the sensor element 202 and the substrate 204 can be incorporated into the fastener 100. Alternatively or in addition, in some embodiments, a wire can be coupled to the sensor element 202 to transmit data from the sensor element 202 to a receiving unit external to the fastener 100. Coupling of the sensor element 202 with the substrate 204 ensures the orientation or level position of the sensor element 202 relative to the fastener 100, by providing a substantially level surface against which the sensor element 202 is mounted. The sensor element 202 can be oriented to be disposed at or substantially at the midpoint of the fastener 100.

Figure 13:
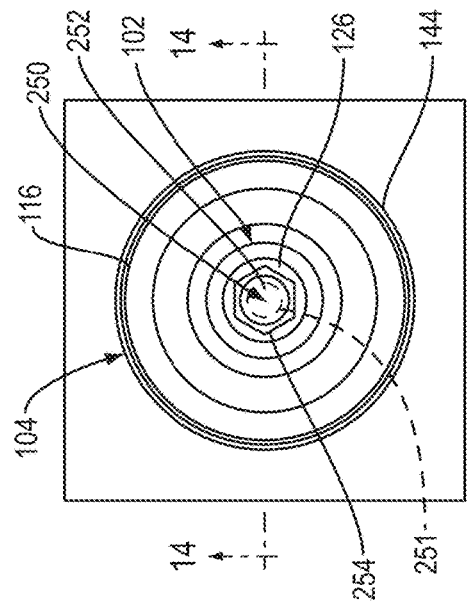
FIG. 13 is a diagrammatic, top view of an exemplary damage detection system in a plate configuration coupled with a fastener according to some embodiments of the present disclosure.
Figure 14:
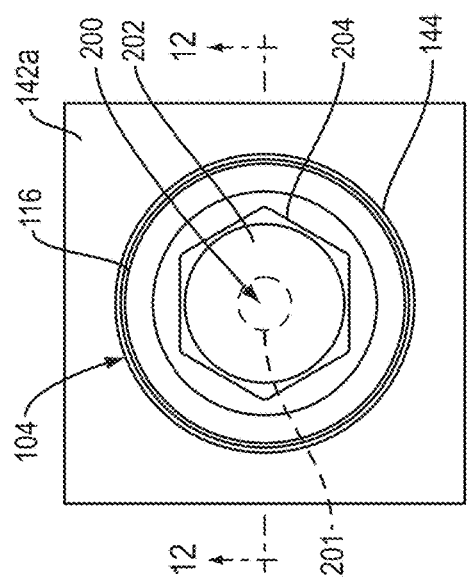
FIG. 14 is a diagrammatic, cross-sectional view of an exemplary damage detection system of FIG. 13.

FIGS. 13 and 14 are diagrammatic, top and cross-sectional views, respectively, of an exemplary electromechanical unit 250 (hereinafter "unit 250") (e.g., a structural health monitoring system, a damage detection system, or the like) incorporated into and coupled with an embodiment of the fastener 100. The unit 200 can be in a "plate-type" configuration. The unit 250 can include a sensor element or electromechanical device 252 coupled to a substrate 254. The sensor element 252 and substrate 254 can be substantially similar to the sensor element 202 and substrate 204, except for the distinctions noted herein.

In some embodiments, the sensor element 252 can be a piezoelectric element. The piezoelectric element can be in any form, e.g., circular, hexagonal, square, rectangular, or the like. The width or diameter of the sensor element 252 can be dimensioned smaller than the inner width or inner diameter 134 of the hole 126, such that the unit 250 can be placed within the hole 126. The piezoelectric element can define a substantially flat or plate-like configuration having uniform top and bottom surfaces. In some embodiments, the piezoelectric element can have a diameter of approximately 0.05 inches to approximately 0.1 inches or can have a diameter of approximately 0.078 inches and can have a thickness of approximately 0.01 inches to approximately 0.03 inches or can have a thickness of approximately 0.02 inches. In some embodiments, an embodiment of the unit 250 can be capable of wirelessly transmitting data from the sensor element 252. For example, the sensor element 252 can include a radiofrequency transmitter and/or receiver 251 to facilitate wireless data transfer between the sensor element 252 and a receiving unit external to the sensor element 252 and the fastener 100.

The substrate 254 can similarly define a substantially flat or plate-like configuration having uniform top and bottom surfaces. The width or diameter of the substrate 254 can be dimensioned slightly greater than the width or diameter of the sensor element 252 to ensure that the bottom surface of the sensor element 252 is bonded to the top surface of the substrate 254. The width or diameter of the substrate 254 can be dimensioned smaller than the inner width or inner diameter 134 of the hole 126, such that the unit 250 (e.g., the entire unit) can be placed and contained within the hole 126. In some embodiments, the dimensions of the substrate 254 can be selected such that a friction fit is used to maintain the unit 250 within the hole 126. In some embodiments, epoxy can be introduced into the hole 126 to ensure the position of the unit 200 is maintained. Thus, rather than filling the entire hole 126 with epoxy (as performed in FIGS. 11 and 12), epoxy is only introduced into the bottom of the hole 126 to sufficiently couple the bottom of the unit 250 within the hole 126. In some embodiments, the bottom surface of the substrate 254 can be machined to correspond with the tapered section 136 at the bottom of the hole 126. In some embodiments, the substrate 254 can define a hex-shape, with flat sides/edges dimensioned to have a width of approximately 0.05 inches to approximately 0.1 inches or a width of approximately 0.089 inches and to have a thickness of approximately 0.01 inches to approximately 0.03 inches or a thickness of approximately 0.02 inches. While FIGS. 13 and 14 illustrate an embodiment of the unit 250 including the substrate 254, exemplary embodiments of the unit 250 can be devoid of a substrate such that the sensor 252 without the substrate 254 is inserted into the cavity.

In some embodiments, a substrate having a hex-shaped top section or cap can be used. In some embodiments, a substrate having a cylindrical top section or cap can be used. In some embodiments, a substrate having a hex-shaped bottom section or extension can be used. In some embodiments, a substrate having a cylindrical bottom section or extension can be used. In some embodiments, a flat bottom section of the substrate extension can be used. In some embodiments, a dome-shaped bottom section of the substrate can be used to substantially fill the volume at the bottom of the pin hole. In some embodiments, sensor elements having an overall width or diameter of approximately 0.1 inches or less can be bonded onto a small delay line substrate. In some embodiments, sensor elements having an overall width or diameter of approximately 0.4 inches or less can be bonded onto a cap on the outside of the collar head. In some embodiments, the sensor element can be cast to have a substantially complementary geometry to the pin hole, thereby fitting the sensor element into the, e.g., hex cavity, without the use of a delay line substrate.

In some embodiments, a hex-shaped bottom section of the substrate can provide improved mechanical and ultrasonic coupling to the fastener based on the tighter fit of the substrate within the hole. In some embodiments, a cylindrical bottom section of the substrate can be used for instances in which the dimension of the pin hole does not allow a more precisely machined part. In some embodiments, the material used for the substrate can match the material of the pin and/or collar of the fastener. For example, 4340 steel substrates can be used to match the acoustic impedance of a fastener formed of 4340 steel for maximum ultrasonic energy propagation. In some embodiments, a 110 copper substrate can be used to reduce the overall stiffness for exciting modes. In such embodiments, the acoustic impedance of the material of the substrate would be at a value between the acoustic impedance of the piezoelectric material and the steel material of the fastener. Thus, in some embodiments, the material of the substrate can be selected to have an acoustic impedance between the acoustic impedance of the piezoelectric material and the material of the pin and/or collar of the fastener.

As will be discussed in greater detail below, the electromechanical units can be used to detect cracks, corrosion or damage hidden in-between layers of fastened joints.

Although the term electromechanical unit is used herein to refer to the combination of the piezoelectric element and substrate, in some embodiments, only the piezoelectric element can be used as the electromechanical unit. The piezoelectric wafer element is bonded to a piece of metal (e.g., a substrate), and then bonded at least partially within the fastener. The substrate can assist in aligning the piezoelectric element relative to the fastener, and can act as an amplifier for the input/output signals. A sinusoidal voltage is directed or applied into the piezoelectric wafer element to turn the entire fastener into an inspection device, serving as either an ultrasonic sensor or receiver. Because an electrical stimulus is applied to the piezoelectric element, the assembly is referred to herein as the electromechanical unit. The combination of the electromechanical unit with the fastener can be referred to herein as the transducer assembly.

Electrically stimulating the piezoelectric element in turn mechanically stimulates the metal substrate which, in turn, mechanically stimulates the fastener which then in turn mechanically stimulates the fastened structure. The measured or received output from the piezoelectric element can be an analog voltage that can be digitized to determine the state of the structure. The voltage signal can be digitized by an analog-to-digital converted (e.g., of a data acquisition device) and sent to a processor to pass through an algorithm to infer if the structure/fastener is damaged. The damage detection system can include the transducer assembly, the data acquisition device, memory, a processor, communication chip (wired or wireless) and an antenna. The damage detection system can be locally attached to a single sensor (e.g., within an inch) or more remotely attached to multiple transducer assemblies (e.g., each several inches away).

Figure 15:
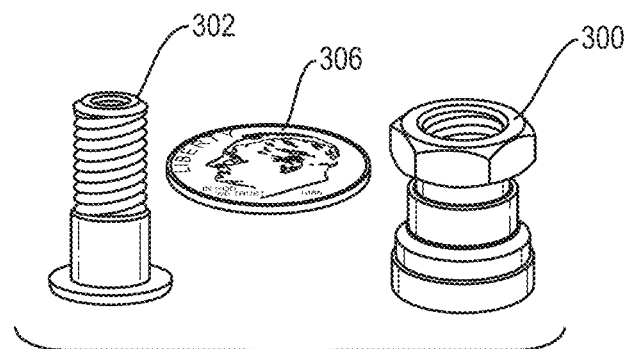
FIG. 15 is a perspective view of a fastener used for experimentation of an exemplary damage detection system.
Figure 16:
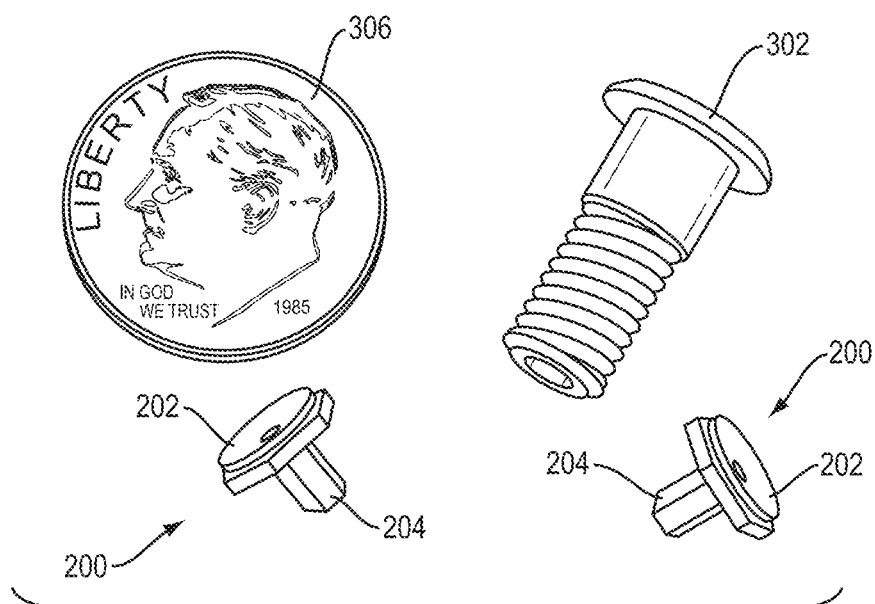
FIG. 16 is a perspective view of a fastener and an exemplary damage detection system in preparation for experimentation.
Figure 17:
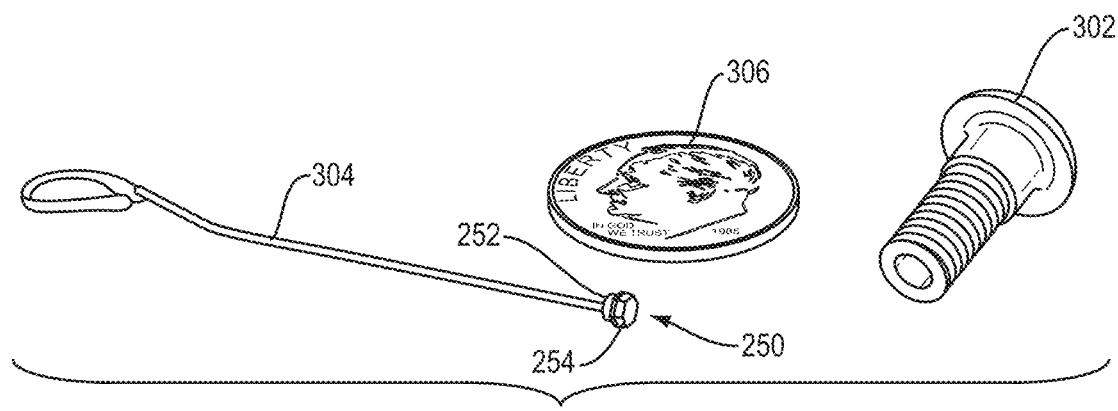
FIG. 17 is a perspective view of a fastener and a wire coupled to an exemplary damage detection system prior to installation within a pin for experimentation.

FIGS. 15-17 show perspective and top views of a fastener having a collar 300 (e.g., nut) and pin 302 and damage detection units 200, 250. Particularly, FIG. 15 shows the collar 300 and the pin 302, FIG. 16 shows an embodiment of the unit 200 having the sensor element 202 and the substrate 204, and FIG. 17 shows an embodiment of the unit 250 coupled to a wire 304. The wire 304 can be used to obtain data from the sensor element 252 for embodiments of the unit 250 that does not wirelessly transmit the data. A dime 306 is provided for sizing reference.

In one non-limiting example, for feasibility testing experiments, the pin 302 selected can be a HI-LOK™ HL-18 pin and the collar 300 selected can be a HI-LOK™ HL-82 collar. In the feasibility testing experiment, the pin 302 was stainless steel with a small protruding shear cap, and the collar 300 was self-leveling aluminum. The pin 302 includes a ¼ inch hole (e.g., hole 126), and the resulting hex was approximately 0.093 inches wide by approximately 0.14 inches deep. Several HL-18 rivets were used during the feasibility testing experiments, and a molding compound was used to cast impressions of the hex-key volume to measure tolerances across a range of parts. The opening (nominally 3/32 inches) was found to be well-tolerated across a dozen parts, approximately ±0.001 inches. The depth of that cavity was also found to be well-tolerated across a dozen parts, approximately ±0.002 inches. Therefore, an embodiment of the substrate 204 can generally be machined to fit tightly or snugly in stock HI-LOK™ rivets without customizations to the rivet nor rivet-specific or individual SHM parts.

Figure 18:
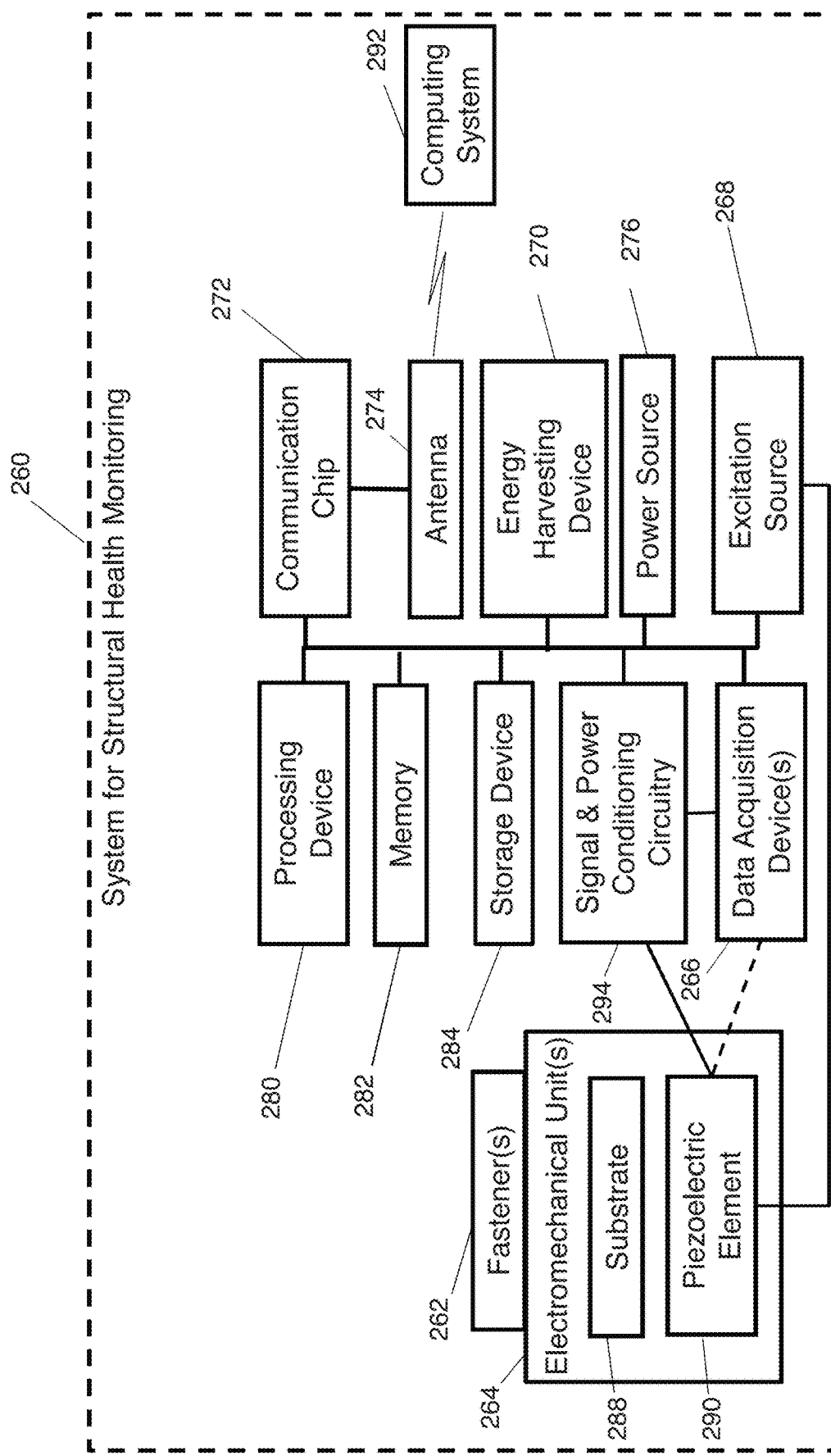
FIG. 18 is a block diagram of an exemplary system for structural health monitoring according to some embodiments of the present disclosure.

FIG. 18 is a block diagram of an exemplary system 260 for structural health monitoring (e.g., a damage detection system for fastened structures and/or joints). The system 260 includes one or more fasteners 262 and one or more electromechanical units 264. Each electromechanical unit 264 can be at least partially inserted into and mechanically coupled to a cavity or recess of a respective fastener 262. Each electromechanical unit 264 includes a substrate 288 and a piezoelectric element 290 mounted and coupled to the substrate 288. The system 260 includes one or more data acquisition devices 266 for collection, processing and transmission of signals and data receive from the electromechanical units 264 during or after excitation. The data collected and processed by the data acquisition devices 266 can be wired and/or wireless transmitted to a computing system 292. In some embodiments, the data acquisition device 266 can include an analog-to-digital converter.

In one embodiment, a data acquisition device 266 can be incorporated into each one of the electromechanical units 264 and/or electrically coupled to the electromechanical units 264 (e.g., one data acquisition device to one electromechanical unit) such that the output of the piezoelectric element in the electromechanical unit can be received as an input to the data acquisition device. In some embodiments, the data acquisition device can be mechanically coupled to or incorporated with the electromechanical unit 264. In one embodiment, a data acquisition device 266 can be electrically coupled to several of the electromechanical units 264 (e.g., one data acquisition device to many electromechanical units), and the outputs of the electromechanical units can be received as inputs by the data acquisition device 266. In one embodiment, data acquisition devices 266 can be incorporated into two or more electromechanical units 264, and signals from electromechanical units 264 can be transmitted in a wired and/or wireless manner to the respective data acquisition devices 266. In one embodiment, the acquisition device 266 can be mechanically coupled to the structure surrounding the electromechanical units 264, and signals output from the electromechanical units 264 can be received as inputs by the data acquisition device 266. After digitizing and processing the data from the electromechanical units 264, the data can be transmitted to the computing system 292 for further analysis.

The system 260 can include an excitation source 268, one or more energy harvesting devices 270 (e.g., having power harvesting circuitry), signal and power conditioning circuitry 294, a processing device 280, such as a microcontroller or microprocessor, a communication chip 272 (e.g., a radio frequency (RF) transceiver), an antenna 274, a power source 276, a memory 282, and a storage device 284. Although illustrated as external and separate from the data acquisition device 266, in some embodiments, components of the system 260 can be incorporated into a shared housing with the data acquisition device 266. The excitation source 268 can actuate the piezoelectric element 290 of the electromechanical unit 264 via an electrical and/or mechanical stimuli. Signals output from piezoelectric element 290 of the electromechanical unit 264 in response to the excitation can be digitized by the analog-to-digital converter of the data acquisition device 266 and subsequently processed by the processing device 280. The signal and power conditioning circuitry 294 can receive as input the signal from the piezoelectric element 290, and can condition the signal before it is input to the data acquisition device 266. In some embodiments, the signal from the piezoelectric element 290 can be input to the data acquisition device without first being processed by the circuitry 294. The processing device 280 can collect and process the signals into data representative of damage to structure associated with the fasteners 262 and/or the structure assembly to which the fasteners 262 are secured. For example, damage can be detected of structural and non-structural elements of the structure assembly, such as adhesives between structural layers. The processing device 280 can be programmed and/or configured to operate the analog-to-digital converter of the data acquisition device 266 to convert and digitize the signals into a format capable of being further analyzed by the processing device 280 and/or for transmission to the computing system 292.

The communication chip 272 can be configured to transmit (e.g., via a transmitter of an RF transceiver) and/or receive (e.g., via a receiver of an RF transceiver) wireless transmissions via an antenna 274. For example, the communication chip 272 can be configured to transmit data, directly or indirectly, to one or more external devices (e.g., computing system 292) and/or to receive data, directly or indirectly, from one or more external devices (e.g., computing system 292). The communication chip 272 can be configured to transmit and/or receive messages having a specified frequency and/or according to a specified sequence and/or packet arrangement. As one example, the communication chip 272 can be a BlueTooth® transceiver configured to conform to a BlueTooth® wireless standard for transmitting and/or receiving short-wavelength radio transmissions typically in the frequency range of approximately 2.4 gigahertz (GHz) to approximately 2.48 GHz. As another example, the communication chip 272 can be a Wi-Fi transceiver (e.g., as defined IEEE 802.11 standards), which may operate in an identical or similar frequency range as BlueTooth®, but with higher power transmissions. As another example, the communication chip can transmit data according to a proprietary communication and messaging protocol. Some other types of the communication chip 272 that can be implemented include RF transceivers configured to transmit and/or receive transmissions according to the Zigbee® communication protocol, and/or any other suitable communication protocol.

The storage device 284 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, operations for controlling the excitation source 268, the energy harvesting device 270, the processing device 280, the communication chip 272, the power source 276, the memory 282, the storage device 284, and/or the data acquisition device 266 can be embodied as computer-readable/executable program code stored on the non-transitory computer-readable storage device 284 and implemented using any suitable, high or low level computing language and/or platform, such as, e.g., Java, C, C++, C#, assembly code, machine readable language, and the like.

The memory 282 can include any suitable non-transitory computer-readable storage medium (e.g., random access memory (RAM), such as, e.g., static RAM (SRAM), dynamic RAM (DRAM), and the like). In some embodiments, the data/information and/or executable code for implementing an operation of the system 260 can be retrieved from the storage device 284 and copied to memory 282 during and/or upon implementation of the processes described herein. Once the data/information has be used, updated, modified, replaced, and the like, the data/information may be copied from memory 282 to the storage device 284.

The processing device 280 can include any suitable single- or multiple-core microprocessor of any suitable architecture that is capable of implementing and/or executing operations of the system 260. For example, the processing device 280 can be programmed and/or configured to execute to excite one or more electromechanical units 264, receive signals output from the electromechanical units 264

(e.g., via the communication chip 272), and transmit digitized data to an external device (e.g., computing system 292). The processing device 280 can retrieve information/data from, and store information/data to, the storage device 284 and/or memory 282. For example, excitation signal values, received signal values, infrastructure damage values, baseline values, and/or any other suitable information/data for implementing the system 260 or that may be used by the system 260 may be stored on the storage device 284 and/or a memory 282.

In exemplary embodiments, the processing device 280 can be programmed to execute the system 260 to receive and process information/data from the excitation source 268, electromechanical unit 264, communication chip 272, data acquisition device 266, and/or memory 282 and/or can be programmed to output information/data to the communication chip 272, the storage device 284, and/or the memory 280 based on the execution of the system 260. The power source 276 can be implemented as a battery or capacitive elements configured to store an electric charge. In some embodiments, the power source 276 can be a rechargeable power source, such as a battery or one or more capacitive elements configured to be recharged via a connection to an external power supply and/or to be recharged by the energy harvesting device 270. As one example, the rechargeable power source can be recharged using solar energy (e.g., by incorporating photovoltaic or solar cells as the energy harvesting device 270), through physical movement (e.g., by incorporating a piezo-electric elements as the energy harvesting device), through energy received from radiofrequency transmissions (e.g., by incorporating an inductive charging circuit as the energy harvesting device 270) and/or through any other suitable energy harvesting techniques using any suitable energy harvesting devices. In some embodiments, the energy harvesting device 270 can be a device for harvesting radio frequency energy, inductive energy, mechanical energy, combinations thereof, or the like. The energy harvesting device 270 can include energy or power harvesting circuitry.

As shown in FIGS. 19A-22, after cleaning the substrate 204, 254, piezoelectric sensor elements 202, 252 of units 200, 250 were bonded to their respective substrates 204, 254 to form electromechanical units using electrically conductive epoxy film preforms. The assembly was cured under vacuum at approximately 140° C. for approximately 60 minutes. Conductive epoxy was used because the substrates 204, 254 themselves were to be part of the ground path. Signal carrying wires 304 were attached to the exposed plated surfaces of the piezoelectric sensor elements 202, 252 with conductive epoxy cured at approximately 125° C. for approximately 30 minutes. The wire joints were then reinforced with epoxy, cured at room temperature for approximately 24 hours.

Transducers (e.g., an embodiment of the unit 200) were bonded into the holes of the pins 302 using a low viscosity epoxy cured at approximately 65° C. for approximately 120 minutes. During installation, epoxy was injected into the floor of the recesses with 27 gauge needles while observing through a microscope to ensure substantially all air bubbles escaped from the recess irregularities. Hex-plate type transducers (e.g., unit 250 of FIGS. 13 and 14) were submerged in epoxy and nail-type transducers (e.g., unit 200 of FIGS. 11 and 12) were bonded at the tip and sides of the shank (e.g., the bottom section 208), as well as the on underside of the head (e.g., the top section 206). Metallic substrates (and the pins, by extension) were used as ground electrodes. Therefore, electrical contact between the substrates 204, 254 and the pins 302 was critical during and after bonding. Piezoelectric capacitance was monitored during assembly with one probe on the signal wire 304 and one probe on the pin 302 being assembled. When good contact was verified, parts were fixtured and cured.

Figure 19A:
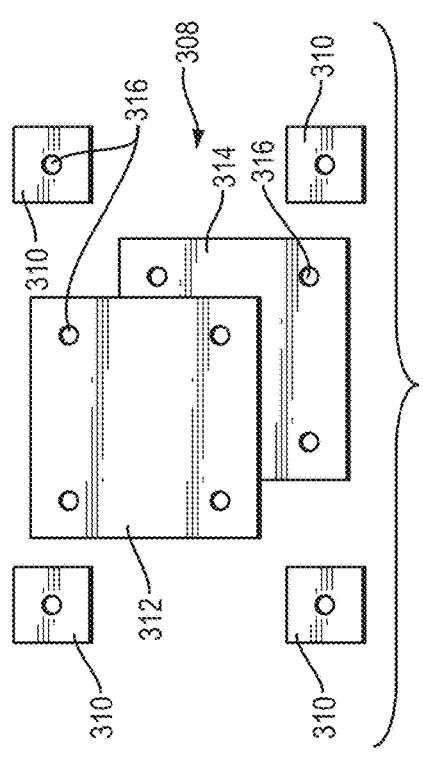
FIG. 19A is a top view of an unassembled test bed for experimentation of an exemplary damage detection system.
Figure 19B:
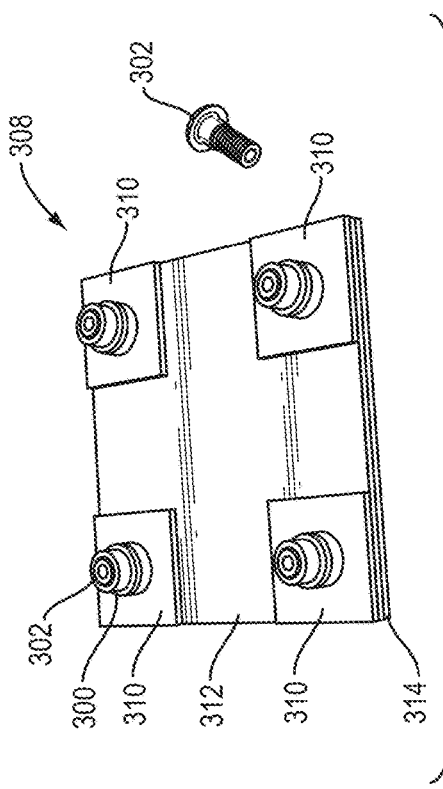
FIG. 19B is a perspective view of an assembled test bed for experimentation of an exemplary damage detection system.

FIGS. 19A and 19B show unassembled and assembled views of a test bed 308 for experimental testing of embodiments of the units 200, 250. To compare performance of the four transducer combinations (two configurations in two substrate materials), a test bed 308 was constructed from three layers 310, 312, 314 of approximately 0.063 inch thick 6061 aluminum. The bottom and middle layers 312, 314 were approximately 3.125 inch squares. The top layer 310 included four, approximately 1 inch squares, one at each corner of the test bed 308 assembly. Fastener mounting holes 316 were drilled and reamed through all three layers 310, 312, 314 according to HI-LOK™ manufacturer specifications, and four pins 302 were installed per standard process and instrumented post-installation.

Figure 20:
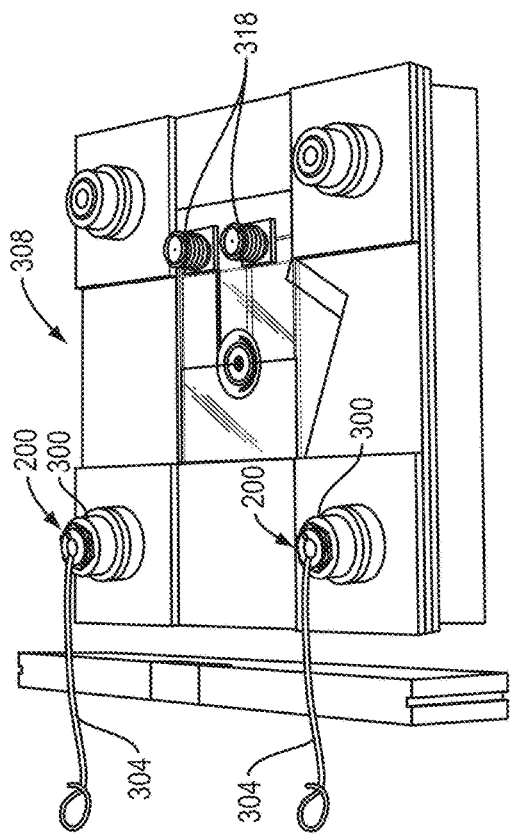
FIG. 20 is a perspective view of an assembled test bed instrumented with one type of exemplary damage detection system.
Figure 21:
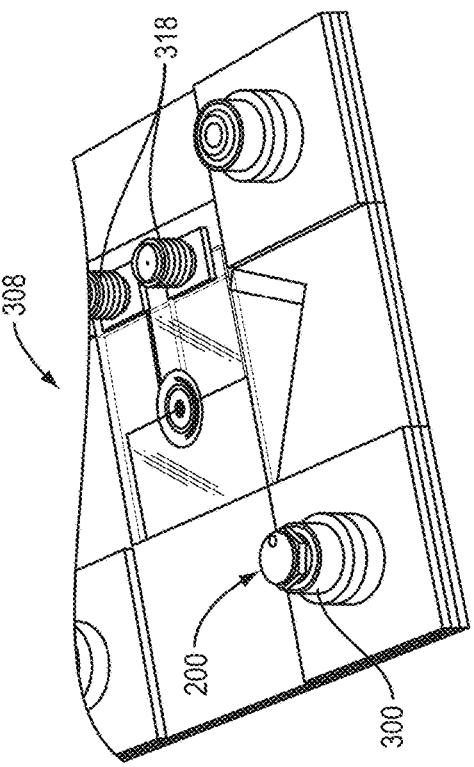
FIG. 21 is a detailed view of an assembled test bed instrumented with one type of exemplary damage detection system.
Figure 22:
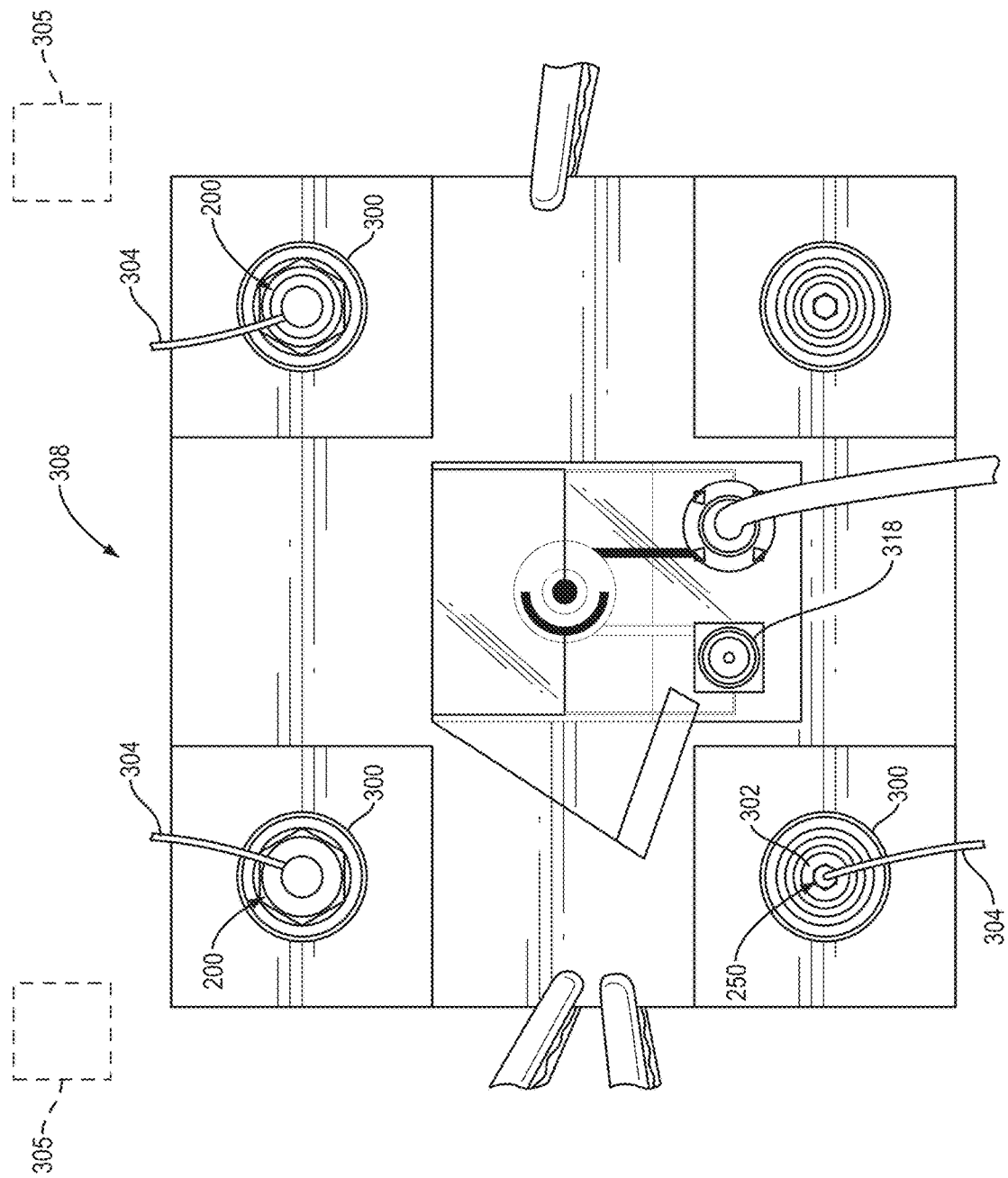
FIG. 22 is a top view of an assembled test bed instrumented with two types of exemplary damage detection systems.
Figure 23:
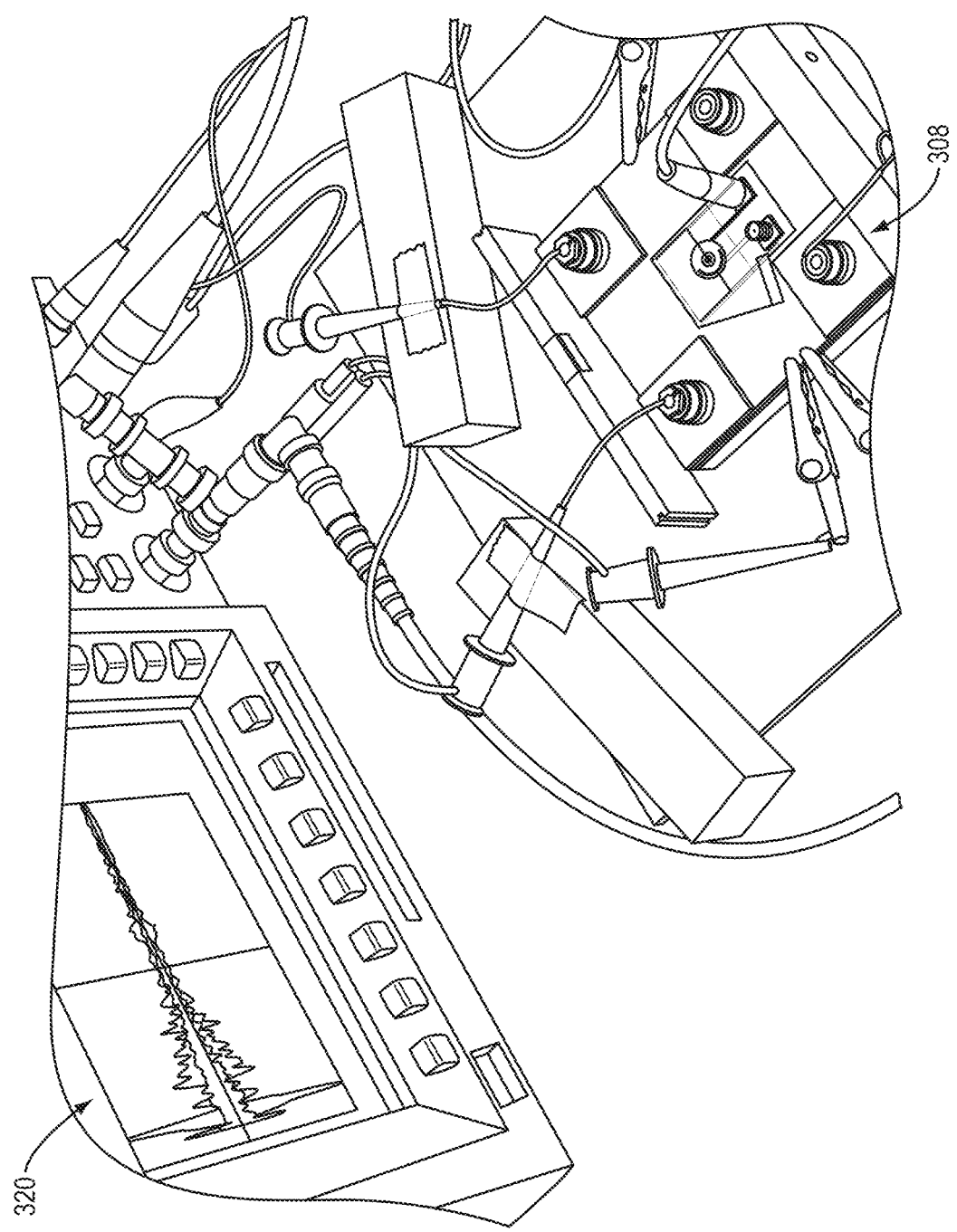
FIG. 23 is a perspective view of a data collection setup for experimentation of exemplary damage detection systems with a test bed.

As shown in FIGS. 20-22, the test bed 308 was instrumented with two types of units, e.g., embodiments of the units 200, 250. Two conventional flex circuit mounted piezoelectric sensor elements 318 were bonded to the exposed surface of the middle layer 312 with the piezoelectric sensor element 318 centered on the top of the plate, and on the bottom layer 314 with the piezoelectric sensor element 318 centered on the bottom of the plate. The centered piezoelectric sensor element 318 was equidistant to the four instrumented pins 302 to facilitate a direct comparison of signal strength relative to the instrumented pins 302. The transducer data was collected in the following manner. One transducer was selected as the actuator, and the other four transducers (including the two standard flex circuits) were used as sensors. The actuator was driven using 4.5 sine waves under a Hanning window generated by an Agilent 33220A function generator and display via an oscilloscope 320 (see, e.g., FIG. 23). The actuator was tested using a frequency of 25, 50, 75, 100, 125, 150, 175, and 200 kHz. The actuator and sensors were measured using a TDS 3014B oscilloscope. Data averaged 64 times.

The initial feasibility testing successfully demonstrated the ability to convey ultrasonic energy into multiple fastened layers by exciting HI-LOK™ rivets and sensing the propagated signal. All configurations of embodiments of the units 200, 250 tested provided positive results. The steel hex-nail configuration provided the strongest results. In some embodiments, the steel hex-nail configuration (e.g., an embodiment of the unit 200) can be implemented for purposes of reduced fabrication complexity and improved field durability.

As shown in FIG. 22, it should be understood that different methods excitation of the transducers can be used. In one embodiment, a signal source generator 305 (e.g., energy harvesting, power transmission, wave generation, exciter, or the like) external to the transducers can electrically or mechanically actuate or stimulate one or more of the transducers, and signals from the transducers can be received by an external data acquisition device 307. In such embodiments, the signal source generator 305 and/or the data acquisition device 307 can be communicatively coupled to the transducers via wired or wireless means. In some embodiments, the signal source generator 305 can be incorporated into one or more of the transducers. As discussed above, in some embodiments, the data acquisition device 307 can be incorporated into one or more of the transducers (see, e.g., FIG. 18).

In some embodiments, one or more transducers can be selected as the actuator, exciter or sending transducer(s) to propagate waves to the remaining transducers, and one or more adjacent and/or remote transducers can be used as sensors or receivers to receive the generated signal (e.g., pitch catch or phased array configuration). In some embodiments, one or more transducers can be selected as the actuator, exciter or sending transducer(s), and the same transducer(s) can be used as a sensor or receiver (e.g., pulse echo configuration). In some embodiments, the signal source generator 305 can be incorporated into one or more of the data acquisition devices 307.

Figure 24:
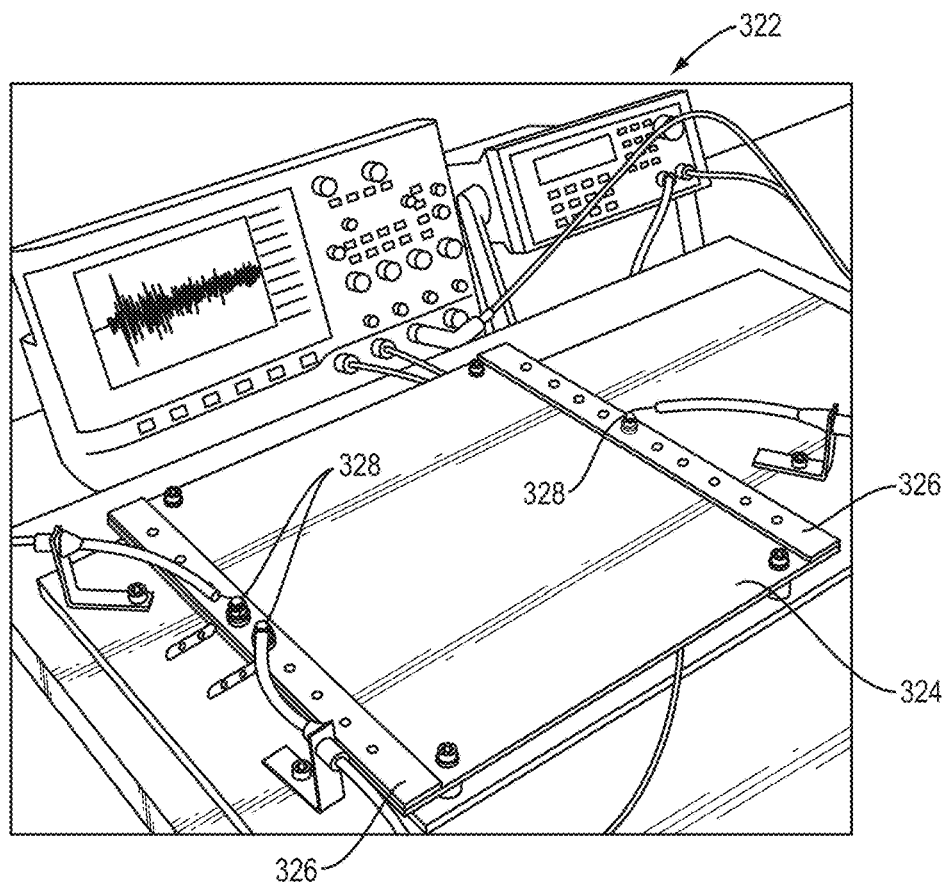
FIG. 24 is a perspective view of a test setup for experimentation of exemplary damage detection systems.
Figure 25:
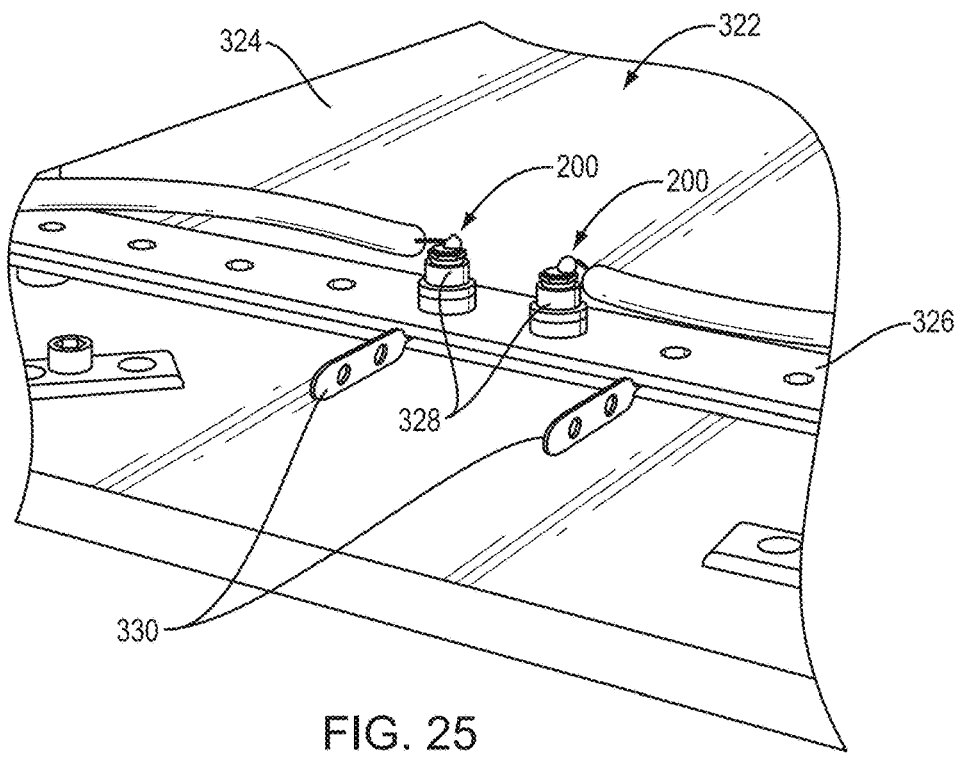
FIG. 25 is a detailed view of a test setup including two fasteners for experimentation of exemplary damage detection systems.
Figure 26:
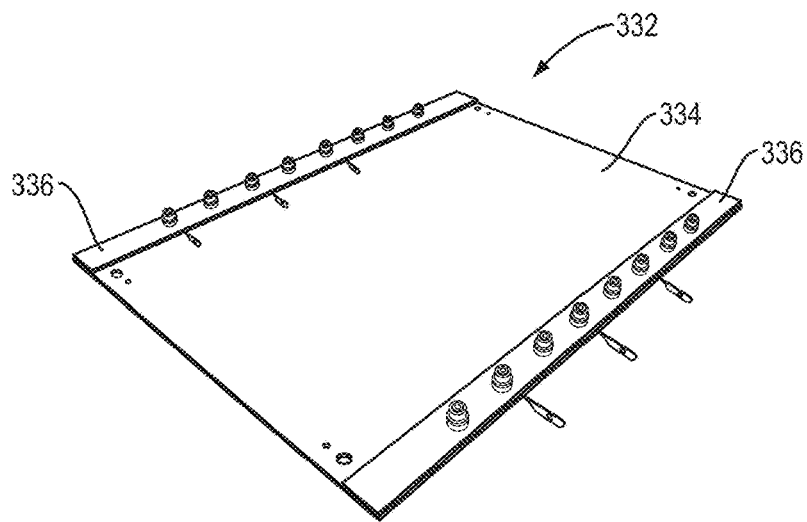
FIG. 26 is a perspective view of a test setup including a full plate with sixteen instrumented rivets and shims for experimentation of exemplary damage detection systems.
Figure 27:
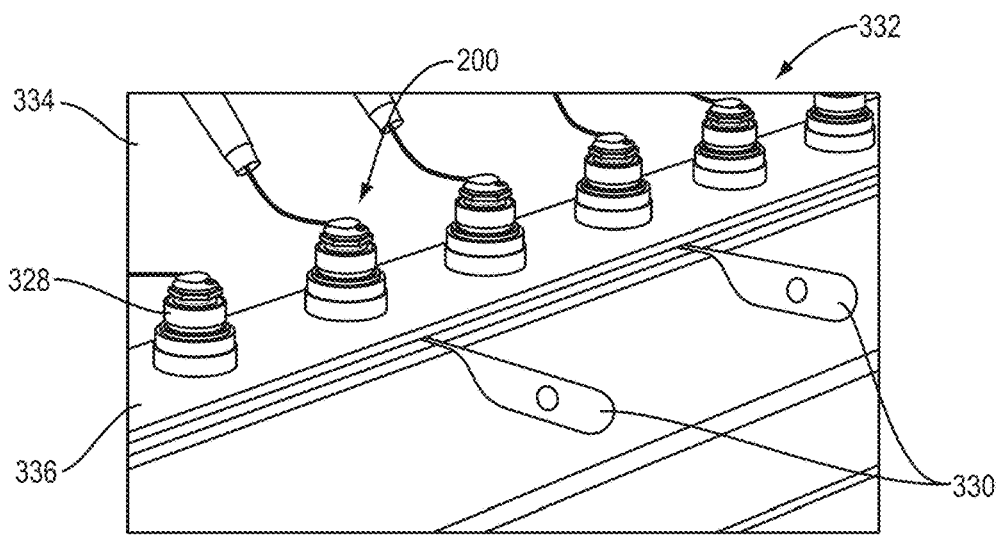
FIG. 27 is a detailed view of a test setup of FIG. 26.

FIGS. 24 and 25 show perspective and detailed views of a test setup 322 for experimentation of an embodiment of the unit 200. The test setup 322 was designed to more fully characterize the behavior of the selected sensor assembly configuration. Specifically, test setup 322 assisted in measuring wave speed, attenuation rate (i.e., detection range), and effect of damage near a rivet. A larger plate 324 was assembled that more closely resembled the final test design, with a 12 inch×12 inch bottom plate (not visible) with ¼ inch holes at an approximately 1.5 inch pitch, assembled with two strips 326 of 1 inch wide aluminum stacked at either end. Each plate was approximately 1/16 inches thick. Three HI-LOK™ rivets 328 were installed, two adjacent ones in the middle of one end, and one directly opposite the pair, forming an L-shaped configuration In the middle sheet of aluminum, approximately 0.03 inch×0.01 inch channels were machined leading away from the rivet hole to simulate a crack.

Steel shims 330 were chemically etched to the same dimensions of the channels with a wider grip area at the end, and were pressed into the channels using an arbor press as seen in FIG. 25. The intention was to collect a baseline signal with the shim 330 intimately pressed into the channel, and then use the grip end to pull out the shim forcefully to simulate crack growth. As seen in FIG. 25, one shim 330 was installed behind the rivet at the "elbow" of the L shape, and a second shim 330 was placed in an empty hole on the opposite side of the adjacent rivet. Data was collected using each of the three rivets as a 100 kHz actuator one at a time, while collecting at the other two positions as sensors. A baseline signal was collected, data was again collected after each shim 330 was removed, and a new baseline was collected the following day for comparison with the prior damage case. It should be noted that while the first pressed in shim 330 was held in tightly and required much force to remove, the adjacent shim 330 not behind a rivet readily slid out of the channel. The second shim 330 was therefore not expected to produce a changed signal because it likely was not compressed enough to be ultrasonically coupled to the plate.

Figure 28:
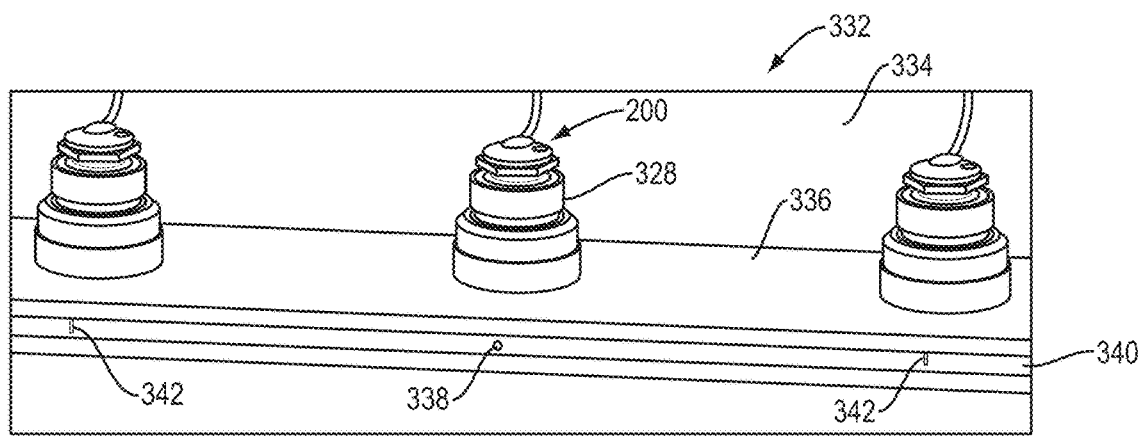
FIG. 28 is a detailed view of a test setup of FIG. 26, including simulated damage slots after shim removal.
Figure 29:
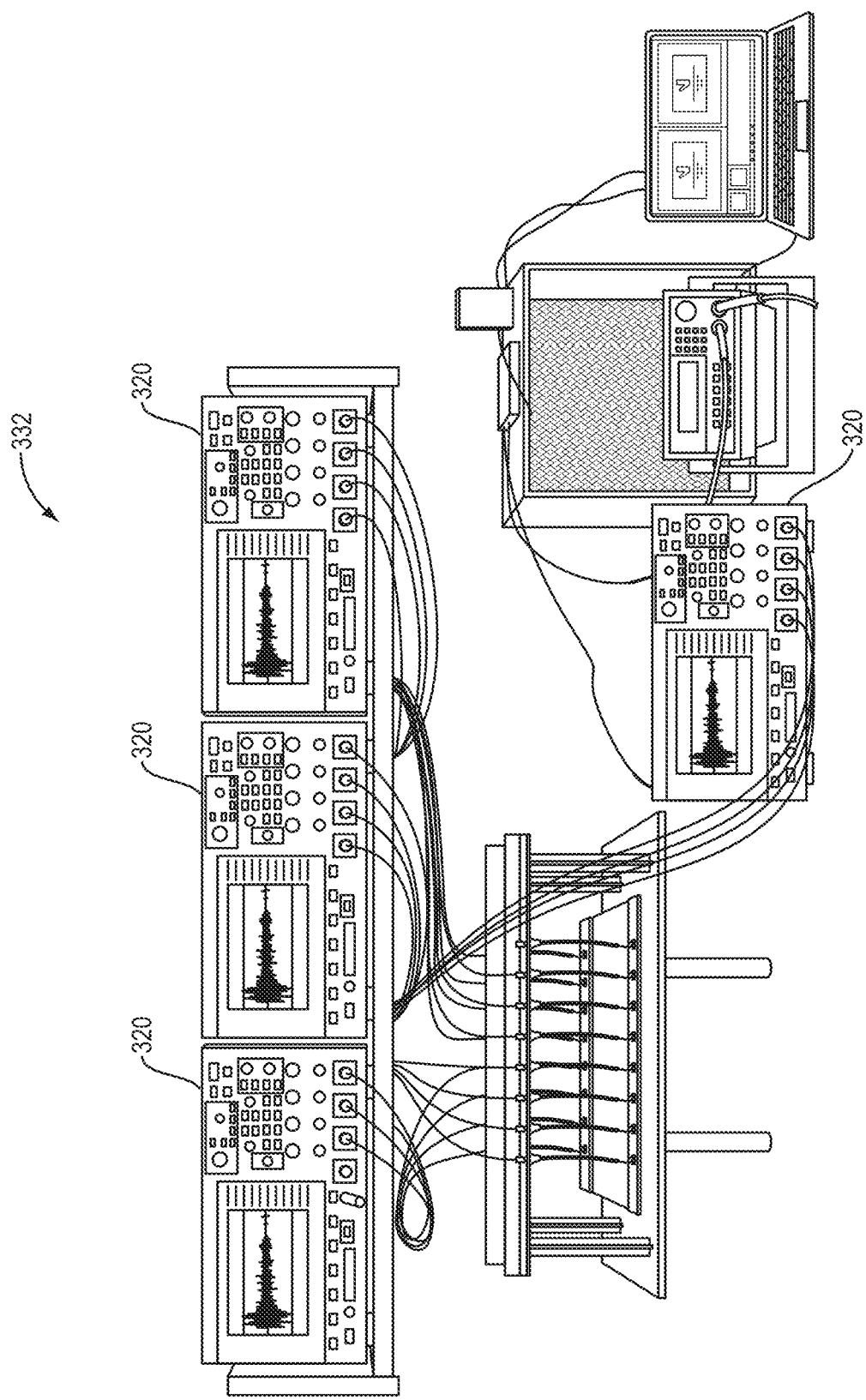
FIG. 29 is a front view of a test setup of FIG. 26, including networked oscilloscopes.
Figure 33:
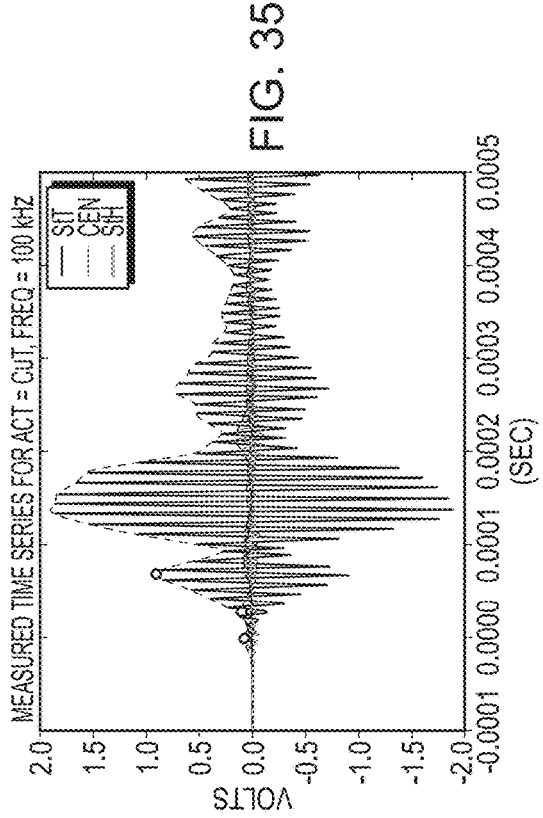
FIG. 33 is a graph of measured time for a hex-sensor element response with a top piezoelectric element actuation at 100 kHz.
Figure 34:
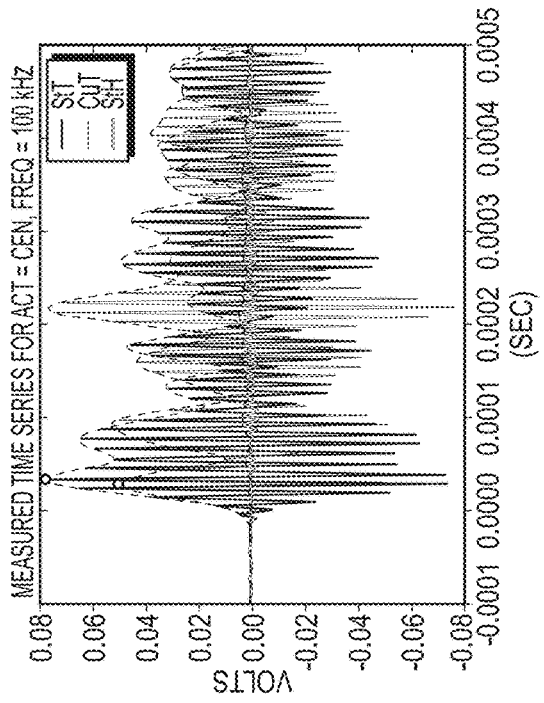
FIG. 34 is a graph of measured time for hex-sensor element response with a bottom piezoelectric element actuation at 100 kHZ.
Figure 35:
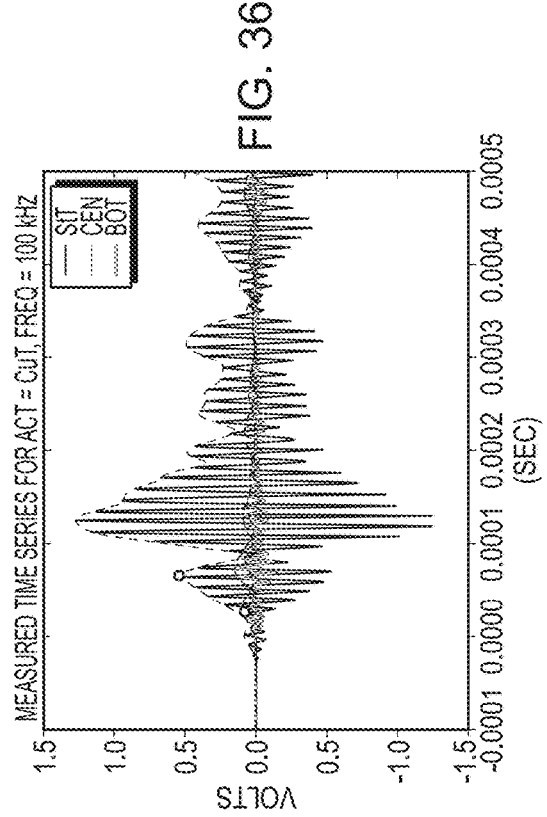
FIG. 35 is a graph of measured time for steel hex-type configuration response for a copper nail-type actuation at 100 kHz.
Figure 36:
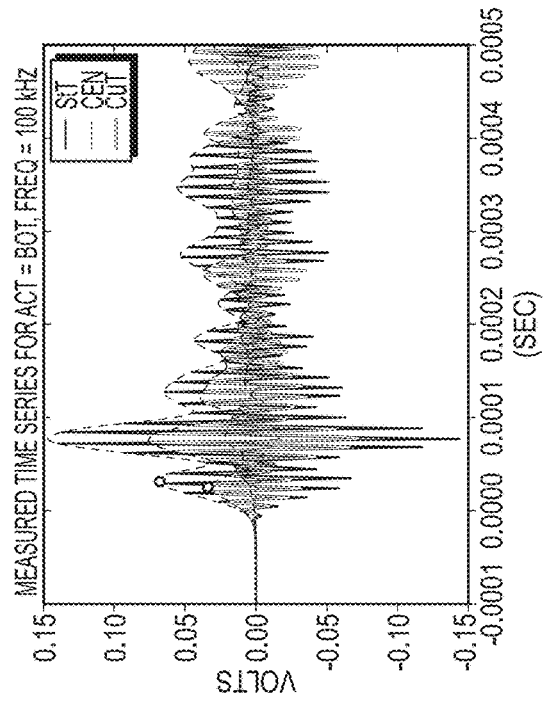
FIG. 36 is a graph of measured time for bottom piezoelectric element response for a copper nail-type actuation at 100 kHz.
Figure 39:
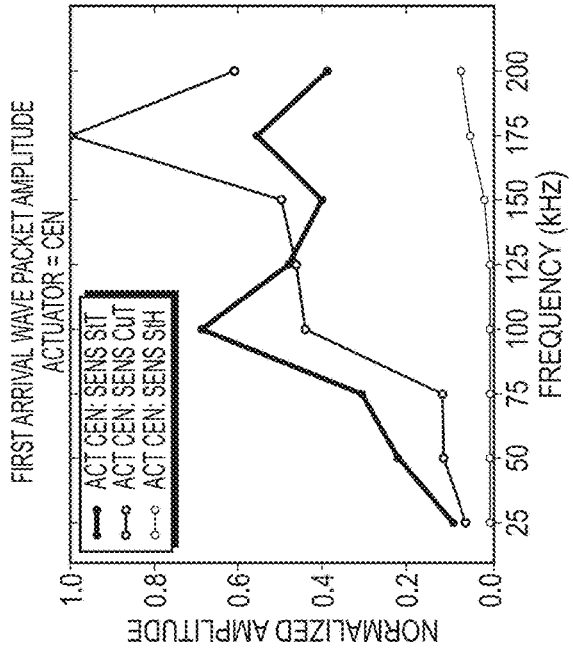
FIG. 39 is graph of frequency and normalized amplitude for a hex-sensor element response for a top piezoelectric element actuation at 100 kHz.
Figure 40:
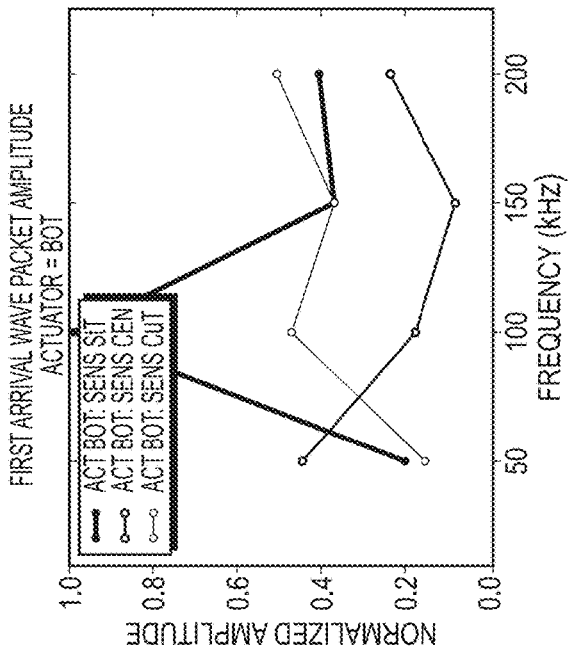
FIG. 40 is a graph of frequency and normalized amplitude for a hex-sensor element response for a bottom piezoelectric element actuation at 100 kHz.
Figure 37:
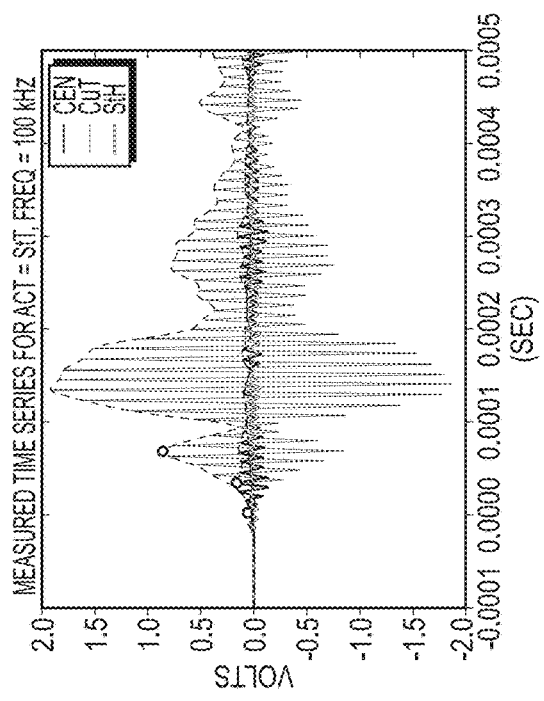
FIG. 37 is a graph of measured time for a steel hex-type configuration response for a steel nail-type configuration actuation at 100 kHz.
Figure 38:
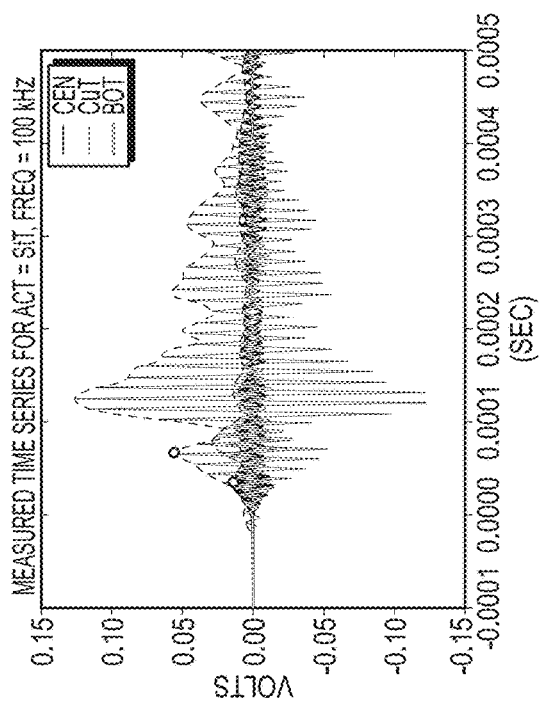
FIG. 38 is a graph of measured time for a bottom piezoelectric element response for a steel nail-type configuration actuation at 100 kHz.
Figure 41:
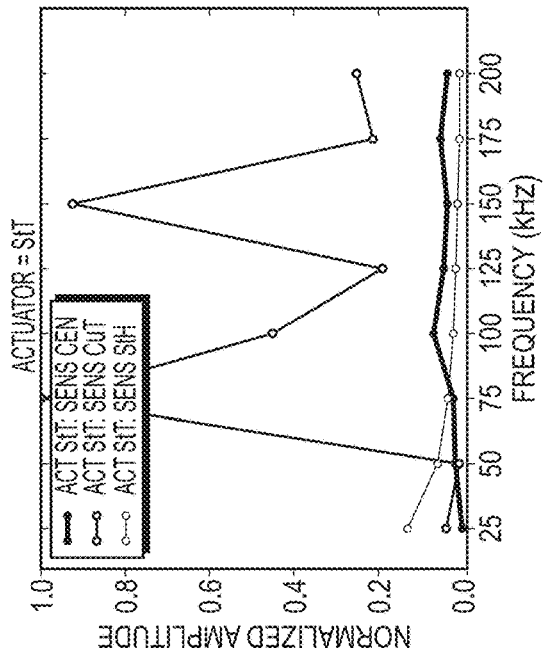
FIG. 41 is a graph of frequency and normalized amplitude for a steel hex-type configuration response for a copper nail-type configuration actuation at 100 kHz.
Figure 43:
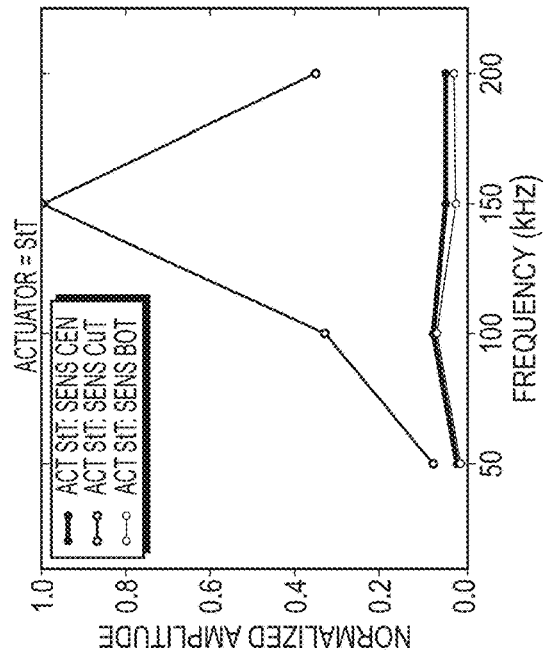
FIG. 43 is a graph of frequency and normalized amplitude for a steel hex-type configuration response for a steel nail-type configuration actuation at 100 kHz.
Figure 42:
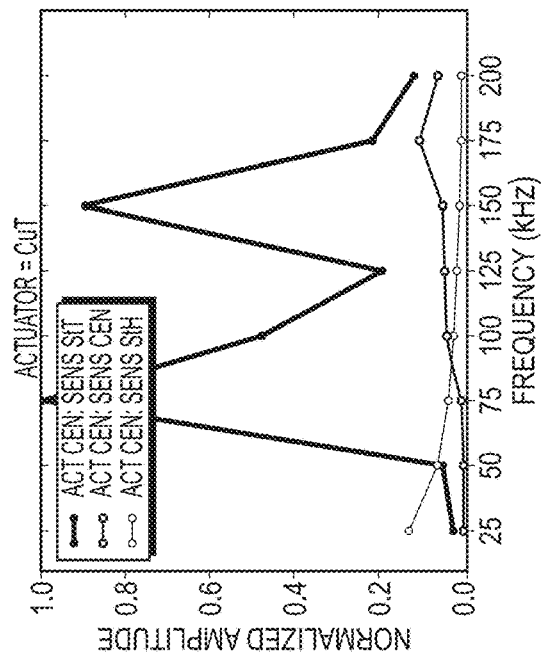
FIG. 42 is a graph of frequency and normalized amplitude for a bottom piezoelectric element response for a copper nail-type configuration actuation at 100 kHz.
Figure 44:
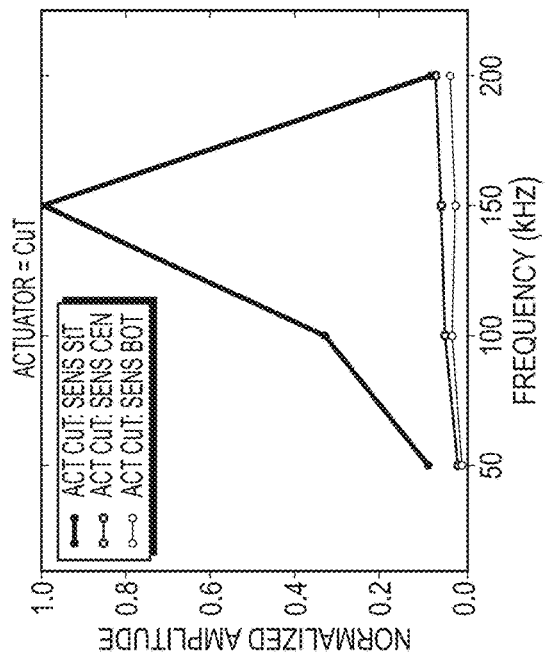
FIG. 44 is a graph of frequency and normalized amplitude for a bottom piezoelectric element response for a steel nail-type configuration actuation at 100 kHz.

FIGS. 26-29 show perspective, detailed and front views of a test setup 332 for experimentation of units 200. After it was determined that the ultrasonic waves radiating from the rivet positions could propagate across a 12 inch plate, and that the signals changed sufficiently due to detected simulated damage, a more elaborate proof-of-concept test setup 332 was conducted. In the test setup 332, a plate 334 12 inches wide by 18 inches long with a 1/16 inch aluminum base plate was used, with two 1 inch wide strips 336 of 1/16" doubler aluminum plates at either end. Two rows of HL-18 rivets 328 were installed with a 1.5 inch pitch, as seen in FIG. 28. Three channels were milled with pressed-in shims 330 (similar to the prior test) and integrated into the plate for alternating rivets (see, e.g., FIG. 27). The rivets were instrumented with hex-nail sensor assemblies (e.g., an embodiment of the unit 200) identical to those used in the feasibility testing experiments, using a gantry to strain relieve the cables as seen in FIG. 29.

Four 4-channel networked oscilloscopes 320 were used to simultaneously collect data from the 16 instrumented rivets (i.e., rivets that include an embodiment of the unit 200 coupled thereto), triggered by the 100 kHz 4.5 cycles sinusoidal burst excitation signal sent by the arbitrary function to the actuating rivet. Data was stored remotely by a laptop. For each damage case, each instrumented rivet was manually configured to be an actuator (by switching BNC connections) one at a time while the rest of the transducers would be sensing (for the fielded unit this can be achieved using a simple multiplexing circuit). Shims 330 were removed one at a time, left to right. It is noted that two of the shims 330 broke without moving and, therefore, no signal change was expected at such locations. Three holes 338 were drilled sequentially using a 1/32 inch precision bit in the center of the middle layer 340 behind the rivet and between those configured with channels 342 and shims as seen in FIG. 28 and the diagrammatic view of FIG. 30, for a total of four damage cases (e.g., one shim and three holes). Particularly, in FIG. 30, reference to "Shim" locations refers to the channels 342 provided with shims, and reference to "Drill" locations refers to the drilled holes 338 in the middle layer 340.

The experimental objective for the testing discussed above was to determine the feasibility of exciting and receiving guided ultrasonic waves through the use of an existing rivet structure. The following abbreviations are using in the analysis graphs shown in FIGS. 31-44. "Cen" refers to a center piezoelectric sensor element mounted at the top (see, e.g., FIGS. 11 and 12); "Bot" refers to a center piezoelectric sensor element mounted a the bottom (see, e.g., FIGS. 13 and 14); "CuT" refers to a copper substrate having a nail-type configuration (see, e.g., FIGS. 11 and 12); "StT" refers to a steel substrate having a nail-type configuration; "StH" refers to a steel substrate having a hex-type and plate-type configuration (see, e.g., FIGS. 13 and 14); "Act" refers to actuator; and "Sens" refers to sensor.

As an initial approach, the theoretical Lamb modes were calculated for the top plate layer (thickness of 0.0625 inches) to find that the A0 and S0 modes are the only propagating Lamb modes until about 1 MHz. Generally, guided wave modes induced with a piezoelectric disc have the greatest transfer of energy into the structure below 200 kHz. Because of this, a Hanning windowed sinusoid with center frequency of [25, 50, 75, 100, 125, 150, 200] kHz was selected as an input signal. To determine if induced signals from the transducers are similar to Lamb waves, the first arrival wave packet was isolated and time of flight was used to calculate group velocity. The calculated group velocity was then compared to theoretical A0 and S0 mode group velocities.

FIGS. 31 and 32 plot the theoretical A0 and S0 Lamb mode group velocity along with the calculated group velocity of the first arrival wave packet for the central two transducers as actuators. FIGS. 33-38 show the received guided wave signal at 100 kHz for the various actuator and sensor combinations. In each plot, the received signal envelope is shown along with the estimated first arrival wave packet amplitude indicated by a black point. The location in time of this peak is used along with the known propagation distance to calculate the group velocity of wave packet. FIGS. 39-44 show the normalized amplitude of the received first arrival packet for the various sensor actuator combinations versus frequency.

Figure 45:
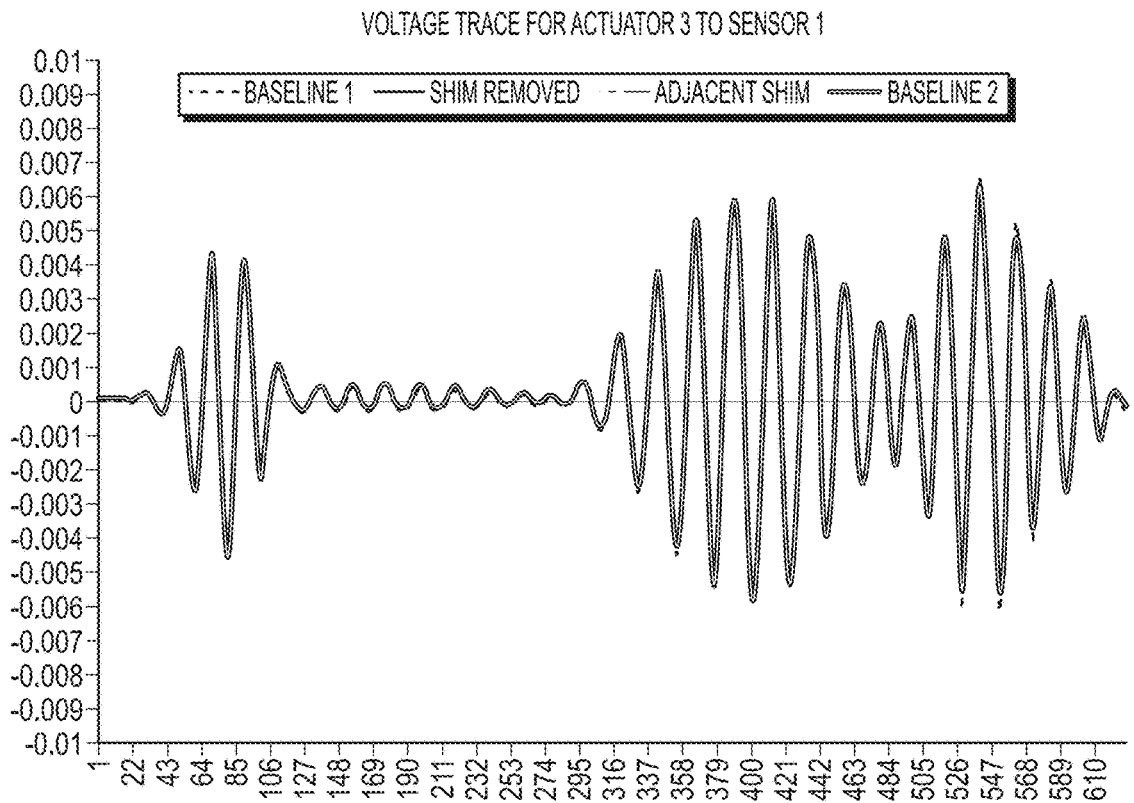
FIG. 45 is a graph of time traces for instrumented rivets 12 inches apart with a damaged rivet sensing.
Figure 46:
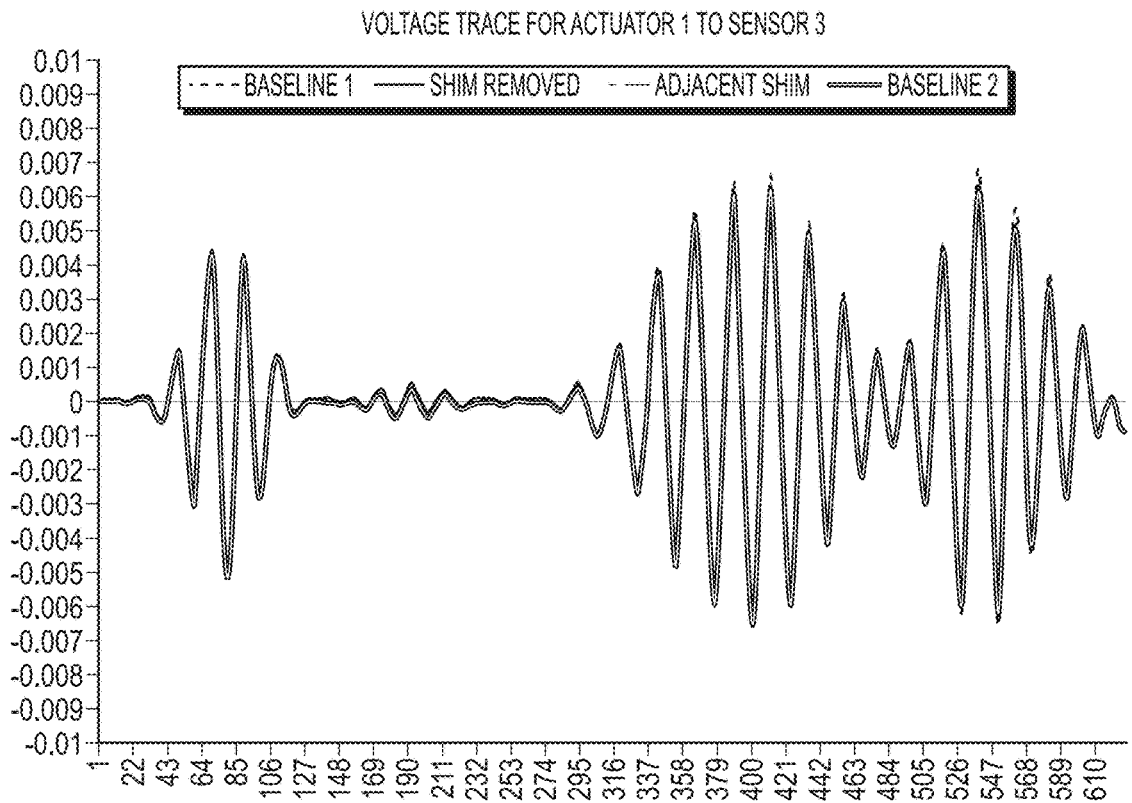
FIG. 46 is a graph of time traces for instrumented rivets 12 inches apart with an undamaged rivet sensing.
Figure 47:
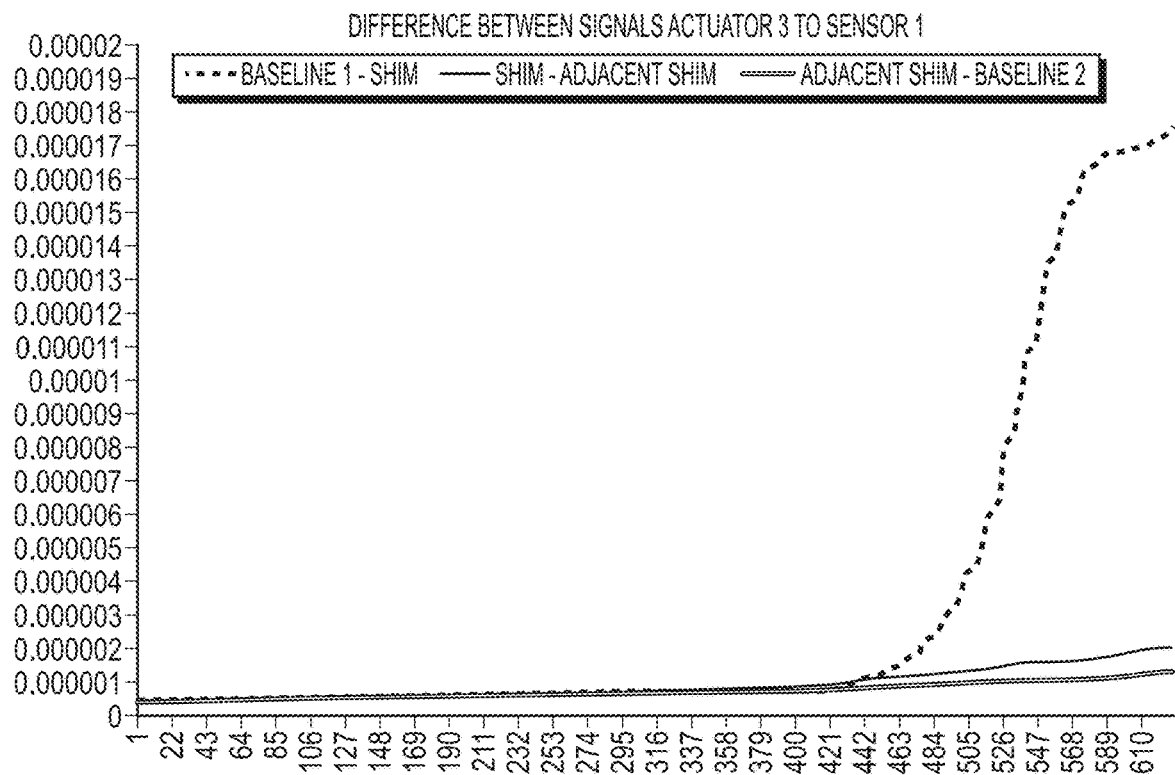
FIG. 47 is a graph of subtracted signals for instrumented rivets 12 inches apart with a damaged rivet sensing.
Figure 48:
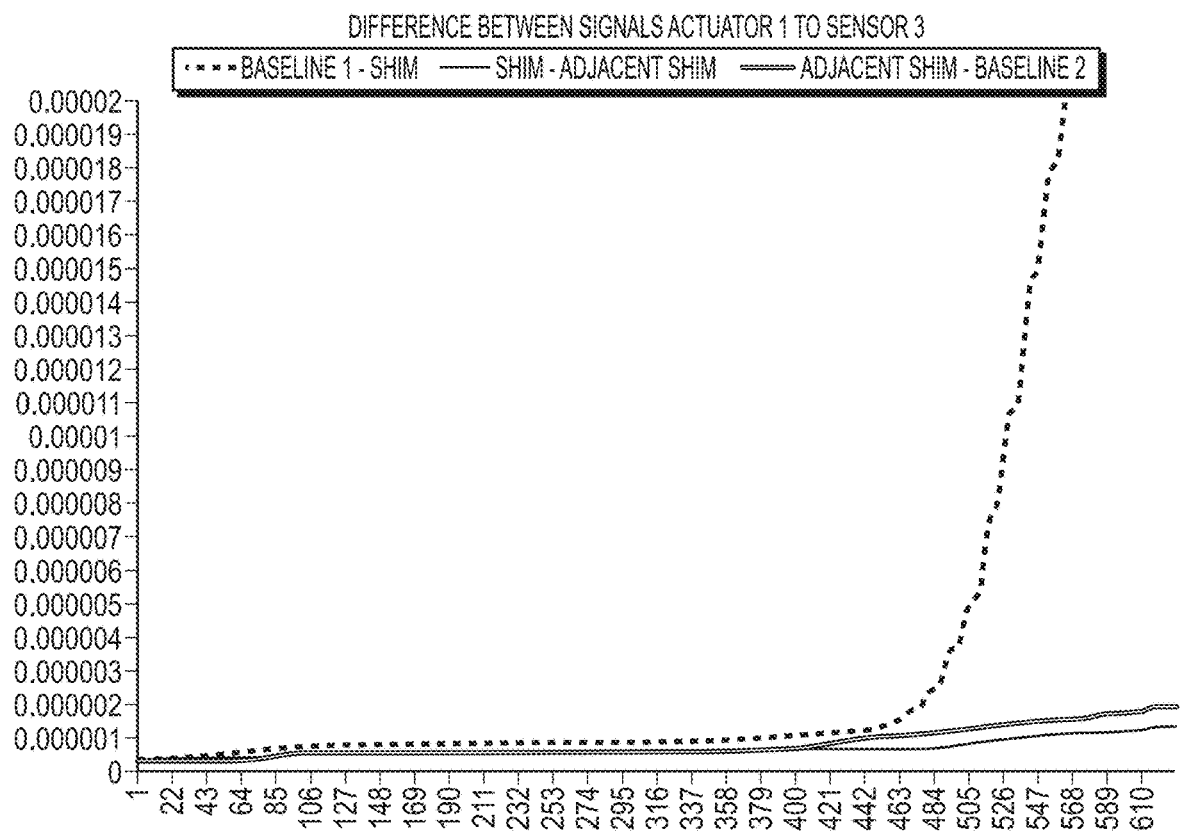
FIG. 48 is a graph of subtracted signals for instrumented rivets 12 inches apart with an undamaged rivet sensing.

From the feasibility portion of testing, it was concluded that the waves were propagating in each layer of the assembly, and the steel "nail-type" configuration (e.g., unit 200 of FIGS. 11 and 12) provided the optimal results. The goal of the subsequent round of testing was to establish the ability of waves generated and received by the hex-nails (e.g., the substrate 204 of FIGS. 11 and 12) to propagate 12 inches or more, and to establish the ability of the sensors to detect changes caused by introduction of representative flaws. FIGS. 45 and 46 show the time traces for waves propagated between the furthest actuator with the damaged rivet sensing (FIG. 45) and vice-versa (FIG. 46). Overlaid are four traces representing the initial baseline signal after the first shim was removed, the signal after the second shim was removed, and a second baseline collected the following day. FIGS. 47 and 48 are subtracted differences between each of the four data sets. As can be seen in FIGS. 47 and 48, while there is nearly no difference once the second shim was removed (expected since there was no retention force) nor in the second baseline, there was a significant change in the third wave packet following the first shim being removed. It is believed that the third wave packet is most affected because the first two arrivals are the A0 and S0 modes and the third wave is a reflection that has passed through the damaged area before passing through the sensing rivet.

Figure 52:
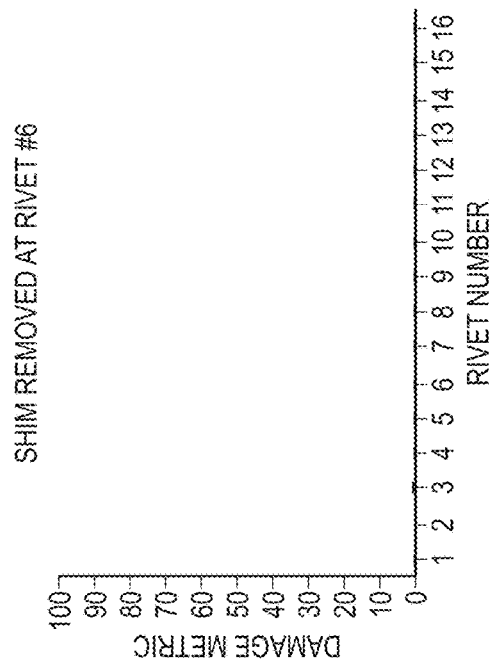
FIG. 52 is a graph showing a damage metric indicating no damage over a threshold metric value for a shim that broke adjacent to rivet #6 of FIG. 30.
Figure 49:
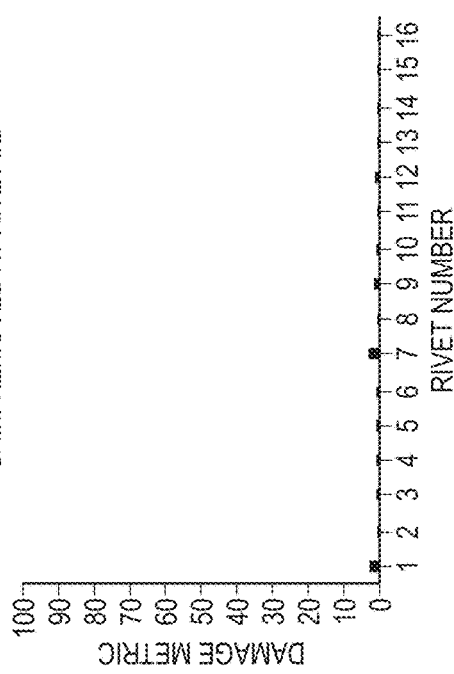
FIG. 49 is a graph of a damage metric indicating no damage over a threshold metric value detected for a shim that broke adjacent to rivet #2 of FIG. 30.

The final experiment discussed above sought to demonstrate the full proof of concept for damage detection using the proposed hex-nail sensors. The first three damage cases attempted were removal of shims pressed into narrow channels as seen in FIG. 30. In the prior characterization experiment, the shim removal worked well for a channel behind a rivet, but easily slid out of a channel where there was no rivet. The opposite issue was experienced in the final experiment, where the shims were too snugly held in the channels when assembled with all eight rivets on the same plate. The first and third shim simply snapped while attempted to pull them out, without any apparent movement in the channel. This can be seen in FIGS. 49 and 52, where virtually no damage metric was recorded for the shims near rivets 2 and 6 (see, e.g., FIG. 30).

Figure 51:
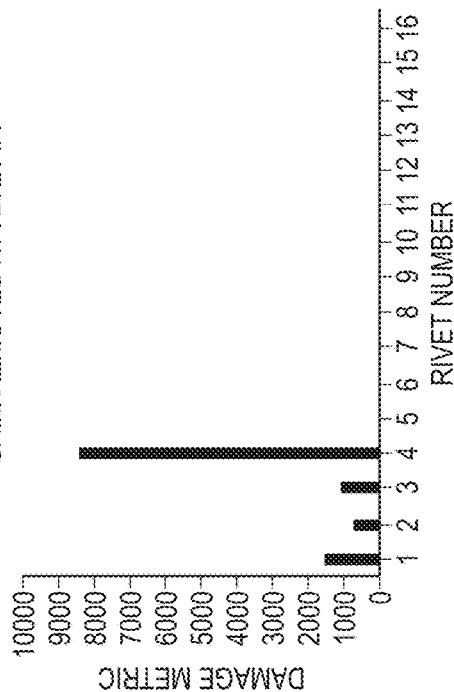
FIG. 51 is a graph showing a zoomed out version of FIG. 50 to illustrate damage indicated correctly near rivet #4 of FIG. 30.
Figure 50:
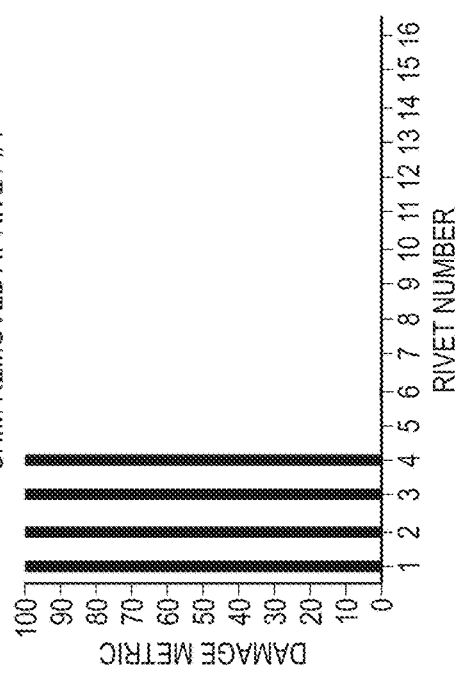
FIG. 50 is a graph of a damage metric indicating strong damage following shim removal adjacent to rivet #4 as detected by sensors 1-4 of FIG. 30.
Figure 55:
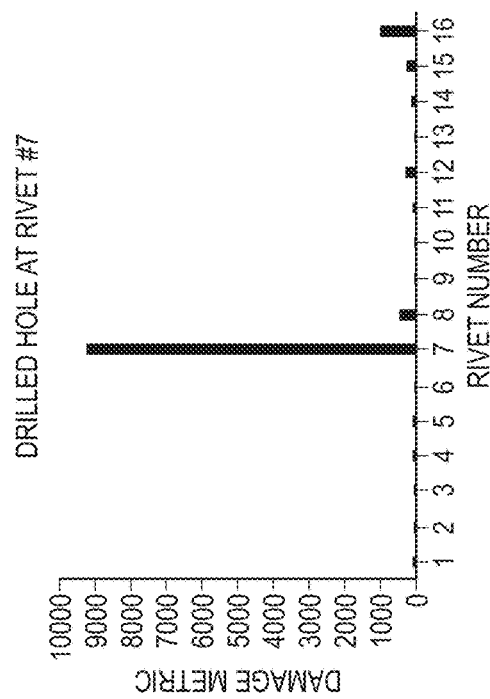
FIG. 55 is a graph showing a damage metric indicating drilled hole damage correctly over a threshold metric value adjacent to rivet #7 of FIG. 30.
Figure 53:
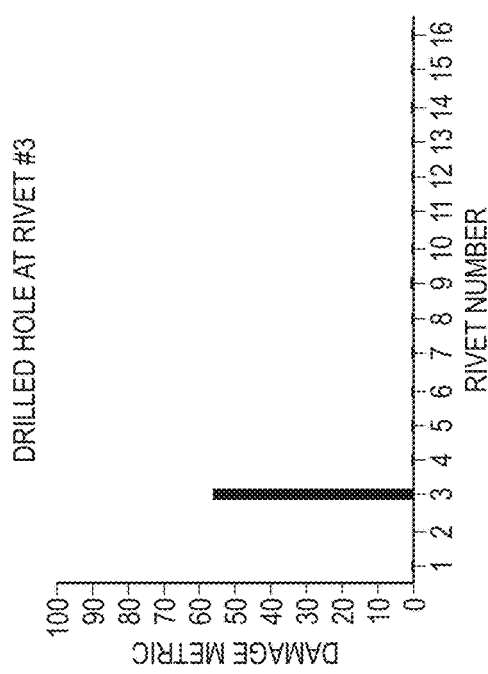
FIG. 53 is a graph showing a damage metric indicating drilled hole damage correctly over a threshold metric value adjacent to rivet #3 of FIG. 30.
Figure 54:
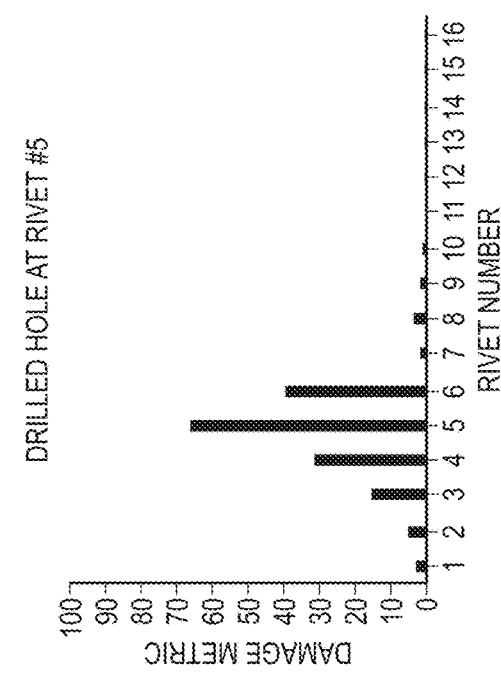
FIG. 54 is a graph showing a damage metric indicating drilled hole damage correctly over a threshold metric value adjacent to rivet #5 of FIG. 30.

For the middle case of rivet 4, it can be seen in FIG. 50 that a significantly pronounced damage metric was calculated for rivets 1-4. However, in FIG. 51, it can be seen that rivet 4 still had roughly twice the metric of the adjacent sensors. In order to detect further damage cases, 1/32 inch holes were drilled behind rivets 3, 5 and 7 (see, e.g., FIG. 30). As seen in FIGS. 53-55, the correct rivet was properly identified in each case with the maximum damage metric (all on the same scale). For the first and third holes drilled, only the rivet near the damage showed a high damage metric, with the others being well below the threshold value. For the middle case near rivet 5, relatively strong damage indications were also calculated for both adjacent sensors (rivets 4 and 6 were about 50% of the rivet 5 value). These results clearly demonstrate the ability to reliably detect subtle hidden damage in riveted assemblies when the exemplary damage detection units are incorporated into the rivets.

The experimentation and results demonstrated the ability to use pre-existing HI-LOK™ rivets with exemplary damage detection units as guided wave actuators and sensors to detect hidden damage in complex fastened joints. Multiple configurations and materials were explored, and the steel "nail-type" configuration (e.g., unit 200 of FIGS. 11 and 12) provided the most effective results. During experimentation, a hex shaft similar to the hex key used to hold the rivet pin during standard installation was used as a delay line to ultrasonically couple to the rivet, and a transducer was bonded to a larger hex-shaped head positioned outside of the hex recess. The resulting waves were close in velocity to the theoretical A0 Lamb wave modes. Central transducers placed on the middle and bottom plates demonstrated that the waves being generated by the nails were propagating in all layers. A few tests were also conducted sending waves from one pin-type transducer to another which resulted in high transmitted wave energy received between transducers spaced 2 inches apart.

After feasibility had been established for exciting each layer using the "nail-type" transducer design (e.g., unit 200 of FIGS. 11 and 12), the subsequent experiment was set up to determine the range of wave propagation in a layered medium, and to determine the feasibility to detect damage in the form of a representative crack. The same rivets and transducers were used as in the previous experiment, but the rivets were positioned 12 inches apart from each other. To represent a crack, a narrow (0.01 inch wide by 0.03 inch deep) channel was machined between the rivet hole and the back edge of the plate on the middle layer, and a similarly dimensioned steel shim was pressed into that gap. After a baseline was collected, the shim was forcefully removed from the assembly representing crack growth. Both the transducer adjacent to the damage and the transducer 12 inches away from the damage was able to detect the removed shim, thereby further emphasizing the ability to detect damage with the exemplary systems.

The subsequent experiment was similarly dimensioned, with two rows of eight rivets spaced by 12 inches. Channels were machined into three of the rivet holes to sequentially simulate multiple cracks while using the sensor array to beamform the resulting signal. Unfortunately, during testing the shims broke before they were able to be removed in the channel, resulting in no signal change. Therefore, a 1/32 inch bit was used to drill small holes in the middle of the central 1/16 inch aluminum plate near the rivet holes without shims. The results from this experiment showed that the exemplary systems are effective in detecting and localizing damage. The rivet mounted sensors are particularly sensitive to changes occurring around them, amounting to boundary condition changes for the pins. Thus, during use, a threshold value can be set after installation of the rivet(s) and subsequent testing can provide signals that reliably detect changes caused by damage, regardless of whether the damage is fatigue cracks and/or corrosion.

Additional testing was performed to demonstrate crack detection capability in a complex multi-layer fastened joint. FIG. 56 is a diagrammatic, cross-sectional view of a test specimen 350 including an exemplary unit 200. Eight variations of the multi-part test specimen 350 (e.g., a jointed test specimen (JTS)) were subjected to tensile fatigue. The specimens 350 were fundamentally similar, each including four plates, two inner plates 352, 354, and two outer plates 356, 358. The two inner plates 352, 354 each include a hole near one end for passage of the pin 302. The outer plates 356, 358 each have two holes for passage of both pins 302. The two inner plates 352, 354 are aligned vertically with the hole-ends near one another. A single specimen 350 was assembled from four plates by sandwiching the inner plates 352, 354 between two outer plates 356, 358, passing threaded HI-LITE™ pins 302 (e.g., HST12 pins) through all three layers, and securing the pins 302 with threaded collars 300 (e.g., HST1087 collars) (see, e.g., FIG. 56).

In some variations of the specimen 350, a washer 360 (e.g., NAS1149-D0432J washer) was inserted between the collar 300 and the inner plate 354 and/or a carbon fiber spacer 362. Fiberglass grip tabs 364 were included on the ends of the inner plates 352, 354 opposing the fastener assembly. All interfaces of the specimen 350 were coated with AMS 3265 sealant. Crack starter notches were cut into the inner diameter of one or more holes in each specimen to facilitate quick crack initiation. The eight different specimen configurations were formed by varying starter notch type and location, plate material, plate thickness, and the presence or absence of a carbon fiber spacer.

Five stages of testing were performed to provide the desired results. First, a test specimen similar to a 1XX-series specimen was fabricated and instrumented with two piezoelectric-based fastener SHM sensors. The specimen was used to characterize the influence of sealant on pitch-catch performance, as well as the effect of looser hole dimensions (as compared to testing using a press fit between the electromechanical unit and pin).

One of each specimen type (plus extras) were assembled without instrumentation and tested in tensile fatigue until failure. Such testing included two required "baseline" specimens. The testing was used to verify occurrence of failure under reasonable loads and cycle counts, and permitted validation of all test setups before testing instrumented samples. If crack initiation took too long at this stage, adjustments were made prior to further testing.

At least three of each specimen type were assembled, instrumented with exemplary electromechanical units, and tested under tensile fatigue. Testing was regularly paused for data collection from the SHM fastener sensors. The test was stopped when confident that a crack had grown. The testing refined and calibrated damage detection algorithms to accommodate a crack/no-crack criteria, using a binary decision tree pattern recognition algorithm based on guided wave features. Subsequently, the specimens were tested until sensors detected crack initiation, at which point testing was ceased and specimens were further analyzed.

Figure 57:
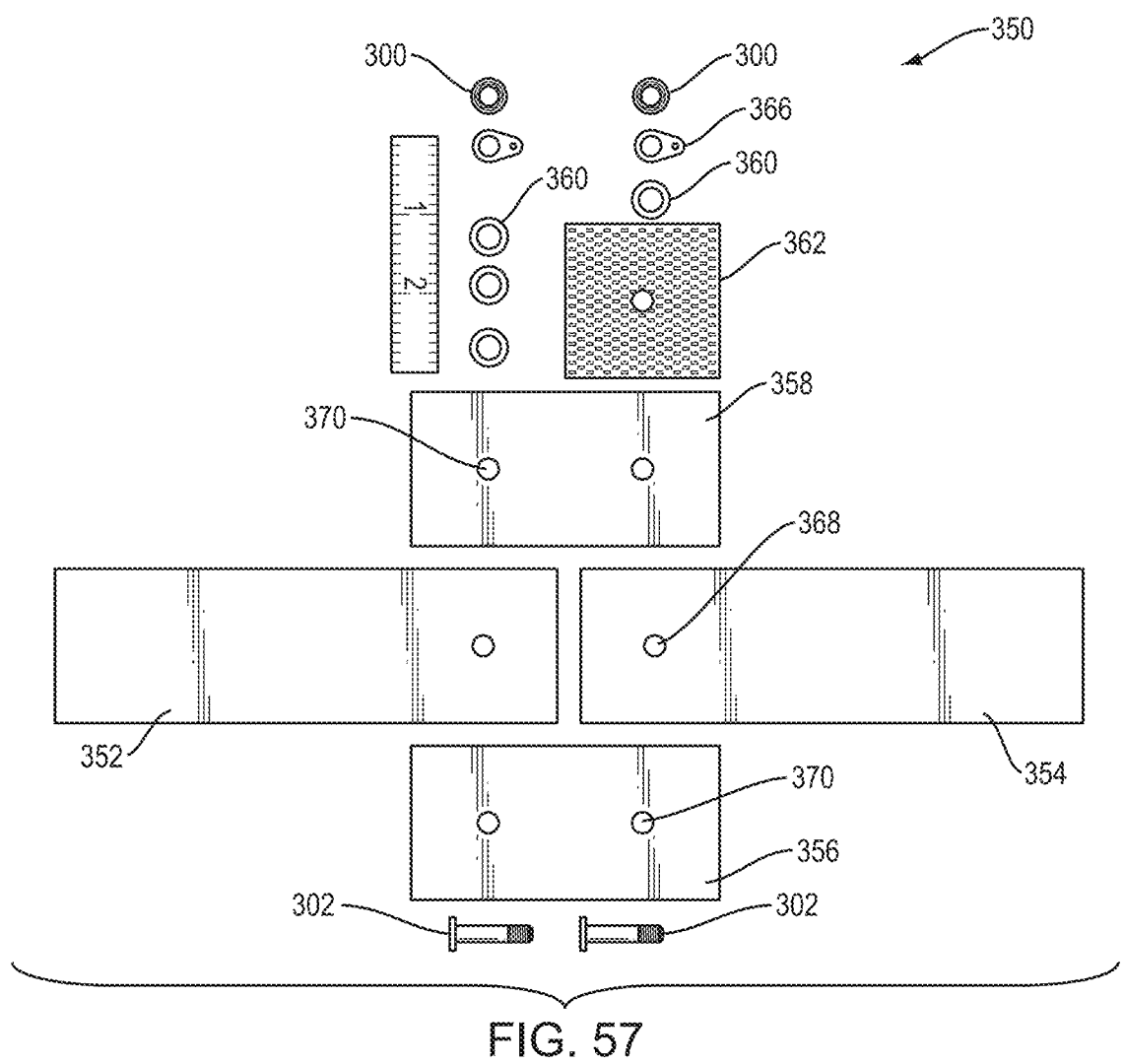
FIG. 57 is a top view of components for assembly of a test specimen of FIG. 56.
Figure 58:
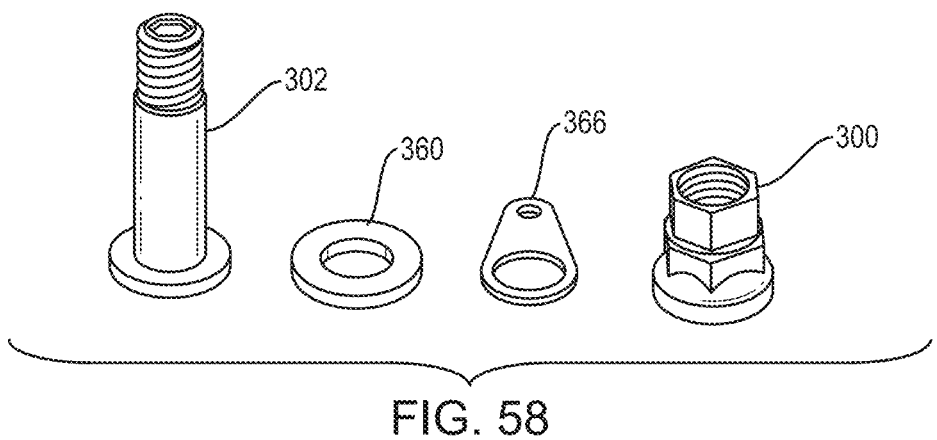
FIG. 58 is a perspective view of fastener components for assembly of a test specimen of FIG. 56.

FIGS. 57 and 58 show top and perspective views of components for assembly of the test specimen 350 (see, e.g., diagrammatic representation of FIG. 56). The inner plates 352, 354 include a hole 368 near one end and the outer plates 356, 358 each include two holes 370. The specimen 350 was assembled by sandwiching the inner plates 352, 354 between two outer plates 356, 358 and passing HI-LITE™ pins (HST12-8-11) through all layers and securing them with HI-LITE™ collars (HST1087-8). Washers 360 (NAS 1149-D0463J) and solder lugs 366 (Keystone Electronics 4712) were added between the collar 300 and outer plates 356, 358. The washers 360 were used to fill up the grip length on the HI-LITE™ pins 302 left from the variations of the specimens 350. Three washers 360 were used on all HI-LITE™ pins 302 in the absence of a carbon fiber spacer 362. With the presence of a carbon fiber spacer 362, one washer 360 was used to keep overall pin 302 length and presence of washers 360 constant. Solder lugs 366 were inserted into the stack up to provide a surface for more reliable electrical connection. All interfaces of the specimen 350 were coated with sealant (AMS 3265). Eight different specimen 350 configurations were used, with variations in starter notch type and location, plate material, plate thickness, and presence or absence of a carbon fiber spacer. Upon receipt of the specimen 350 components, all parts were measured to ensure that all tolerance specifications were met.

Figure 59:
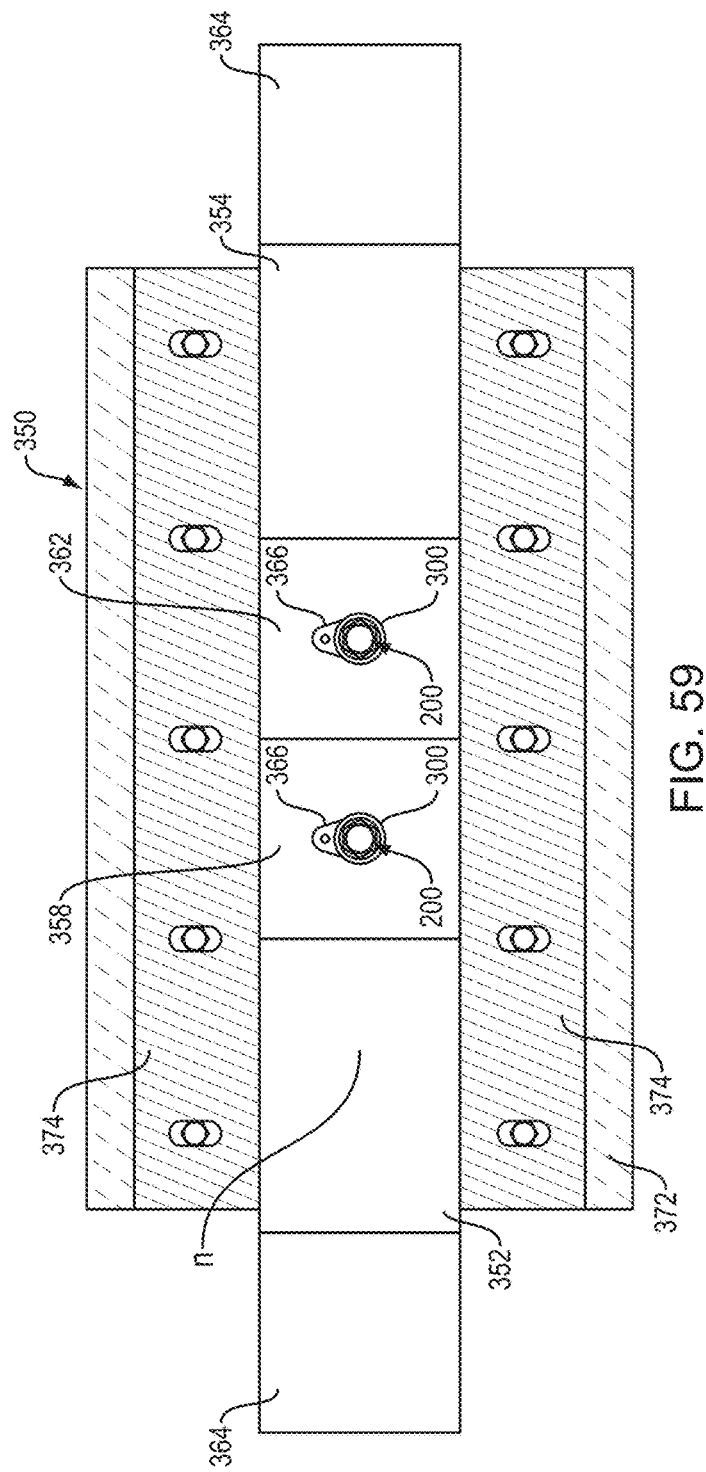
FIG. 59 is a top view of an experimentation setup including a test specimen of FIG. 57 without an exemplary damage detection system.
Figure 60:
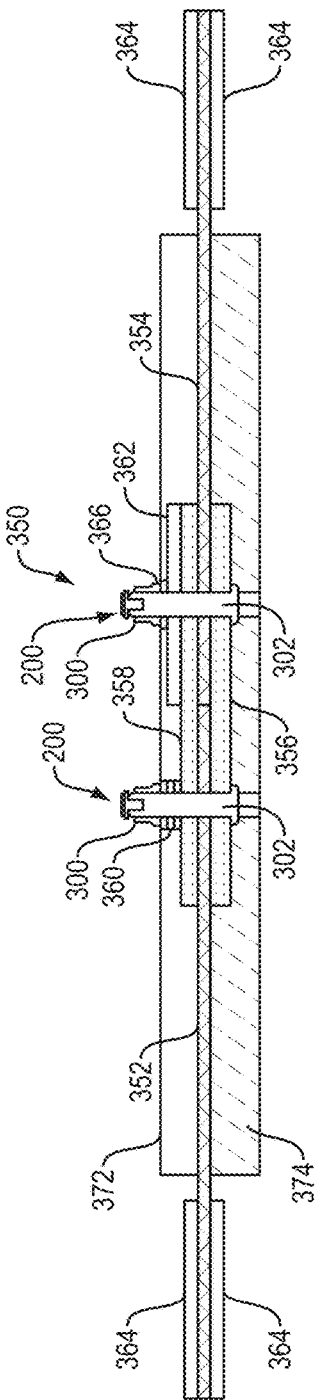
FIG. 60 is a cross-sectional view of an experimentation setup including a test specimen of FIG. 57 without an exemplary damage detection system.
Figure 61:
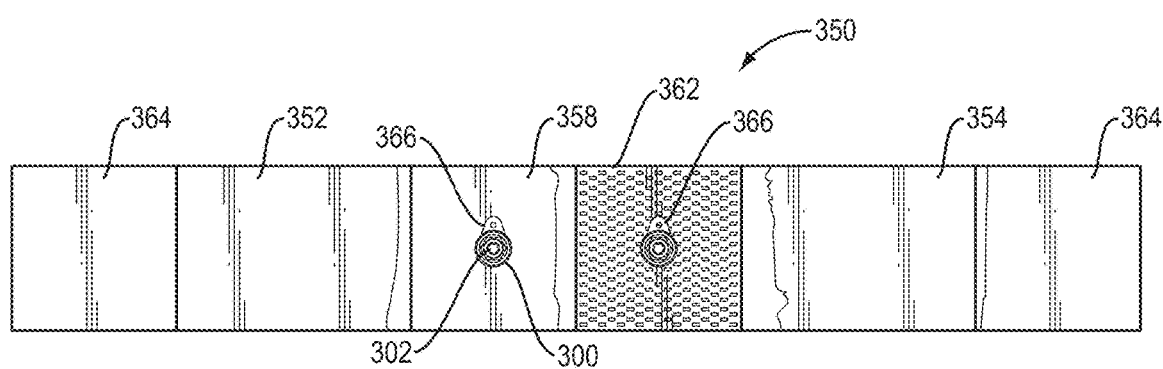
FIG. 61 is a top view of an assembled test specimen without an exemplary damage detection system.
Figure 62:
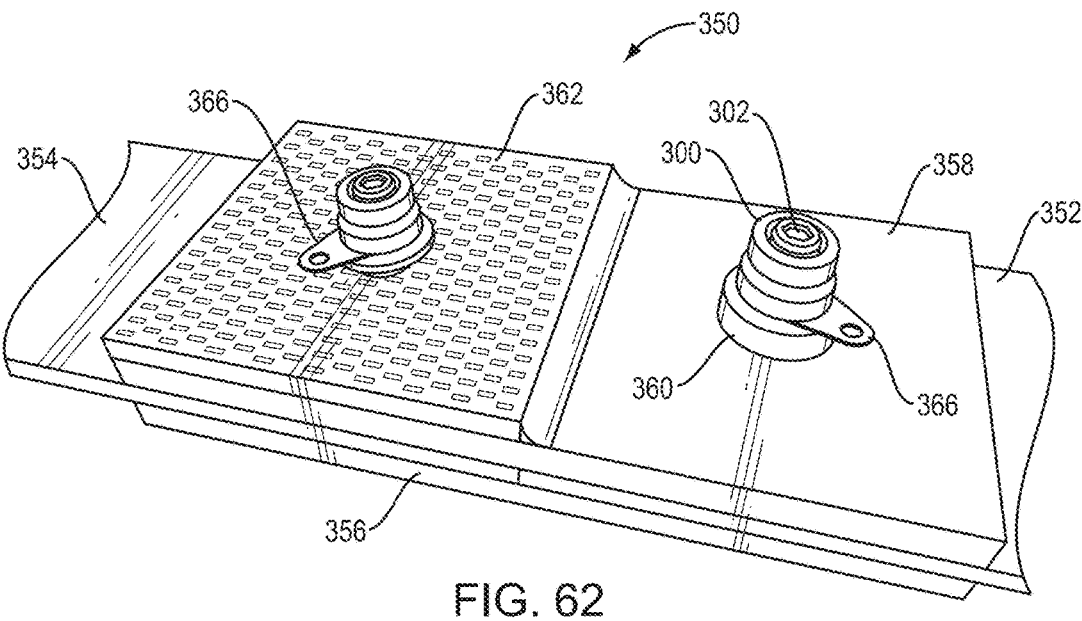
FIG. 62 is a detailed view of an assembled test specimen without an exemplary damage detection system.
Figure 63:
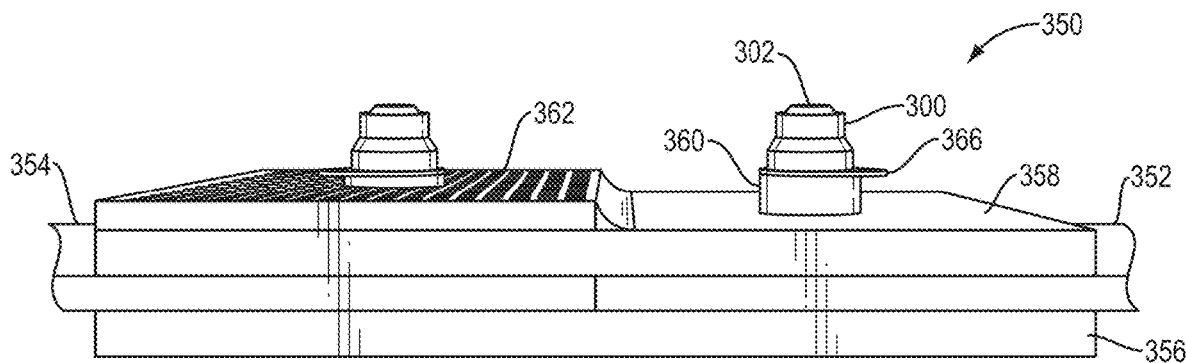
FIG. 63 is a front view of an assembled test specimen without an exemplary damage detection system.
Figure 64:
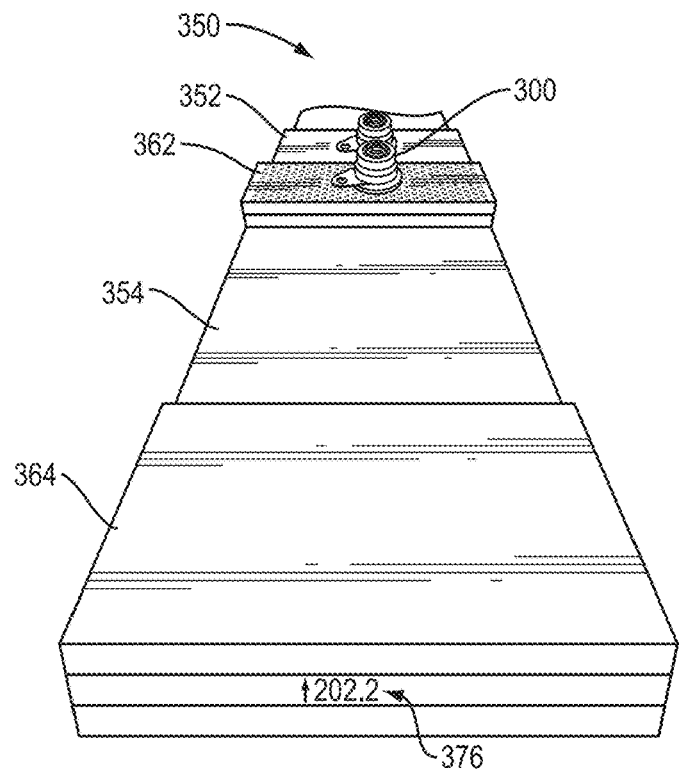
FIG. 64 is a side view of an assembled test specimen without an exemplary damage detection system and including an engraving.
Figure 70:
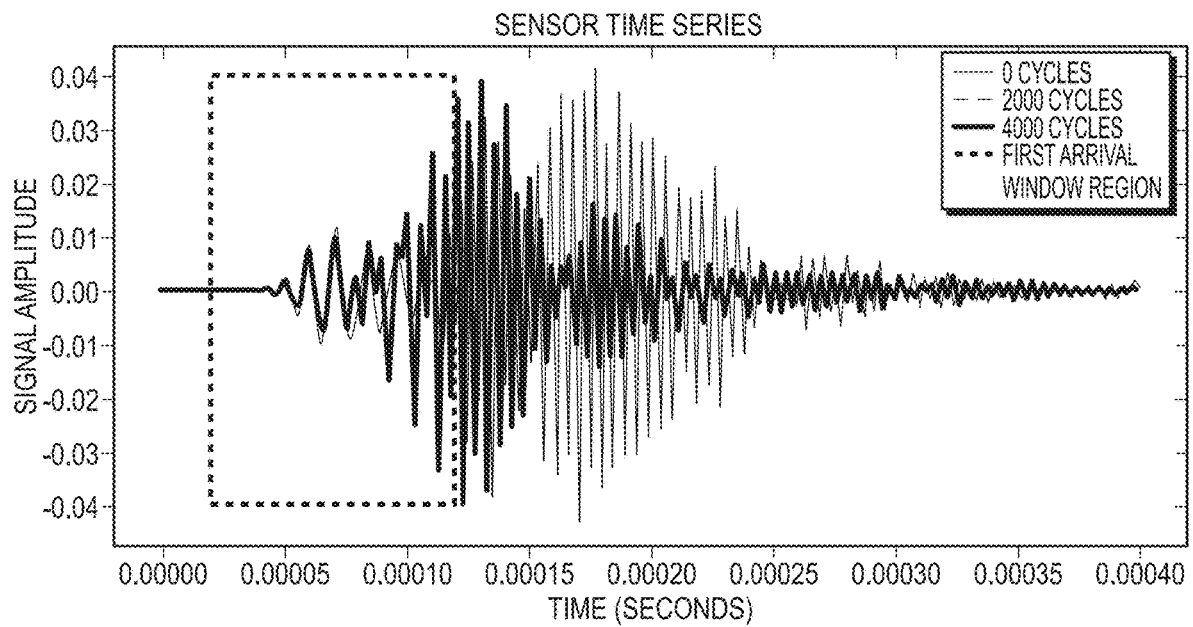
FIG. 70 is a graph of sensor time series along with an initial arrival window for metric data.

Prior to assembly, all fastening and transducer components were cleaned through a Branson 2510 Ultrasonic Cleaner. All plates were cleaned with a rag and acetone. Tooling was designed to ensure proper alignment of all components of the test specimen 350 during assembly. As shown in FIGS. 59 and 70, a base plate 372 and two aligning rails 374 were used to ensure proper alignment of all components during assembly. Prior to assembly, one rail was fixed down such that all components referenced the same fixed wall. The sealant was mixed and cured. Sealant was painted using an acid paint brush on the upper surfaces of all components to ensure that all faying surfaces were covered. The test specimen 350 was built from the bottom up as seen in FIGS. 59 and 60, including units 200. The shank of the HI-LITE™ pin was painted and then threaded through the outer plate. As each component was laid down, all faying surfaces were thinly coated with sealant. Care was taken to ensure that the hex recess of the HI-LITE™ pins remained sealant-free to ensure reliable electrical connection to the transducers.

After the entire stack up was assembled, the second aligning rail 374 was fixed to restrain movement and rotation of the specimen 350 in the Y-direction. The cut-out in the base plate 372 and HI-LITE™ pin prevented movement in the X-direction. Tightening the collar constrained movement of the components in the Z-direction, driving out excess sealant from the pin hole and ensured minimal alignment variation across all specimens 350. Collars were tightened using a Lang ROW-10 5/16 inch ratchet box wrench and Hex Plus keys. This allowed for a greater contact area between the hex recess and the hex key, which yielded a higher success rate compared to standard hex keys. After AMS 43265 sealant was fully cured, G10 grip tabs were bonding on using epoxy or adhesive. A thin layer of epoxy or adhesive was painted on using camel-hair paint brushes and left to cure under load for 24 hours at room temperature. Specimens 350 were engraved with their respective part numbers, indicating the type of specimen 350 as well as location of the notched hole. The specimens 350 were engraved with a carbide-tipped high strength electric engraver, and were engraved in the grip tab region such that the engraving would not change the stress conditions at the notch. FIGS. 61-64 show top, detailed, front and side views of the assembled test specimen 350, including the engraving 376 in FIG. 64.

Figure 65:
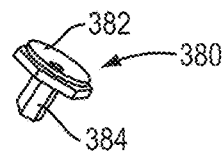
FIG. 65 is a perspective view of an exemplary damage detection system used with the test specimen of FIGS. 61-64.
Figure 66:
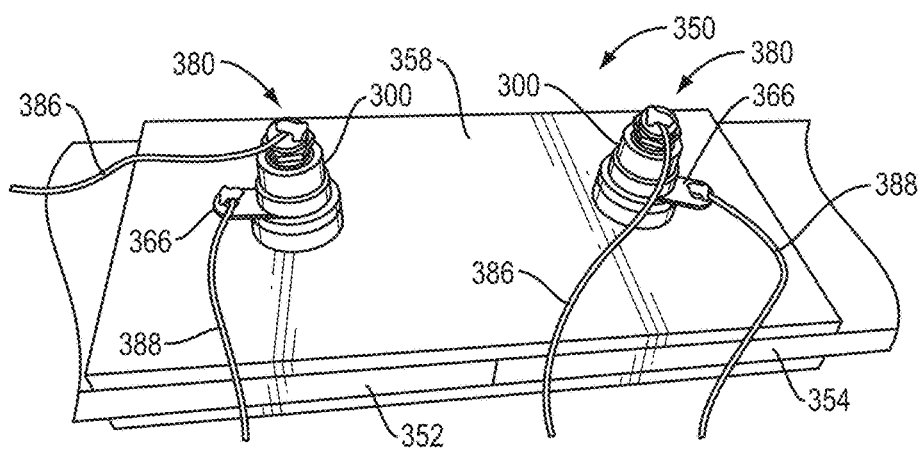
FIG. 66 is a perspective view of an assembled test specimen including an exemplary damage detection system.

As shown in FIGS. 65 and 66, the specimens 350 were instrumented with electromechanical units 380 (e.g., transducers) in a similar fashion as described above. The electromechanical units 380 were substantially similar in structure and function to the unit 200 of FIGS. 11 and 12, except for the distinctions noted herein. The transducer configuration interfaced with the walls and floor of the 0.132 inch wide by 0.160 inch deep hexagonal drive recesses or holes of the HST12-8-11 pin. The transducers or sensor elements 382 were circular piezoceramic elements measuring 0.250 inches in diameter and were cut from gold plated wafer stock. The sensor elements 382 were bonded to a substrate 384 using conductive epoxy at 125° C. for 120 minutes. The substrate 384 material was chosen as Ti-6AL-4V per AMS4967 to match the pin (HST12-8-11) material.

Transducers were bonded into the hex recess of the HI-LITE™ pins using a low viscosity epoxy and cured at room temperature for 24 hours. During bonding, care was taken to ensure that no air bubbles formed that would cause irregularities. While observing through a microscope, epoxy was injected into the floor of the recesses with a 27 gauge needle. The substrates 384 were inserted into the hex recess of the pin and allowed to cure under load to ensure good contact. Wires 386 were then bonded to the exposed plated surfaces of the piezoelectric elements with conductive epoxy and cured at 120° C. for 20 minutes. A ground wire 388 was soldered to the solder lug 366. After the desired electrical contact was verified by measuring resistance and capacitance, the wire joints were secured with Loctite 608 and cured at room temperature for five minutes. The wires were subsequently strain relieved.

Figures 67, 68, 69:
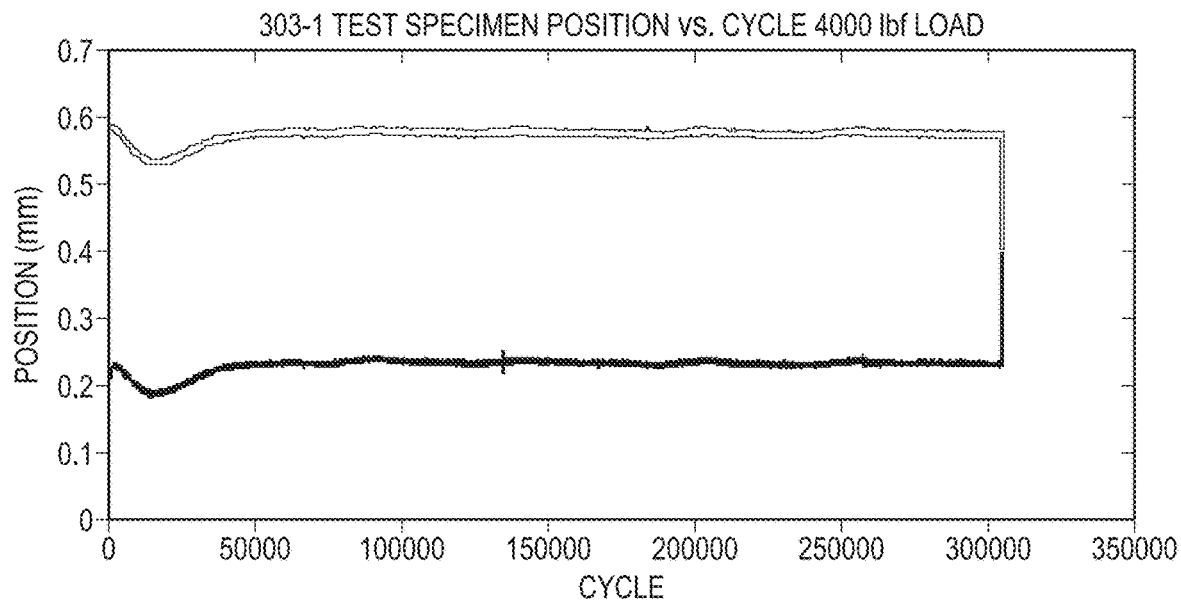
FIG. 67 is a graph of load history for a 303-1 test specimen having a maximum load of 4,000 lbf.
FIG. 68 shows a table of uninstrumented test results for multiple specimens.
FIG. 69 shows a table of instrumented calibration test results for 101, 102 and 202 specimens.

Testing in a loadcell having a maximum load capability of 11,000 lbf was performed. The specimen loading parameters assumed a stress ratio (R) of 0.1 and cycled below 10 Hz. Three uninstrumented specimens underwent tensile loading. Specimen 303-1 experienced 700,000 cycles with a maximum load of 3000 lbf. Subsequently, the load was increased to a maximum load of 4,000 lbf and an additional 300,000 cycles were run. The specimen did not fail. FIG. 67 shows a graph of the load history for the 303-1 specimen. Specimen 302-1 was run for 300,000 cycles with a maximum load of 3,000 lbf. An additional 220,000 cycles were run at the same maximum load before load was increased. 56,000 cycles at a maximum load of 4,000 lbf resulted in failure. Specimen 102-1 experienced 250,000 cycles and 400,000 cycles with no failure. Specimen 103 was run for 250,000 cycles at 4,500 lbf without failure, followed by another 250,000 cycles at 5,000 lbf without failure. Adjustments were made to loading parameters to achieve failure under reasonable loading and cycle counts.

A concern with testing at high cycle counts was that it would be challenging to pick practical points for sensor recording over such a large range without risking big steps in crack size, and only 250,000 cycles could be performed each day. Consistency of boundary conditions for specimens that fail over 250,000 cycles was a concern, and required multiple days of testing with un-gripping/re-gripping after each day. Both of the specimens that had experienced 500,000 to 1,000,000 cycles were corner notch electrical discharge matching (EDM) specimens (XX3), and it was determined that it would take too many cycles for the corner notch specimens to develop natural cracks to be practical for the test matrix and budget.

After such determination, an uninstrumented 102 specimen (e.g., without a electromechanical unit) was tested at 4,000 lbf for 250,000 cycles with no signs of failure. However, when the load was increased to 5,000 lbf, a catastrophic failure occurred within 5,000 cycles. A second uninstrumented 102 specimen was subsequently tested at 5,000 lbf and stopped at 50,000 cycles such that it could be confirmed that a natural fatigue crack was growing and, once disassembled, cracks of approximately ⅛ inch were observed. Based on these results, it was determined that 5,000 lbf was a good load level for successful and practical fatigue tests. Subsequently, the same load level of 5,000 lbf was tested for an uninstrumented 101 specimen which failed at 114,000. A second 101 specimen was stopped at 125,000 cycles to observe if there was a crack, and it was discovered that the specimen had a 0.18 inch crack. An uninstrumented 202 specimen was tested at the same 5,000 lbf load level, and completely failed at 45,000 cycles. Therefore, another 202 specimen was tested and stopped at 30,000 cycles to look for cracks and a 0.5 inch crack was found. Finally, two 302 specimens were tested at 5,000 lbf as well. FIG. 68 shows Table 1 with uninstrumented test results for multiple specimens, including the maximum loads, minimum loads, cycles and crack formation information.

Next, specimens were instrumented with electromechanical units and tested to calibrate a damage metric. FIG. 69 shows Table 2 with instrumented calibration test results for 101, 102 and 202 specimens. Since the 101, 102 and 202 specimens were mostly the same (identical parts assembled other than a single EDM notch for 101 versus dual notches for 102 and 202 specimens, and an additional carbon fiber spacer added onto the 202 stack-up), it was decided to proceed with the same test procedure and load level for these three sets of specimens, and it was assumed that the specimens would have the same or similar damage metrics. Two 202 specimens were tested to failure at 5,000 lbf while collecting data from the piezoelectric transducer rivet sensor. Two 101 specimens were tested, and the tests were stopped after 175,000 and 27,500 cycles, respectively, to observe the fatigue crack lengths at those metric levels for calibration purposes. Similarly, two 102 specimens were tested to 45,000 and 11,000 cycles and stopped to observe the cracks at those metric levels.

Figure 71:
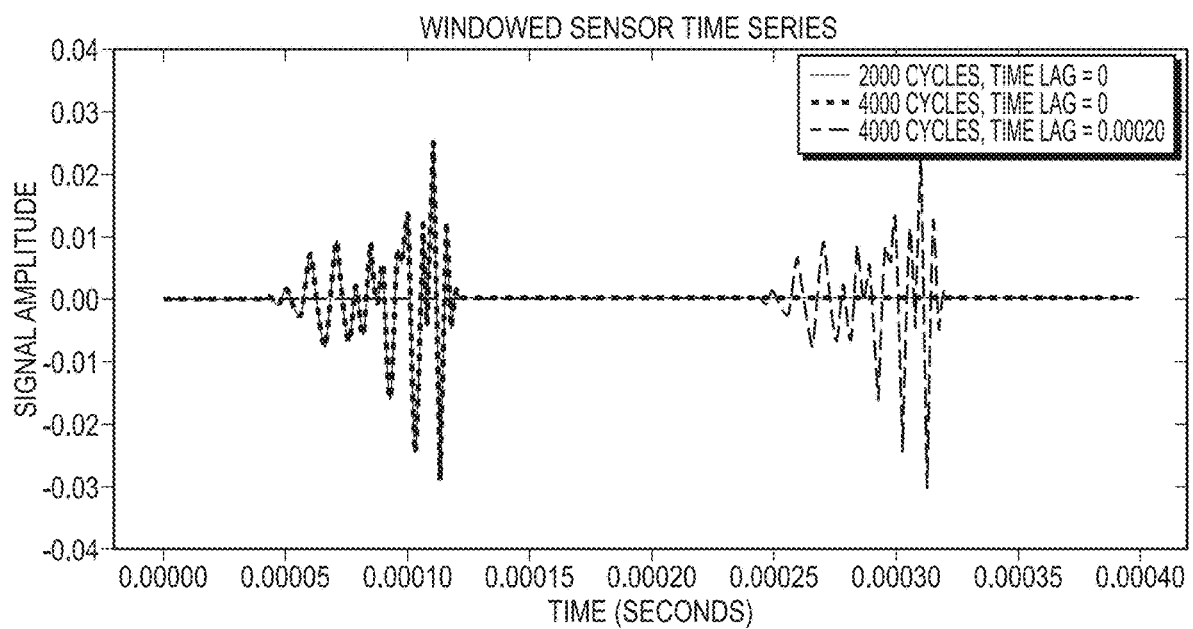
FIG. 71 is a graph of windowed sensor time series with and without time lag.
Figures 72, 73:
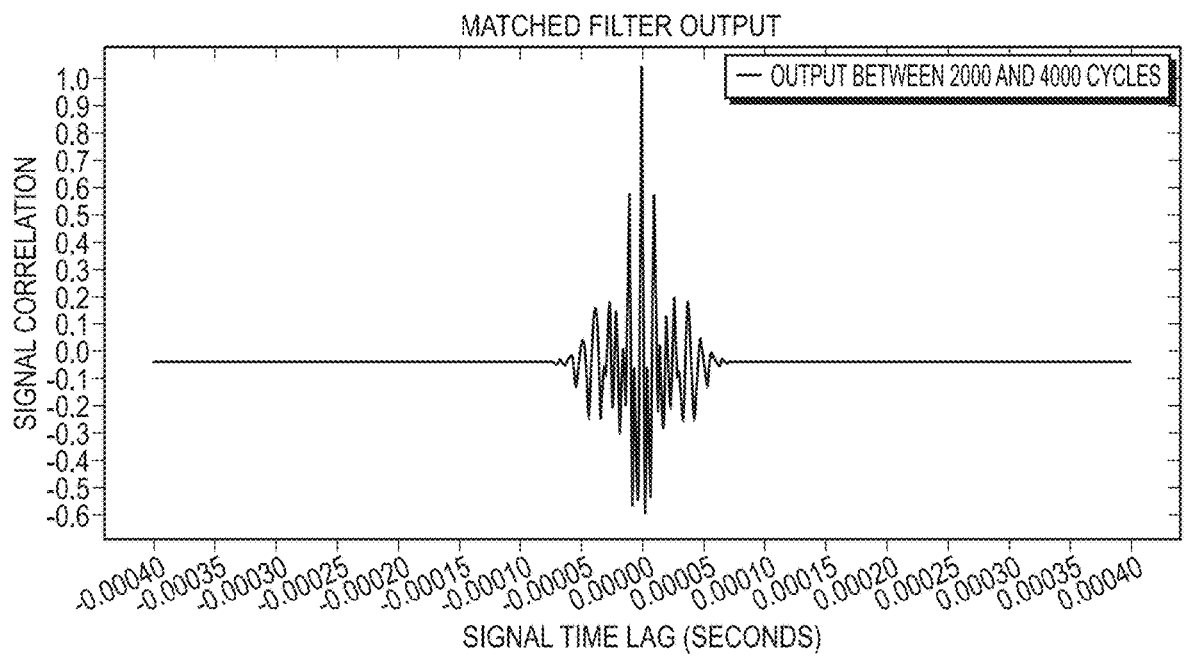
FIG. 72 is a graph of matched filter output.
FIG. 73 is a table of instrumented damage metric test results for 101, 102 and 202 specimens.

After the calibration data was collected, a metric was determined that could be used to stop the test as a small fatigue crack was growing in the specimen. The metric that was used compared a baseline piezoelectric sensor signal to a signal at a specific test cycle number using a matched filter applied to a specific window in time corresponding to the first guided wave arrival (e.g., a correlation statistic). FIG. 70 shows three time series for 0, 2,000, and 4,000 cycles along with the first arrival region highlighted with a dashed box. A change in the sensor response from 0 cycles to 2,000 cycles can be seem, which is attribute to "settling" of the specimen under load and likely dominated by changes to the sealant. After approximately 2,000 cycles, the change in the first arrival region stabilizes and any additional change is assumed to be due to crack growth surrounding the sensor. To capture the change in signal due to crack growth, a matched filter represented as Equation 1 was used:

$$y[n] = \sum_{k=-\infty}^{\infty} h[n-k]x[k] \quad (1)$$

where h[n] is the base signal for the windowed time series signal at 2,000 cycles, and x[n] is the test signal at a cycle count greater than 2,000. The matched filter is a linear convolution between the base and test signal. FIG. 71 shows an example windowed time series for a base signal at 2,000 cycles and a test signal at 4,000 cycles at a time lag of 0 and 0.002. FIG. 72 is a graph of the matched filter output for all possible time lags. For these signals, maximum correlation occurs at a time lag of 0 where the two signals nearly directly overlap. For other time lags, such as 0.002, the correlation is near zero since the signals do not overlap. The metric used to relate crack growth to signal change can be represented as Equation 2:

$$T = \max\left(\frac{1}{y[n]}\right) - 1 \quad (2)$$

where T represents the metric, and y[n] represents the value from Equation 1. As the crack grows, the correlation of the base signal and test signal generally decrease, resulting in an increase of the crack metric. The −1 value in the metric equation serves as a normalization factor.

Figure 74:
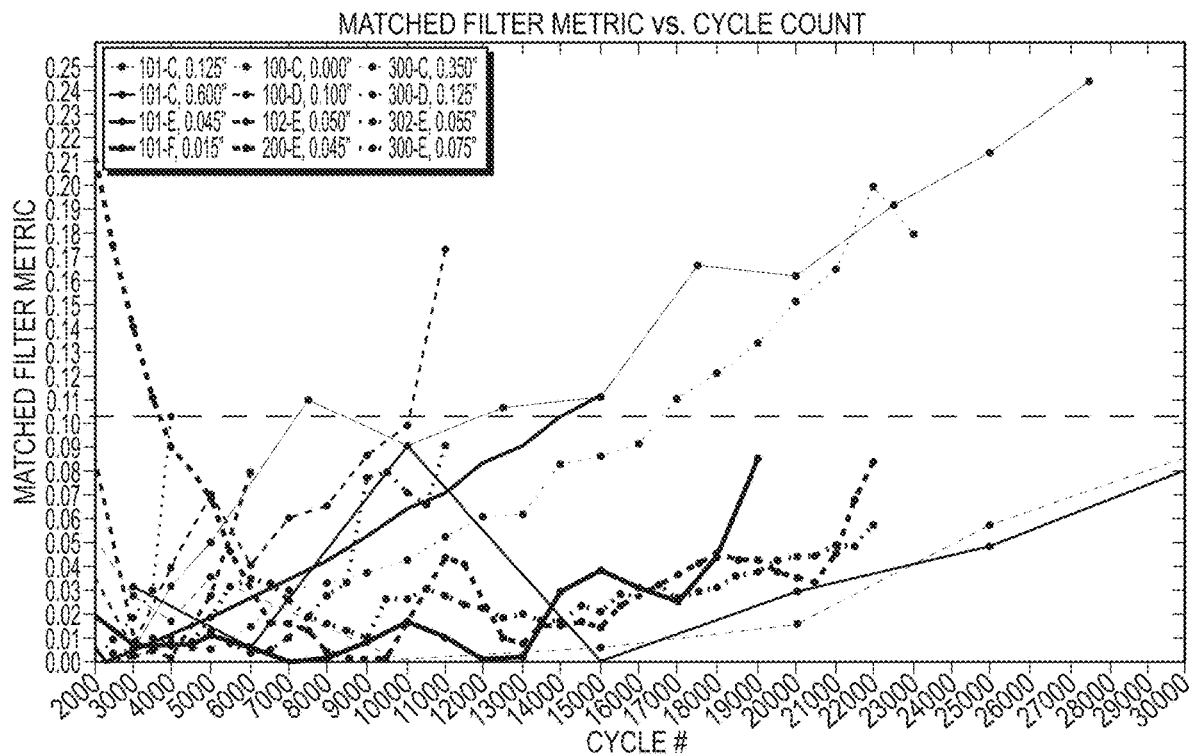
FIG. 74 is a graph of damage metric results versus cycle count for all instrumented 101, 102 and 202 specimens.
Figure 75:
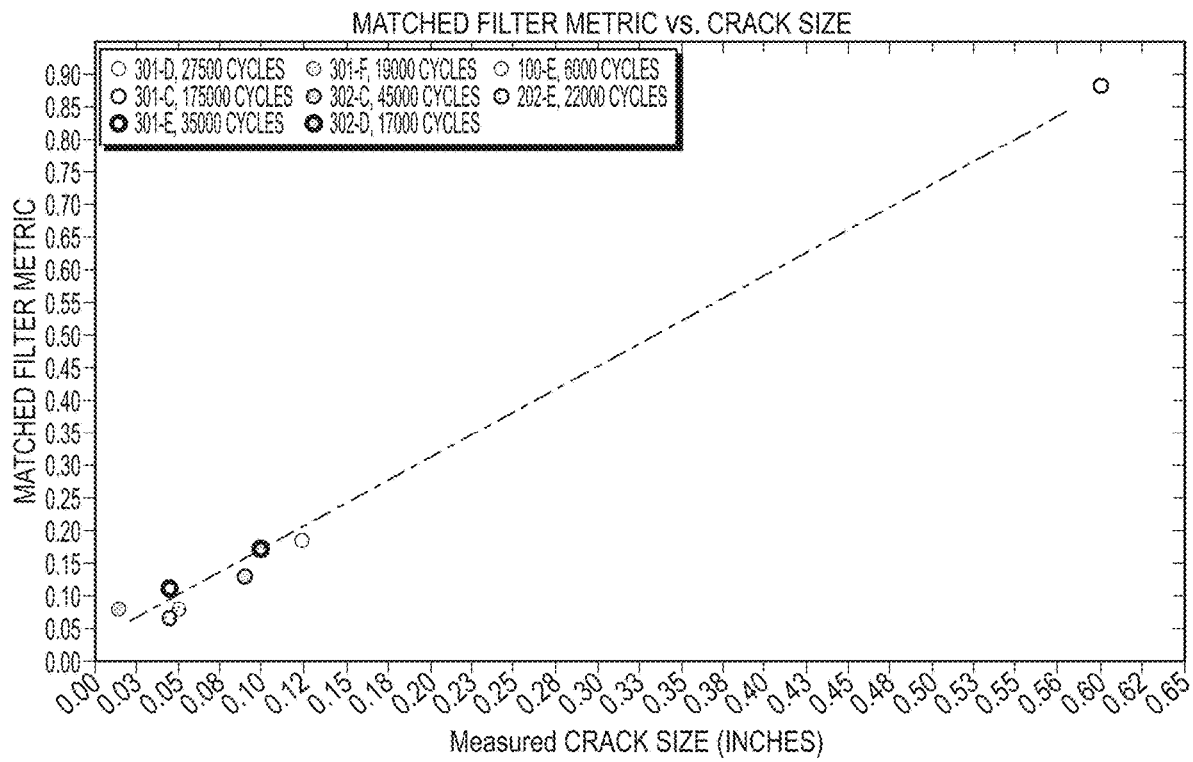
FIG. 75 is a graph of damage metric results versus crack size for all instrumented 101, 102 and 202 specimens.

FIG. 73 shows Table 3 of instrumented damage matric test results for 101, 102 and 202 specimens. FIG. 74 is a graph of the matched filter versus cycles for the specimens in Tables 5 and 6. As seen in FIG. 74, when plotted against cycles, the metric never truly holds at zero before increasing when a crack forms. Rather, there is always some small amount of change from the start of testing, which is likely due to fretting (observed on all dissected specimens) and potentially plastic zone formation. However, uniformly through all the tests, after the metric reaches a certain level a crack is definitely present, and is well correlated to crack size across multiple specimens, as seen in FIG. 75.

For the first three "blind" tests (one specimen each from 101, 102 and 202), a conservative metric goal of about 0.1 was selected, such goal expected to yield a measurable crack based on the data from the calibration tests. After each block of 500 cycles, ultrasonic data was collected while holding at the minimum load, and the data was plotted in real-time for the Matched Filter metric. The test was stopped if the metric was at (or near) the 0.1 metric. Since the metric was only processed every 500 cycles, the test was stopped in some cases based on a value close to 0.1 with a large enough slope that seemed inevitable that the 0.1 would be exceeded before the next loading block was completed. After dissection, cracks of about 50 mil were present for each specimen. For the specimens with multiple cracks, the metric appeared to correspond to the longest crack growing from the same hole, rather than the sum of the crack lengths across the hole. Subsequently, an extra 101 specimen test was conducted with a more aggressive metric goal of about 0.08, which yielded an approximately 15 mil crack. A summary of the blind test results for the 101, 102 and 202 specimens is provided in Table 3 of FIG. 73.

Figures 76, 77:
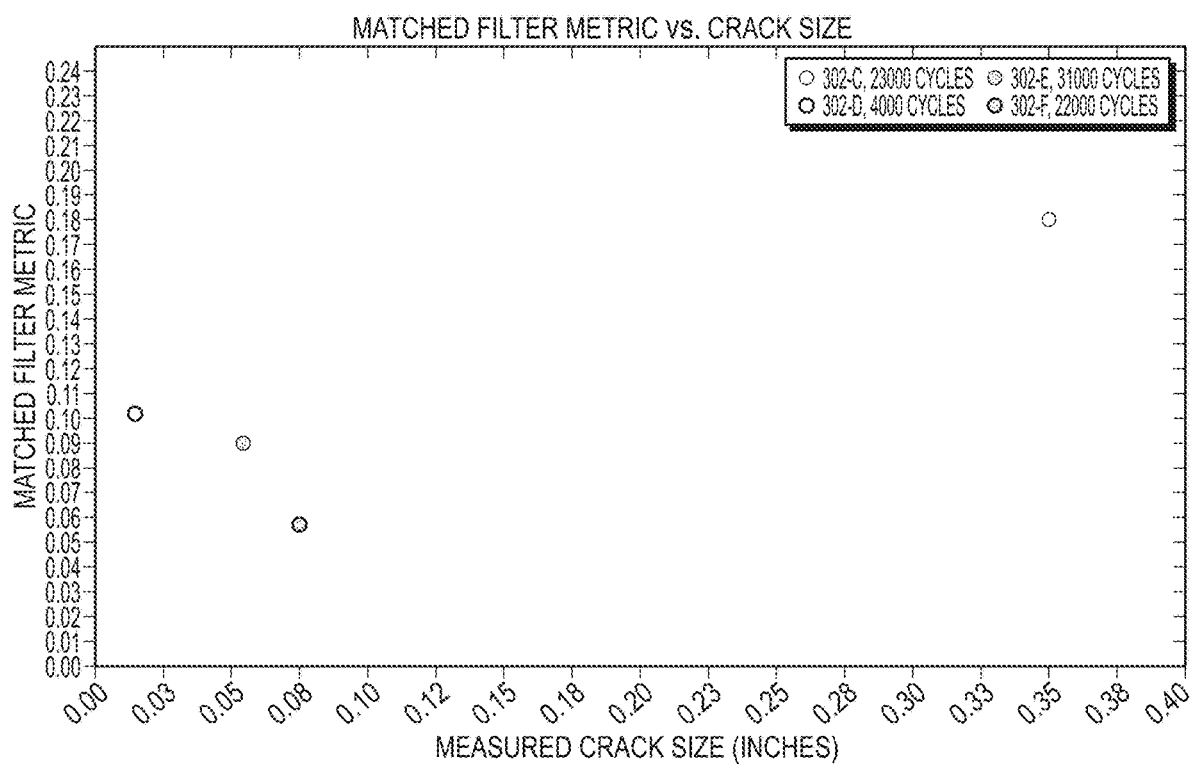
FIG. 76 is a table of instrumented damage metric test results for all 302 specimens.
FIG. 77 is a graph of damage metric results versus crack size for all instrumented 302 specimens.
Figure 83:
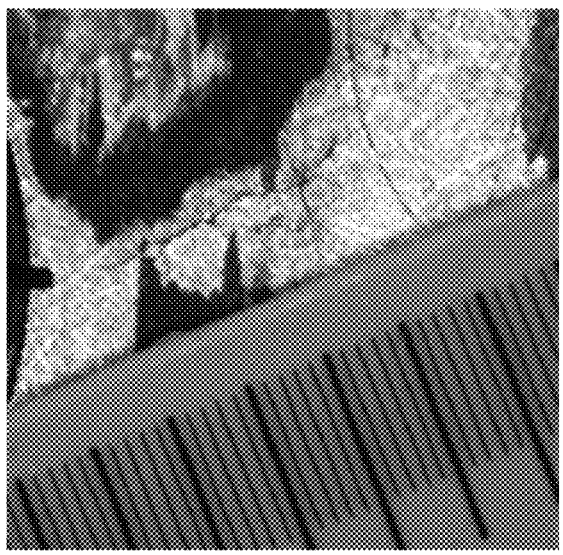
FIG. 83 is a photograph of a crack on an inner surface of a flawed plate.
Figure 84:
FIG. 84 is a photograph of a non-cracked side of the flawed plate of FIG. 83.

Following testing on the similarly constructed specimens (101, 102 and 202), testing commenced for the 302 specimens. Similar to the prior specimens, an instrumented 302 was cycled through a larger range of metric values to verify the metric behavior (the same metric approach was used for these specimens). The test was stopped at 23,000 cycles to measure the crack that had developed (about 0.35 inches). Based on the first test and the assumed crack growth rate of about 50 mil per 1,000 cycles post-initiation, it appeared that a damage metric of about 0.1 (with the same logic for stopping based on slope) would again provide for a crack length of about 50 mil. The final results for the calibration testing and three "blind" specimens is provided in Table 4 of FIG. 76, and is graphically represented in FIG. 77. The approximately 0.1 metric provided similar sized cracks as seen in the previous specimen. However, the correlation between crack length and metric value was not as strong for these specimens, albeit with half the sample size. It is believed that the minimized correlation is due to the differences between how cracks initiate and grow in aluminum versus titanium, which was also visually apparent when looking at the cracks under a microscope.

Figure 85:
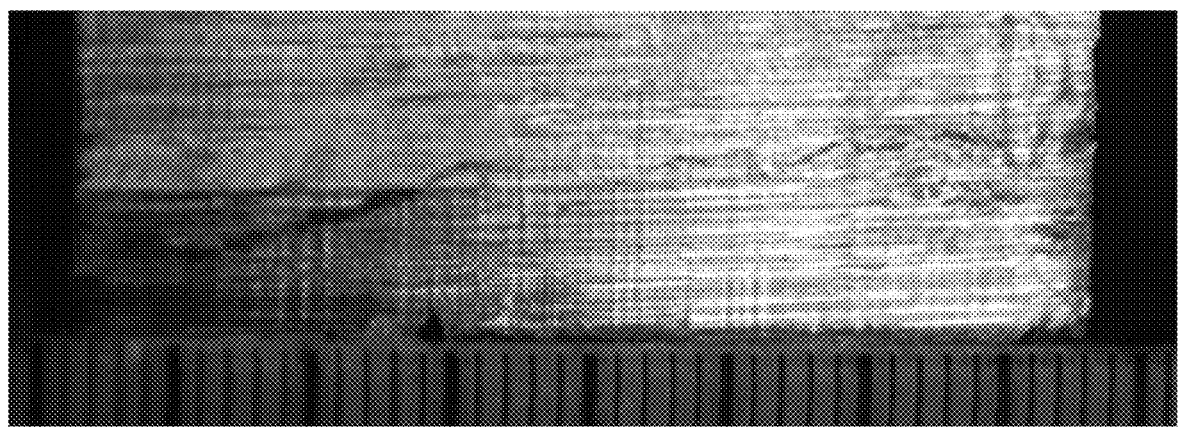
FIG. 85 is a photograph of a sectioned surface 0.06 inches from the starter notch end, with the crack extending through the plate thickness and filled with dye.
Figure 86:
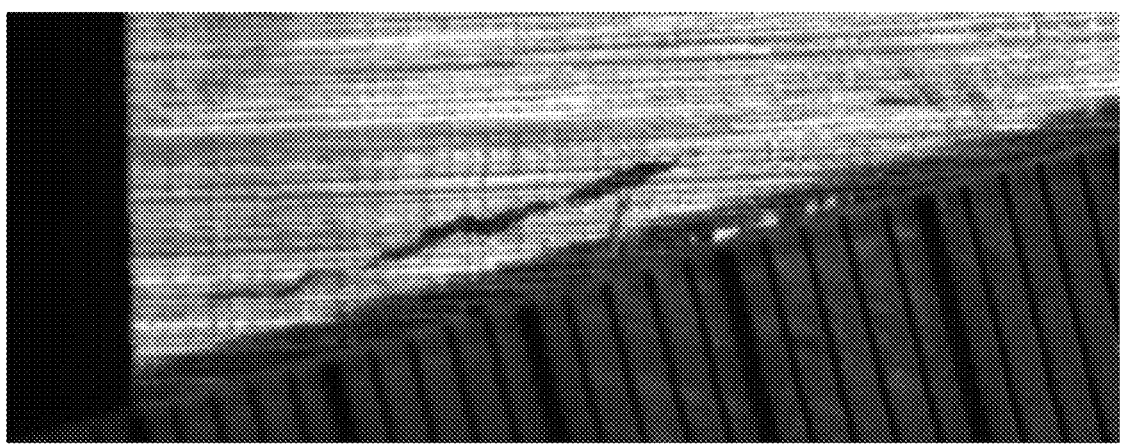
FIG. 86 is a photograph of a sectioned surface 0.13 inches from the starter notch end, with the crack extending through 60% of the plate thickness and filled with dye.
Figure 87:
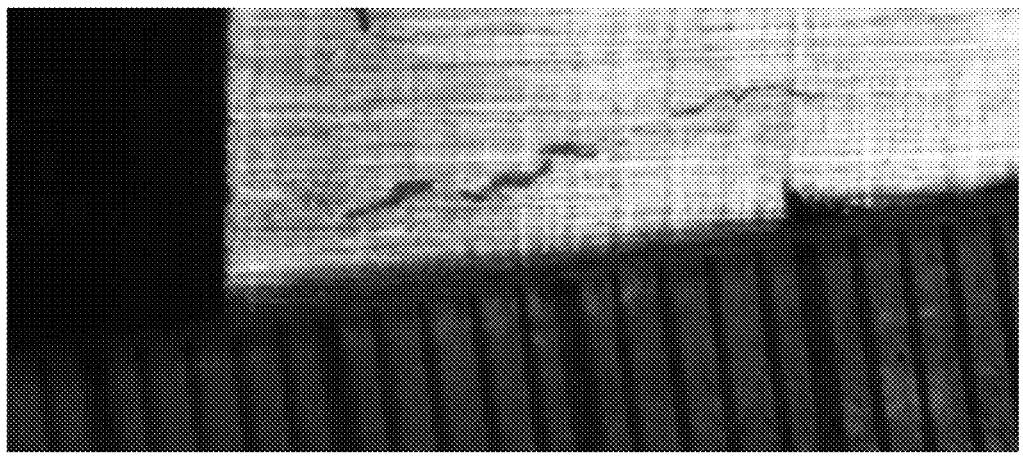
FIG. 87 is a photograph of a sectioned surface 0.17 inches from the started notch end, with the crack extending through 30% of the plate thickness and filled with dye.
Figure 88:
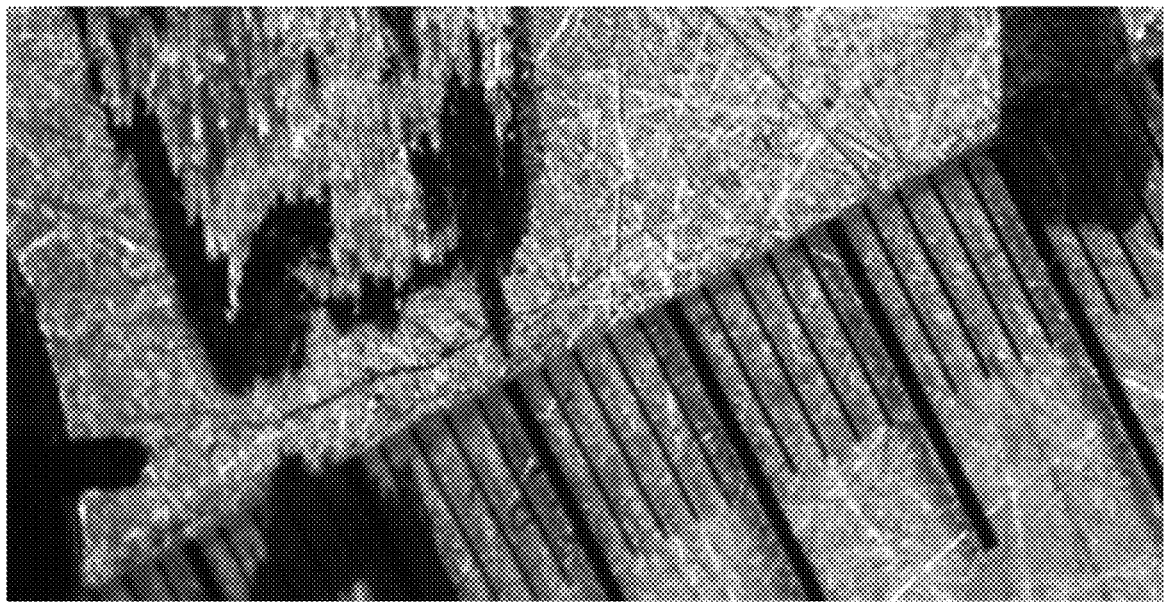
FIG. 88 is a photograph of a 101D specimen with a single EDM notch calibration, the inner surface having a crack extending from the notch to the line, with minor tick marks equaling 0.005 inches.
Figure 89:
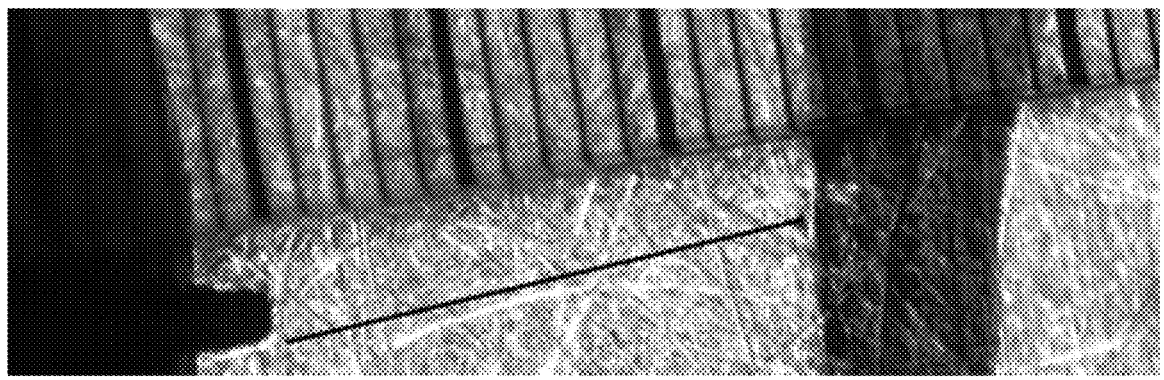
FIG. 89 is a photograph of a 101E specimen with a single EDM notch blind, the inner surface having a hairline crack visible from the started notch to just before the line, with minor tick marks equaling 0.005 inches.
Figure 90:
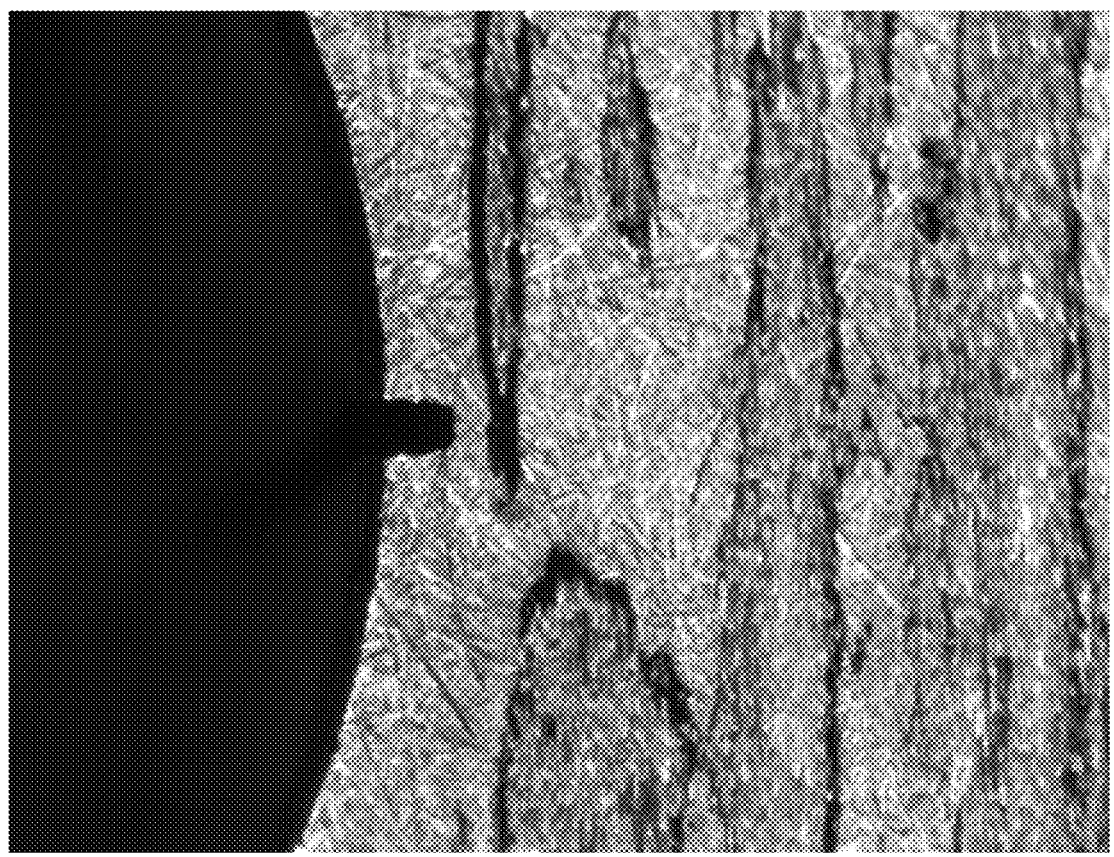
FIG. 90 is a photograph of a 101F specimen with a single EDM notch blind, the inner surface notch region having a hairline crack observed on the surface by eye under a microscope and not visible at the magnification of the digital photograph.
Figure 91:
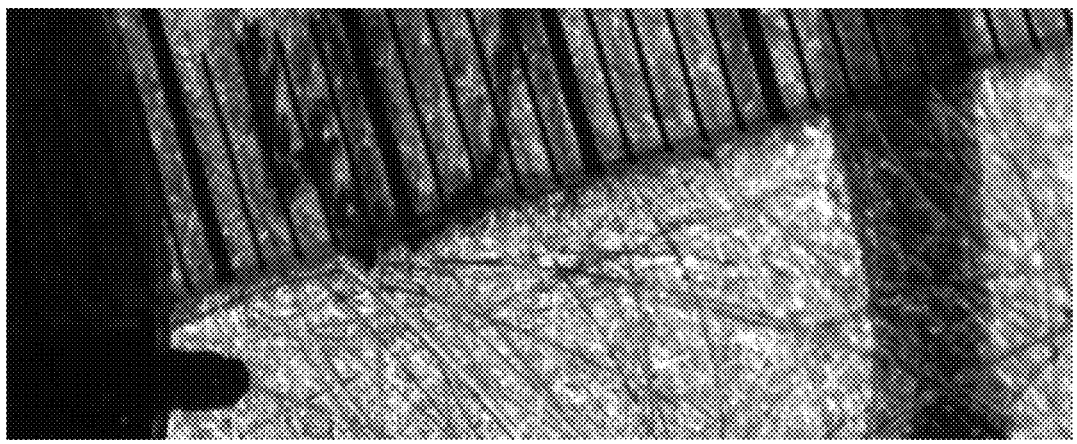
FIG. 91 is a photograph of a 102C specimen with a dual EDM notch calibration, the inner surface left notch having a 0.09 inch crack extending from the notch to the line, with minor tick marks equaling 0.005 inches.
Figure 92:
FIG. 92 is a photograph of a 102C specimen with a dual EDM notch calibration, the inner surface right notch having a 0.09 inch crack extending from the notch to the line, with minor tick marks equaling 0.005 inches.
Figure 93:
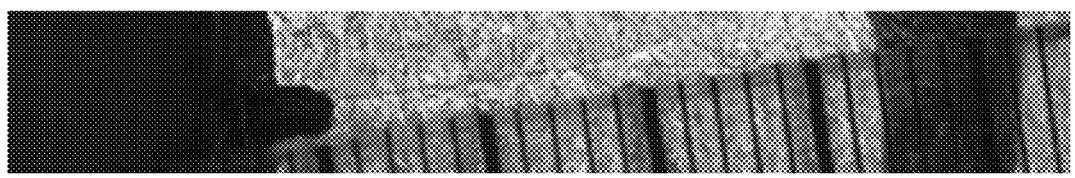
FIG. 93 is a photograph of a 102D specimen with a dual EDM notch calibration, the inner surface left notch having a 0.09 inch long crack extending from the notch to the line, with minor tick marks equaling 0.005 inches.
Figure 94:
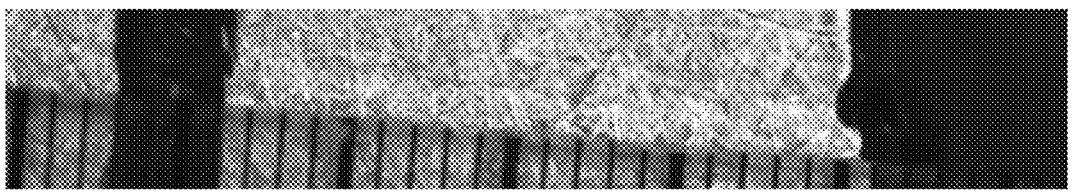
FIG. 94 is a photograph of a 102D specimen with a dual EDM notch calibration, the inner surface right notch having a 0.10 inch long crack extending from the notch to the line, with minor tick marks equaling 0.005 inches.
Figure 95:
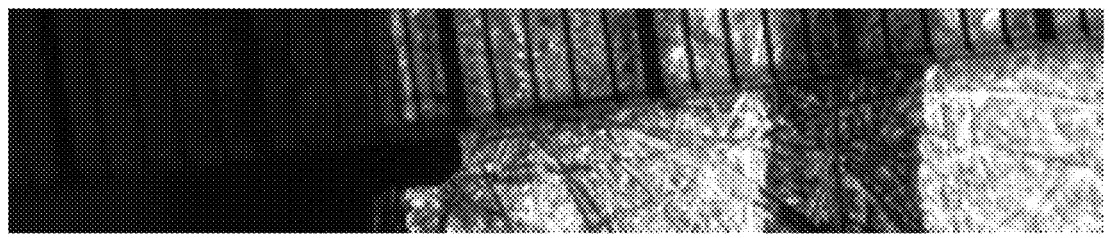
FIG. 95 is a photograph of a 102E specimen with a dual EDM notch blind, the inner surface left notch having a hairline crack visible from the starter notch to just before the line, with minor tick marks equaling 0.005 inches.
Figure 96:
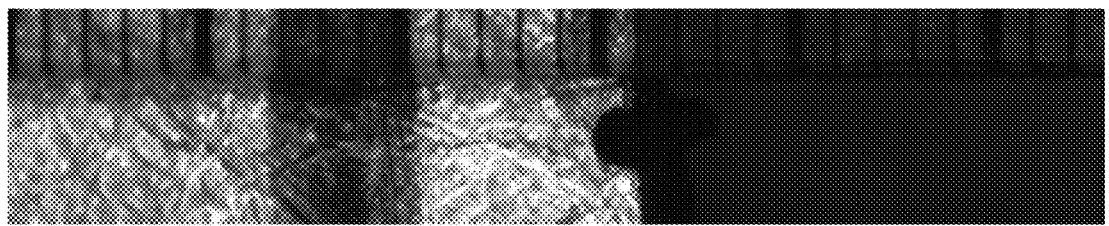
FIG. 96 is a photograph of a 102E specimen with a dual EDM notch blind, the inner surface right notch having a hairline crack visible from the starter notch to just before the line, with minor tick marks equaling 0.005 inches.
Figure 97:
FIG. 97 is a photograph of a 202E specimen with a dual EDM notch blind and a carbon fiber reinforced polymer (CFRP) space, the inner surface left notch having a fine crack extending from the starter notch to the line, with minor tick marks equaling 0.005 inches.
Figure 98:
FIG. 98 is a photograph of a 302D specimen with a dual EDM notch blind, having a small fine crack extending from the notch to the line, with minor tick marks equaling 0.005 inches.
Figure 99:
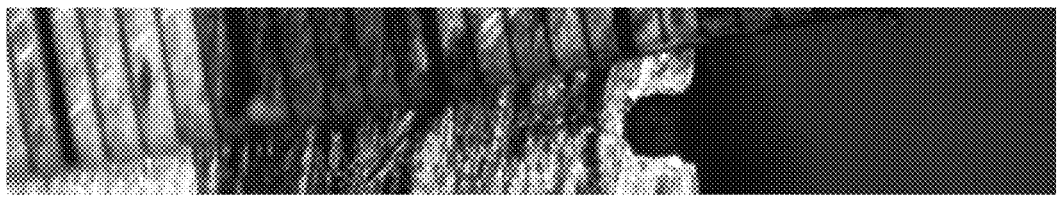
FIG. 99 is a photograph of a 302E specimen with a dual EDM notch blind, the front left having a 0.03 inch crack reaching from the notch to the line, with minor tick marks equaling 0.005 inches.
Figure 100:
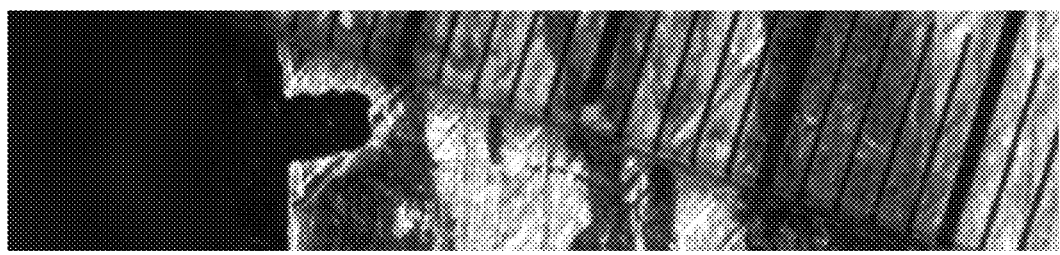
FIG. 100 is a photograph of a 302E specimen with a dual EDM notch blind, the front right having a 0.055 inch crack reaching from the notch to the line, with minor tick marks equaling 0.005 inches.
Figure 101:
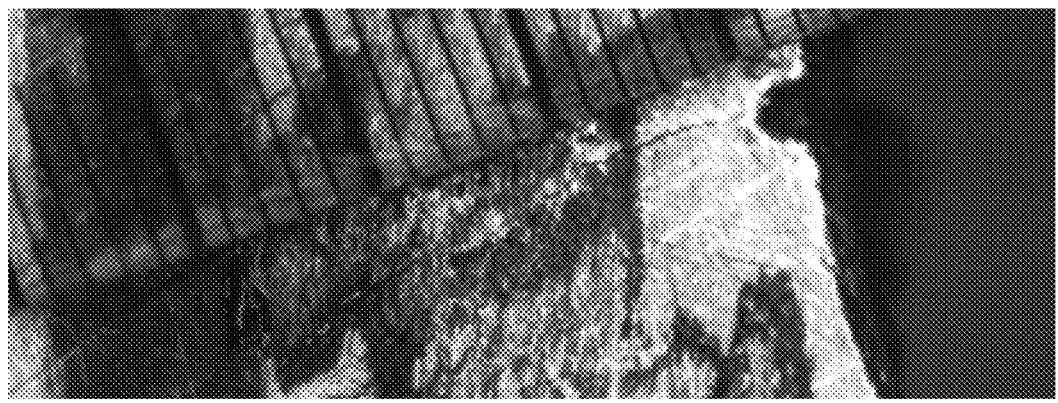
FIG. 101 is a photograph of a 302F specimen with a dual EDM notch blind, the front left having a 0.07 inch crack running from the notch to the line, with minor tick marks equaling 0.005 inches.
Figure 102:
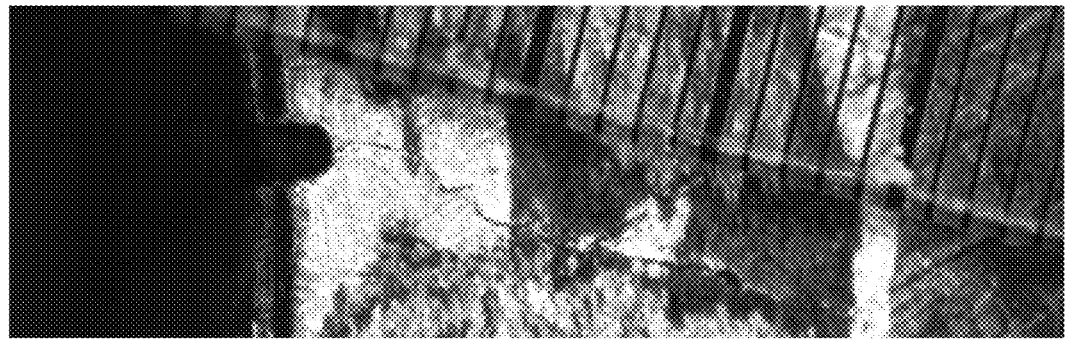
FIG. 102 is a photograph of a 302F specimen with a dual EDM notch blind, the front right having a 0.075 inch crack running from the notch to the line, with minor tick marks equaling 0.005 inches.

One test not mentioned in the above matrix is a 101 specimen that failed prematurely as a completely titanium fracture (a part without an EDM notch that was not expected to crack and did not crack for any of the other tests). Once disassembled, a 0.25 inch crack was observed on one side of the aluminum (fretting surface) growing out of the EDM notch, and no crack was observed on the back side of the same specimen (this ended up being consistent with other tests for crack initiation). The specimen was sectioned using a carbide-toothed rotary saw in order to better understand the crack evolution as it grew from the EDM notch tip. Cuts were made perpendicular to the direction of crack growth in 0.06 inch to 0.08 inch increments, starting at the far surface of the plate. FIGS. 78 and 79 show the crack 400, sectioned faces 402, and crack depth 404. A flat, smooth cross-section was revealed at every step with each sectioning cut creeping closer to the crack leading edge. After each cut, the part was examined under magnification using dye penetrant. From crack depth measurements taken at each section (see Table 5 of FIG. 80), the two-dimensional representation of the crack leading edge was constructed and is shown in FIGS. 81 and 82. A single through notch 406 was formed in the specimen, and FIG. 85 shows the crack 408. FIGS. 83-87 show photographs of the crack in the 101 specimen.

Each specimen tested underwent a disassembly procedure after fatigue testing to permit inspection of each component. The head of one HI-LOK™ pin was clamped in a smooth-jawed machinists' vise without overtightening. The corresponding collar was gripped with locking pliers. The locking force was adjusted to grip just firmly enough to turn the collar without crushing it. The collar was removed, with the unscrewing action pulling the T-pin and piezoelectric sensor element from the pin's hex recess. The assembly was moved to an arbor press, and the pin was pressed out with an undersized drift pin. The individual sealant joints were broken by hand to separate the four plates. The plates were wiped with acetone-soaked cotton rags to clean off sealant.

FIGS. 88-102 are photographs of the cracks that were discovered through the blind testing process. A red line was placed where it was believed that the crack stopped through visual inspection with a microscope. No red mark was placed on specimen 101F as it was not completely clear where the crack stopped. However, it is believed that there is a 15-20 mil fine crack in specimen 101F.

Figure 103:
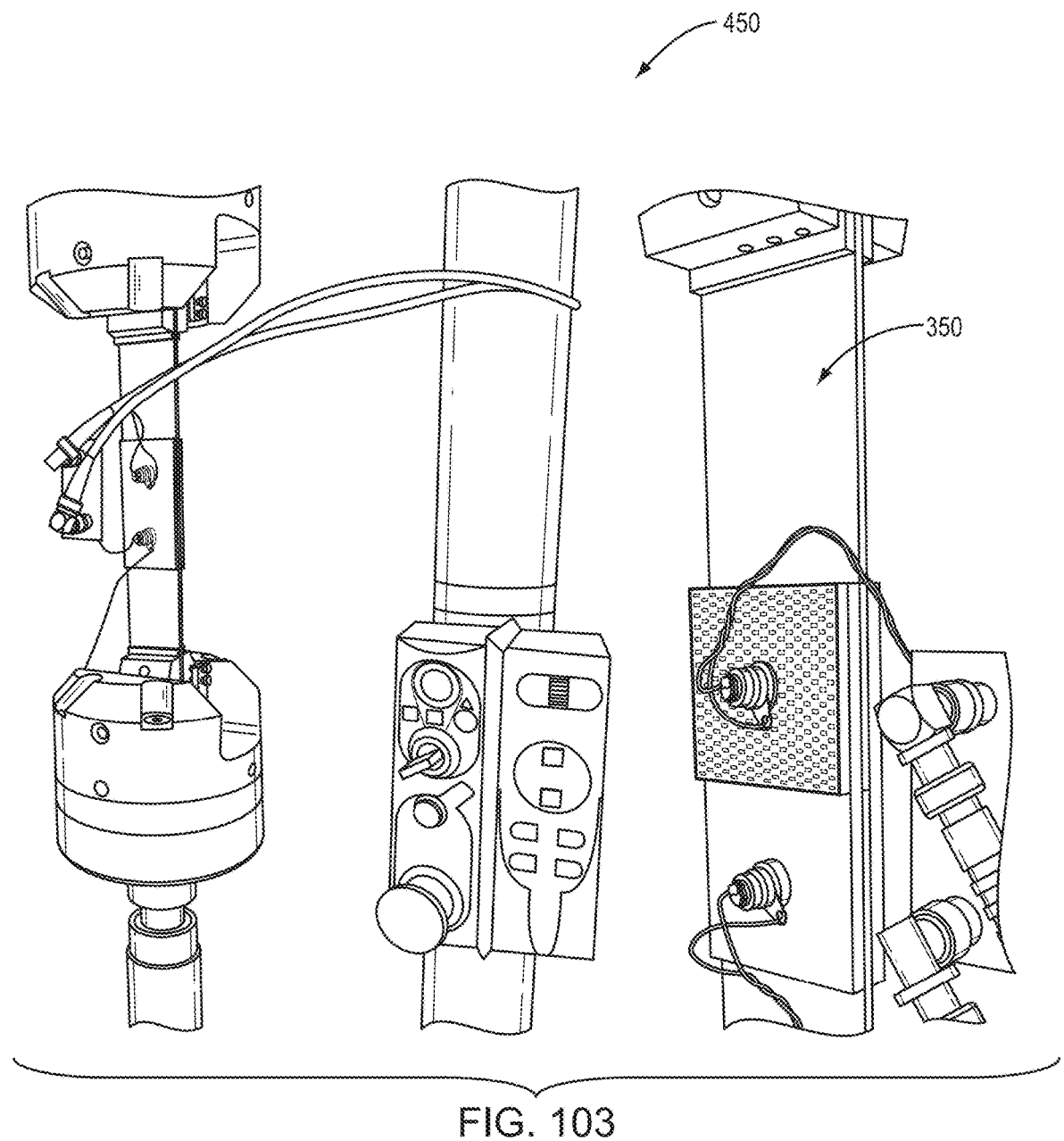
FIG. 103 is a set-up for experimental testing of specimens.

Fatigue testing was performed using the set-up 450 shown in FIG. 103, including a test specimen 350 clamped in the test frame. The load frame used in the test series is an Instron model 1350 servo-hydraulic uniaxial tensile tester equipped with fatigue rated mechanical wedge style grips (cat #2743-402). The grips are rated to +/−22,000 lbf and have two-inch wide serrated jaw faces. The tester's load cell can measure up to 11,000 lbf. Load cells and stroke measurement equipment were calibrated annually by an independent calibration lab that is ISO 17025 accredited. Preventative maintenance was performed annually as well.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A transducer assembly for damage or flaw detection in a fastened structure, the transducer assembly comprising:
   a fastener including a cavity disposed at one end of the fastener; and
   an electromechanical unit including a piezoelectric element and a substrate, the piezoelectric element is disposed outside of the cavity of the fastener and is coupled to a surface of the substrate disposed outside of the cavity, a bottom section of the substrate extends from the surface and is at least partially inserted into and mechanically coupled within the cavity of the fastener.

2. The transducer assembly of claim 1, wherein the substrate is configured to aid in orienting and aligning the piezoelectric element relative to the fastener when the substrate is inserted into the cavity of the fastener.

3. The transducer assembly of claim 1, wherein the electromechanical unit is driven by an electrical stimuli, and outputs a response signal that is used to determine whether at least a portion of the fastened structure or the fastener is damaged.

4. The transducer assembly of claim 3, wherein a data acquisition device is electrically coupled to the electromechanical unit, the data acquisition device receives the response signal output from the piezoelectric element and digitizes the response signal.

5. The transducer assembly of claim 4, wherein the data acquisition device is physically packaged together with the electromechanical unit.

6. The transducer assembly of claim 1, wherein the cavity of the fastener is non-circular, and wherein the substrate is shaped to correspond to the shape of the cavity.

7. The transducer assembly of claim 1, wherein:
the fastener is a threaded fastener comprising a shaft, a head at a first end of the shaft, and a threaded portion at a second end of the shaft opposite the first end, and the cavity of the fastener is in the shaft and is accessible from the second end; and
the threaded fastener comprises a nut having a threaded body cooperatively engageable with the threaded portion of the threaded fastener.

8. The transducer assembly of claim 7, wherein the threaded portion of the threaded fastener includes a terminal end at the second end that includes a smooth lateral surface extending circumferentially about the terminal end and substantially surrounding the cavity.

9. The transducer assembly of claim 1, wherein:
the fastener is a threaded fastener comprising a shaft, a head at a first end of the shaft, and a threaded portion at a second end of the shaft opposite the first end, and the cavity of the fastener is in the head and is accessible from the first end; and
the threaded fastener comprises a nut having a threaded body cooperatively engageable with the threaded portion of the threaded fastener.

10. A detection system for monitoring damage or flaws in a fastened structure, the detection system comprising:
a data acquisition device; and
a transducer assembly in the fastened structure within which damage is to be detected, the transducer assembly being electrically coupled to the data acquisition device, the transducer assembly being formed by:
a fastener including a cavity disposed at one end of the fastener, the fastener joining two or more structural components; and
an electromechanical unit including a piezoelectric element and a substrate, the piezoelectric element is disposed outside of the cavity of the fastener and is coupled to a surface of the substrate disposed outside of the cavity, a bottom section of the substrate extends from the surface and is at least partially inserted into and mechanically coupled within the cavity of the fastener.

11. The detection system of claim 10, comprising an excitation source, a microcontroller, a memory, signal and power conditioning circuitry, and a communication chip.

12. The detection system of claim 11, wherein the communication chip is coupled to an antenna and wirelessly transmits data associated with a response signal output by the piezoelectric element.

13. The detection system of claim 12, comprising an energy harvesting device that generates power by at least one of radio frequency energy, inductive energy, or mechanical energy, for an electrical stimuli of the piezoelectric element.

14. The detection system of claim 12, wherein the data acquisition device wirelessly transmits data indicative of a structural health of the fastened structure via the communication chip based on an output signal by the piezoelectric element.

15. The detection system of claim 14, wherein:
the transducer assembly is driven by an electrical stimuli provided by the detection system;
the transducer assembly outputs a response signal that is used to determine whether at least a portion of an assembled structure of the fastened structure or the fastener is damaged.

16. A method of damage detection of a fastened structure, the fastened structure including a fastener joining two or more structural components, the fastener including a cavity, the method comprising:
inserting a substrate of an electromechanical unit at least partially into the cavity of the fastener post-installation of the fastener relative to the two or more structural components, the electromechanical unit comprising a piezoelectric element coupled to the substrate, the piezoelectric element is disposed outside of the cavity of the fastener and a surface of the substrate to which the piezoelectric element is coupled is disposed outside of the cavity, a bottom section of the substrate extends from the surface and is at least partially inserted into and mechanically coupled within the cavity of the fastener;
mechanically coupling the substrate to the fastener;
exciting the electromechanical unit by an electrical stimuli to mechanically stimulate the fastened structure; and
measuring an output signal associated with excitation of the electromechanical unit at a data acquisition device to determine whether at least a portion of the fastened structure or the fastener is damaged.

17. The method of claim 16, wherein the substrate mechanically couples the piezoelectric element to the fastener.

18. The method of claim 16, comprising wirelessly transmitting a digitized output of the output signal from the electromechanical unit.

19. The method of claim 16, wherein power for the electrical stimuli of the electromechanical unit is harvested at an energy harvesting device by at least one of radio frequency energy, inductive energy, or mechanical energy.

20. A detection system for detecting damage or flaws in a fastened structure including a fastener having a cavity disposed at one end of the fastener, the fastener joining two or more structural components, the detection system comprising:
a piezoelectric element, the piezoelectric element responsive to excitation by an electrical stimuli; and
a substrate coupled to a surface of the piezoelectric element, the substrate having a shape and dimensions corresponding to the cavity in the fastener to permit the substrate to be at least partially inserted into and mechanically coupled to the cavity of the fastener such that the piezoelectric element and a surface of the substrate are is disposed outside of the cavity of the fastener.

21. The detection system of claim 20, wherein the piezoelectric element defines a substantially flat or plate-like configuration having uniform top and bottom surfaces.

22. The detection system of claim 20, wherein the piezoelectric element defines non-uniform top and bottom surfaces.

23. The detection system of claim 20, wherein the substrate defines a hexagonal configuration.

24. The detection system of claim 20, wherein the piezoelectric element defines a width or diameter dimensioned greater than a width or diameter of the cavity of the fastener.

25. The detection system of claim 20, wherein the piezoelectric element defines a width or diameter dimensioned smaller than a width or diameter of the cavity of the fastener.

26. The detection system of claim 20, wherein the substrate is fabricated from a material having an acoustic impedance corresponding with an acoustic impedance of a material of the fastener.

27. The transducer assembly of claim 1, wherein the piezoelectric element is fixedly coupled to the substrate, and the substrate is fixedly coupled within the cavity of the fastener.

* * * * *